(12) United States Patent
Sasaki et al.

(10) Patent No.: US 7,060,207 B2
(45) Date of Patent: Jun. 13, 2006

(54) THIN FILM MAGNETIC HEAD AND MAGNETIC RECORDING APPARATUS HAVING A LOWERED COIL RESISTANCE VALUE, REDUCED GENERATED HEAT, AND HIGH-FREQUENCY

(75) Inventors: Yoshitaka Sasaki, Milpitas, CA (US); Takehiro Kamigama, Kwai Chung (HK); Hiroyuki Itoh, Milpitas, CA (US)

(73) Assignees: Headway Technologies, Inc., Milpitas, CA (US); SAE Magnetics (H.K.) Ltd., Shatin (HK)

( * ) Notice: Subject to any disclaimer, the term of this patent is extended or adjusted under 35 U.S.C. 154(b) by 21 days.

(21) Appl. No.: 10/673,172

(22) Filed: Sep. 30, 2003

(65) Prior Publication Data

US 2005/0068675 A1    Mar. 31, 2005

(51) Int. Cl.
*G11B 5/17* (2006.01)
(52) U.S. Cl. ..................................... 260/123
(58) Field of Classification Search ............ None
See application file for complete search history.

(56) References Cited

U.S. PATENT DOCUMENTS 4,416,056 A    11/1983   Takahashi 6,191,918 B1 *   2/2001   Clarke et al. .............. 360/126
6,226,860 B1      5/2001   Burbank
2005/0068675 A1    3/2005   Sasaki et al.

OTHER PUBLICATIONS

U.S. Appl. No. 10/759,005, filed Jan. 20, 2004, Sasaki et al.
U.S. Appl. No. 10/673,172, filed Sep. 30, 2003, Sasaki et al.
U.S. Appl. No. 11/109,671, filed Apr. 20, 2005, Sasaki et al.

* cited by examiner

*Primary Examiner*—A. J. Heinz
(74) *Attorney, Agent, or Firm*—Oblon, Spivak, McClelland, Maier & Neustadt, P.C.

(57) ABSTRACT

The invention is directed to improvement of a thin film magnetic head of a magnetic recording apparatus. The magnetic head includes a write element, in which a first coil and a second coil are provided on a first insulating film formed on one surface of a first magnetic film and surround in a spiral form a back gap portion. One of the first coil and the second coil is fitted into the space between coil turns of the other, insulated from the coil turns of the other by a second insulating film, and the first and second coils are connected to each other so as to generate magnetic flux in the same direction. One of the first coil and the second coil has a side surface being adjacent to the pole portion with the second insulating film and another side surface being adjacent to the back gap portion with the second insulating film, and each of the side surfaces has a taper angle making the sectional shape of the coil narrower in the lower part and wider in the upper part. The upper surfaces of the first and second coils form the same plane.

22 Claims, 81 Drawing Sheets

THIN FILM MAGNETIC HEAD AND MAGNETIC RECORDING APPARATUS HAVING A LOWERED COIL RESISTANCE VALUE, REDUCED GENERATED HEAT, AND HIGH-FREQUENCY

BACKGROUND OF THE INVENTION

1. Field of the Invention

The present invention relates to a thin film magnetic head, a magnetic recording apparatus using the same and a method for manufacturing the same, and particularly to improvement of a thin film magnetic head.

2. Discussion of Background

In a write element provided inside a thin film magnetic head, a first pole portion and a second pole portion faces each other with a gap film between them at an air bearing surface (hereinafter, referred to as ABS) side (hereinafter, referred to as the front part), and a back gap is formed by joining a lower magnetic film connected to the first pole portion and an upper magnetic film connected to the second pole portion at the rear part opposite to the ABS. Around the back gap, a flat coil surrounding the back gap is positioned on a plane which is in parallel with the surfaces of the lower magnetic film and the upper magnetic film and nearly perpendicular to the ABS. The coil is formed generally by a frame plating method.

In a thin film magnetic head of this type, it is known that the shorter the yoke length YL from a back gap to a pole portion is, the more excellent high-frequency characteristic is obtained. In order to shorten the yoke length, it is necessary to reduce the number of turns of a coil positioned between the back gap and the pole portion or to decrease the width of the coil without reducing the number of turns.

However, since the number of turns of a coil is determined by a magneto motive force required, reducing the number of coil turns to shorten the yoke length YL has a limit.

On the other hand, in case of reducing the width of a coil without decreasing the number of turns, the electric resistance of the coil increases, so a temperature rise due to heat generation increases during a write operation. When the temperature rise increases, the first and second pole portions thermally expand to cause a thermal protrusion that the pole portions swell on the ABS. When a thermal protrusion occurs, the part where the thermal protrusion has occurred comes into contact with a magnetic recording medium and causes a head crash or causes damage or destruction of a magnetic record on the magnetic recording medium, so a thermal protrusion must be strictly avoided. If it is impossible to avoid a thermal protrusion, the floating height of a thin film magnetic head must be increased after all, which makes it impossible to meet a demand for a low floating height for a high recording density.

As a prior art which might be effective for solving the above-mentioned problem, there is U.S. Pat. No. 4,416,056. This prior art discloses a technique of patterning to form first conductors of the first layer arranged at fixed spaces on a plane, and then patterning to form second conductors of the first layer so that they fill up said spaces, insulated from said first conductors by an insulating film.

However, since this prior art discloses a structure in which the upper surfaces of the first conductors are covered with an insulating film, the sectional areas of the first conductors decrease by presence of the insulating film. In short, the above-mentioned prior art does not disclose a technique of maximizing the sectional areas of the first conductors.

And the above-mentioned prior art fails to disclose the relation of conductors relative to a pole portion and a back gap. Although the increase in wiring density of conductors contributes to shortening a yoke length YL, if the space between a conductor and each of a pole portion and a back gap is not made narrow, shortening the yoke length YL has a limit clearly.

Further, it is not necessarily preferable that the space between a conductor and each of a pole portion and a back gap is simply made narrow. The reason is that when the space between a conductor and each of a pole portion and a back gap is made narrow, there is a risk that the space which has not completely been filled up may make a keyhole.

As another prior art, there is U.S. Pat. No. 6,226,860B1. This prior art fails to disclose a means of solving the above-mentioned problem as well.

SUMMARY OF THE INVENTION

An object of the present invention is to provide a thin film magnetic head and a magnetic recording device in which a coil resistance value is lowered and the quantity of generated heat is reduced as keeping the number of coil turns.

Another object of the present invention is to provide a thin film magnetic head and a magnetic recording device being improved in high-frequency characteristic by shortening a yoke length.

In order to attain the above-mentioned objects, in a thin film magnetic head according to the present invention, a first coil and a second coil included in a write element surround in a spiral form a back gap portion on one surface of a first insulating film formed on the lower magnetic film. One of the first and second coils is fitted into the space between coil turns of the other, insulated from the coil turns of the other by a second insulating film.

The second insulating film between the first coil and the second coil can be formed as a very thin $Al_2O_3$ film of about 0.1 μm in thickness by applying a chemical vapor deposition (hereinafter, referred to as CVD) or the like. Therefore, it is possible to maximize the sectional area of the first and second coils between the back gap portion and the first pole portion, thereby decreasing the resistance of the coils and the quantity of generated heat as keeping the number of coil turns. This makes it possible to suppress occurrence of a thermal protrusion in a pole portion, thereby avoiding a head crash, damage and destruction of magnetic records on a magnetic recording medium, and thus meeting a demand for a low floating height for a high recording density.

Since one of the first coil and the second coil is fitted into the space between coil turns of the other, insulated from the coil turns of the other by the second insulating film, the wiring density of coil conductors is made high. This makes it possible to shorten the yoke length YL as keeping the same number of coil turns.

The first coil and the second coil are connected to each other so as to generate magnetic flux in the same direction. Since the first coil and the second coil are the same in winding direction, it is possible to generate magnetic flux in the same direction by making a series-connection structure in which the inner end of the first coil is connected to the outer end of the second coil. Alternatively, magnetic flux may be generated in the same direction by connecting the first coil to the second coil in parallel. In this case, the number of coil turns decreases but reduction in coil resistance is achieved.

One of the first coil and the second coil has a side surface adjacent to the pole portion and another side surface adjacent to the back gap portion, and each of the side surfaces having a taper angle that makes the sectional shape of the coil turn narrower in the lower part and wider in the upper part. According to this structure, the coil adjacent to the pole portion or the back gap portion can be formed without making a keyhole, and consequently the reliability is improved.

Furthermore, since the coil is separated from the pole portion or the back gap portion by the second insulating film which can become a very thin film of about 0.1 μm by applying CVD or the like, it is possible to more promote shortening of the yoke length YL.

The upper surfaces of the first coil and the second coil form the same plane. This structure makes it possible to form a common third insulating film on the upper surfaces of the first and second coils, so an insulating structure for the upper surfaces of the first and second coils is simplified. And this structure provides a stable base for providing another coil above the first and second coils, so said another coil can be formed as a high-accuracy pattern.

In case of providing another coil above the first and second coils, the upper surfaces of the pole piece and the back gap piece are also made to form the same plane as the upper surfaces of the first and second coils in addition to flattening the first and second coils. By doing so, a second pole piece and a second back gap piece required in case of providing another coil can be formed as a high-accuracy pattern on the flattened upper surfaces of the first pole piece and the back gap piece.

Preferably, the first coil has a taper angle making its sectional shape wider in the lower part and narrower in the upper part, and the second coil has a taper angle making its sectional shape narrower in the lower part and wider in the upper part. According to this structure, by adopting a process of forming the second coil after forming the first coil, it is possible to avoid occurrence of a keyhole when forming the second coil. Consequently, the reliability is improved.

It is preferable that the taper angles are equal to or more than 80 degrees and less than 90 degrees in relation to the flat surface of the lower magnetic film. In this case, the first coil is a plating film and is formed on the first insulating film formed on the flat surface of the lower magnetic film. The second coil is also a plating film and is formed on the second insulating film in the space between coil turns of the first coil. The second insulating film is formed on the bottom face and both side faces of the space.

A thin film magnetic head according to the present invention may comprise a third coil. The third coil is provided above the first coil and the second coil, insulated from the first coil and the second coil by a third insulating film. The third coil surrounds in a spiral form a back gap portion on the surface of the third insulating film and is connected in series with the first and second coils so as to generate magnetic flux in the same direction as the first and second coils. According to this structure, the number of coil turns is increased by the additional third coil and consequently a magneto motive force for a write operation is increased.

Further, a thin film magnetic head according to the present invention may comprise a third coil and a fourth coil. The third coil and the fourth coil are provided above the first coil and the second coil, insulated from the first coil and the second coil by a third insulating film. The third and fourth coils surround in a spiral form the back gap portion on the surface of the third insulating film, and one of the third and fourth coils is fitted into the space between coil turns of the other, insulated from the coil turns of the other by a fourth insulating film.

The outermost coil turn of the third coil or the fourth coil is adjacent to the pole portion with the fourth insulating film, and the innermost coil turn of the third coil or the fourth coil is adjacent to the back gap portion with the fourth insulating film.

In a thin film magnetic head of the above-mentioned aspect, the effect described with regard to the first aspect is provided and, moreover, the number of coil turns is increased due to the additional third and fourth coils. Consequently, a magneto motive force for a write operation is increased.

Preferably, one of the third coil and the fourth coil has a side surface being adjacent to the pole portion or the back gap portion with the fourth insulating film, the side surface having a taper angle that makes the sectional shape of the coil narrower in the lower part and wider in the upper part. According to this structure, the coil adjacent to the pole portion or the back gap portion can be formed without making a keyhole, and consequently the reliability is improved.

Further, since the coil is separated from the pole portion or the back gap portion by the fourth insulating film which can become a very thin film of about 0.1 μm by applying a CVD or the like, it is possible to shorten the yoke length YL, thereby providing improvement in high-frequency characteristic.

As a concrete aspect, the third coil may have a taper angle making its sectional shape wider in the lower part and narrower in the upper part, and the fourth coil may have a taper angle making its sectional shape narrower in the lower part and wider in the upper part. According to this structure, by adopting a process of forming the fourth coil after forming the third coil, it is possible to avoid occurrence of a keyhole when forming the fourth coil. Consequently, the reliability is improved.

It is preferable that the taper angles are equal to or more than 80 degrees and less than 90 degrees in relation to the surface of the third insulating film. The third coil is a plating film and is formed on the third insulating film. The fourth coil is also a plating film and is formed on the fourth insulating film in the space between coil turns of the third coil. The fourth insulating film is formed on the bottom face and both side faces of the space.

A thin film magnetic head according to the first aspect having the first coil and the second coil out can be manufactured by the following process.

First, a first coil, a first pole piece and a first back gap piece are formed on a first insulating film formed on the surface of the lower magnetic film. Each of them is formed so as to have a taper angle making its sectional shape wider in the lower part and narrower in the upper part.

Next, a second insulating film is formed on the first coil, the first pole piece and the first back gap piece, and further a first seed film is formed on the second insulating film.

Next, a plating film for a second coil is grown on the first seed film in an area where the second coil is to be formed, so as to fill up the spaces between the first pole piece and the outermost coil turn of the first coil, between coil turns of the first coil and between the innermost coil turn of the first coil and the first back gap piece.

Next, the plating film is flattened by polishing so that a pattern of the second coil is obtained.

A process for manufacturing a thin film magnetic head having a third coil in addition to a first coil and a second coil is as follows.

First, after performing the flattening process for obtaining the second coil, a third insulating film is pattern-formed on the flattened surface formed by the flattening process. The third insulating film is formed so as to have a pattern which covers an area slightly wider than an area where a third coil is formed and does not cover the first pole piece and the first back gap piece.

Next, the third coil is formed on the third insulating film, a second pole piece is formed on the first pole piece, and a second back gap piece is formed on the first back gap piece.

A process for manufacturing a thin film magnetic head having a third coil and a fourth coil in addition to a first coil and a second coil is as follows.

First, after the third coil, the second pole piece and the second back gap piece are formed, a fourth insulating film is formed on the surfaces of the third coil, the second pole piece and the second back gap piece and the vicinity thereof, and further a second seed film is formed on the fourth insulating film.

Next, a plating film for the fourth coil is grown on the second seed film in an area where the fourth coil is to be formed, so as to fill up the spaces between the second pole piece and the outermost coil turn of the third coil, between coil turns of the third coil and between the innermost coil turn of the third coil and the second back gap piece.

Next, an insulating film covering the plating film is formed, and thereafter the plating film is flattened by polishing so that a pattern of the fourth coil is obtained.

The third coil, the second pole piece and the second back gap portion each can be formed so as to have a taper angle making its sectional shape wider in the lower part and narrower in the upper part. In this case, it is desirable that the third coil is formed by an electrolytic plating method of Cu and the plating film for the fourth coil is formed by an electrolytic plating method of Cu.

The manufacturing method according to the above-mentioned three aspects may include the following common technological matters.

The first and second seed films may comprise a Cu film formed by sputtering and a Cu film formed by CVD.

The second and fourth coils each may be formed by applying Cu-electrolytic plating onto the second seed film which comprises a Cu film formed by sputtering and a Cu film formed by CVD.

The first to fourth insulating films each are an alumina-CVD film formed by an atomic layer method, but they are not limited to this. In this case, the insulating films each are within 50 nm to 150 nm in thickness.

The above-mentioned taper angles can be determined by selecting a focusing position in a photolithography process or can also be determined by an ion beam etching method.

The present invention further discloses also a magnetic head device having a thin film magnetic head and a head supporting device combined with each other, and a magnetic recording/reproducing apparatus having this magnetic head device and a magnetic recording medium (hard disk) combined with each other. Other objects, structures and advantages of the present invention are described in more detail with reference to the accompanying drawings. The drawings are only exemplifications.

DETAILED DESCRIPTION OF THE PREFERRED EMBODIMENTS

1. Thin Film Magnetic Head

Figure 1:
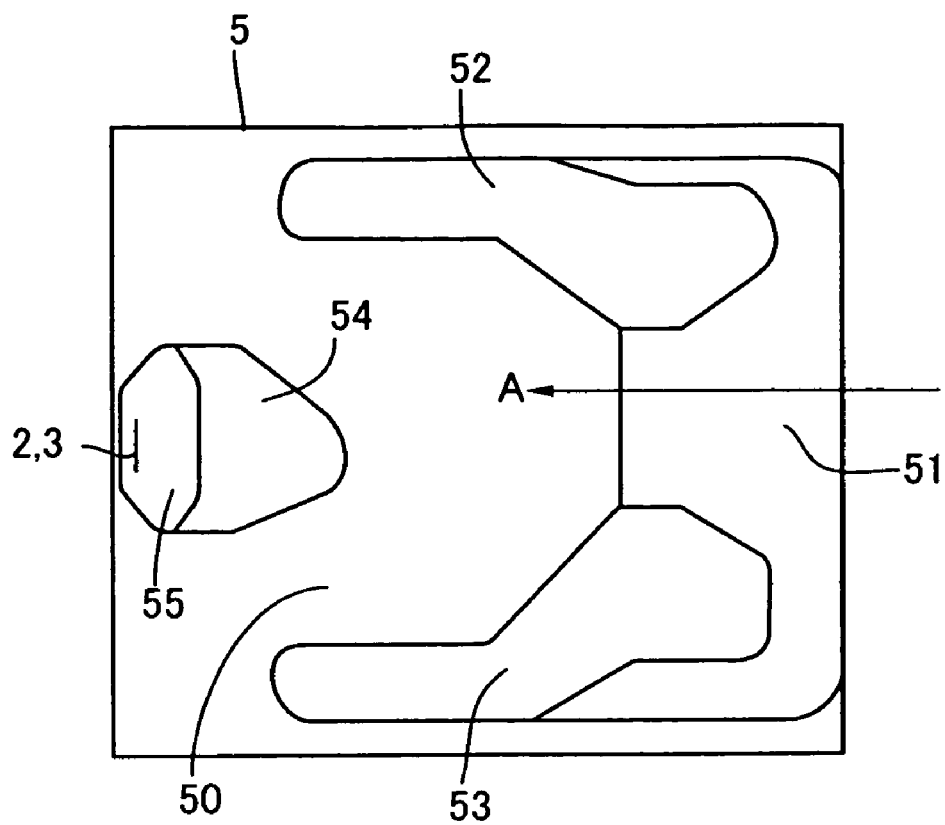
FIG. 1 is a diagram of a thin film magnetic head according to the present invention, seen from the ABS side.
Figure 2:
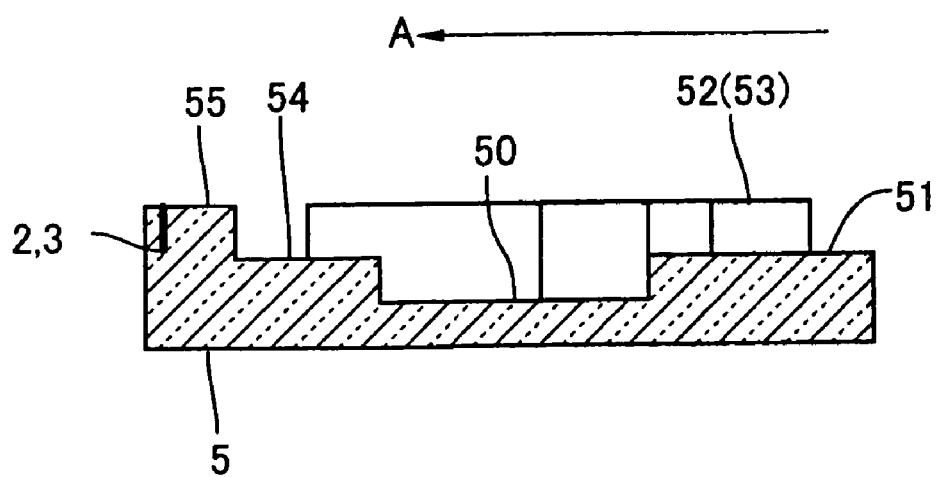
FIG. 2 is a sectional view of the thin film magnetic head shown in FIG. 1.

Referring to FIGS. 1 to 4, a thin film magnetic head according to the present invention comprises a slider 5, a write element 2 and a read element 3. The slider 5 is, for example, a ceramic structure having a base body 15 made of $Al_2O_3$—TiC or the like, with an insulating film 16 of $Al_2O_3$, $SiO_2$ or the like provided on the surface thereof (see FIG. 3). The slider 5 has a geometrical shape for controlling a floating characteristic in the surface facing a medium. As a representative example of such a geometrical shape, there is shown an example in which there are provided with a first step part 51, a second step part 52, a third step part 53, a fourth step part 54 and a fifth step part 55 on a base face 50 at the ABS side. The base face 50 becomes a negative pressure generating portion to an air flowing direction shown by arrow A, the second step part 52 and the third step part 53 form a step-shaped air bearing rising from the first step part 51. The surfaces of the second step part 52 and the third step part 53 form an ABS. The fourth step part 54 stands up in the shape of a step from the base face 50 and the fifth step part 55 stands up in the shape of a step from the fourth step part 54. Electromagnetic converter elements 2 and 3 are provided in the fifth step part 55.

The electromagnetic converter elements 2 and 3 comprise a write element 2 and a read element 3. The write element 2 and the read element 3 are provided at the air flowing out end (trailing edge) side when seeing in the air flowing direction A.

Figure 3:
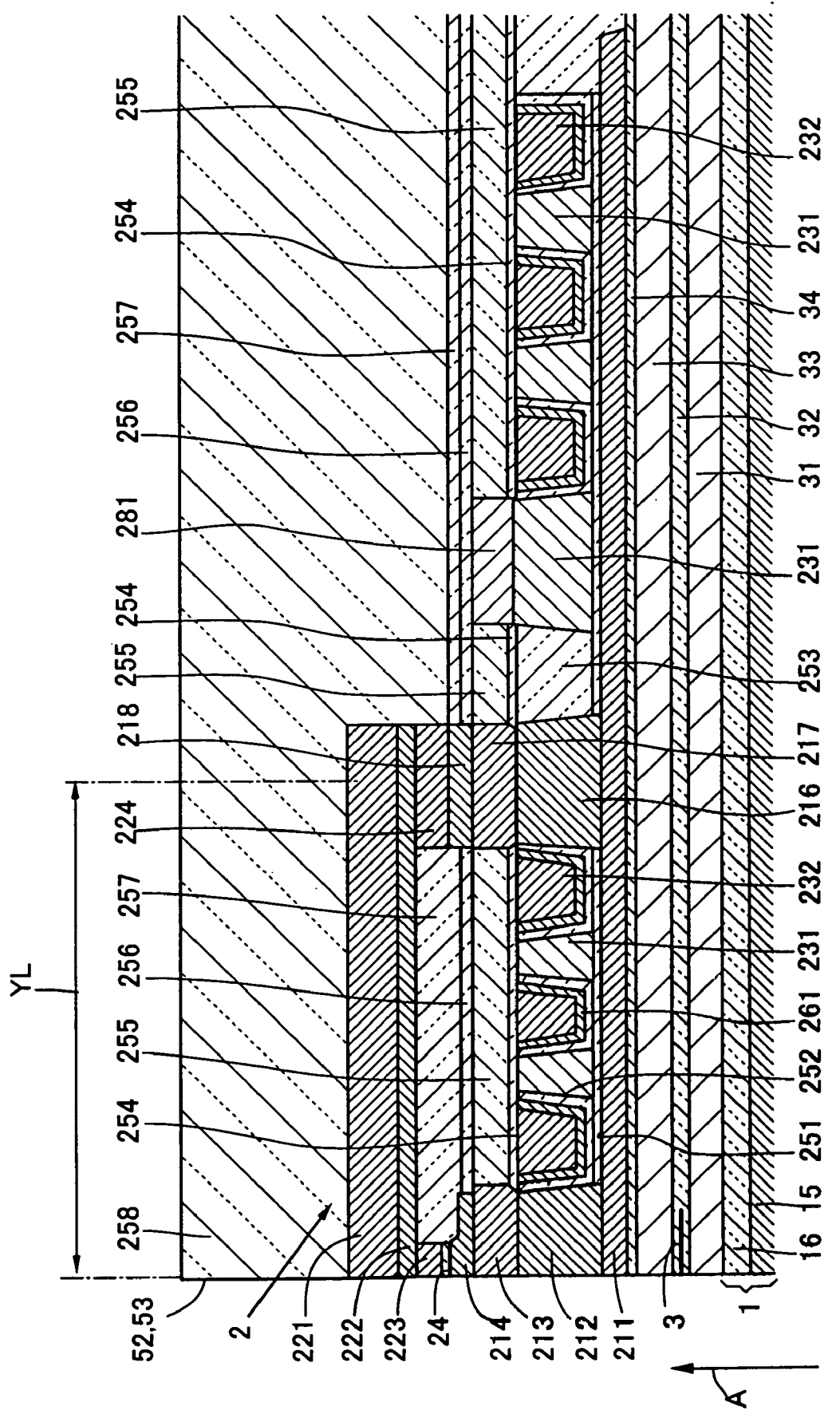
FIG. 3 is a magnified sectional view of an electromagnetic converter portion of the thin film magnetic head shown in FIGS. 1 and 2.
Figure 4:
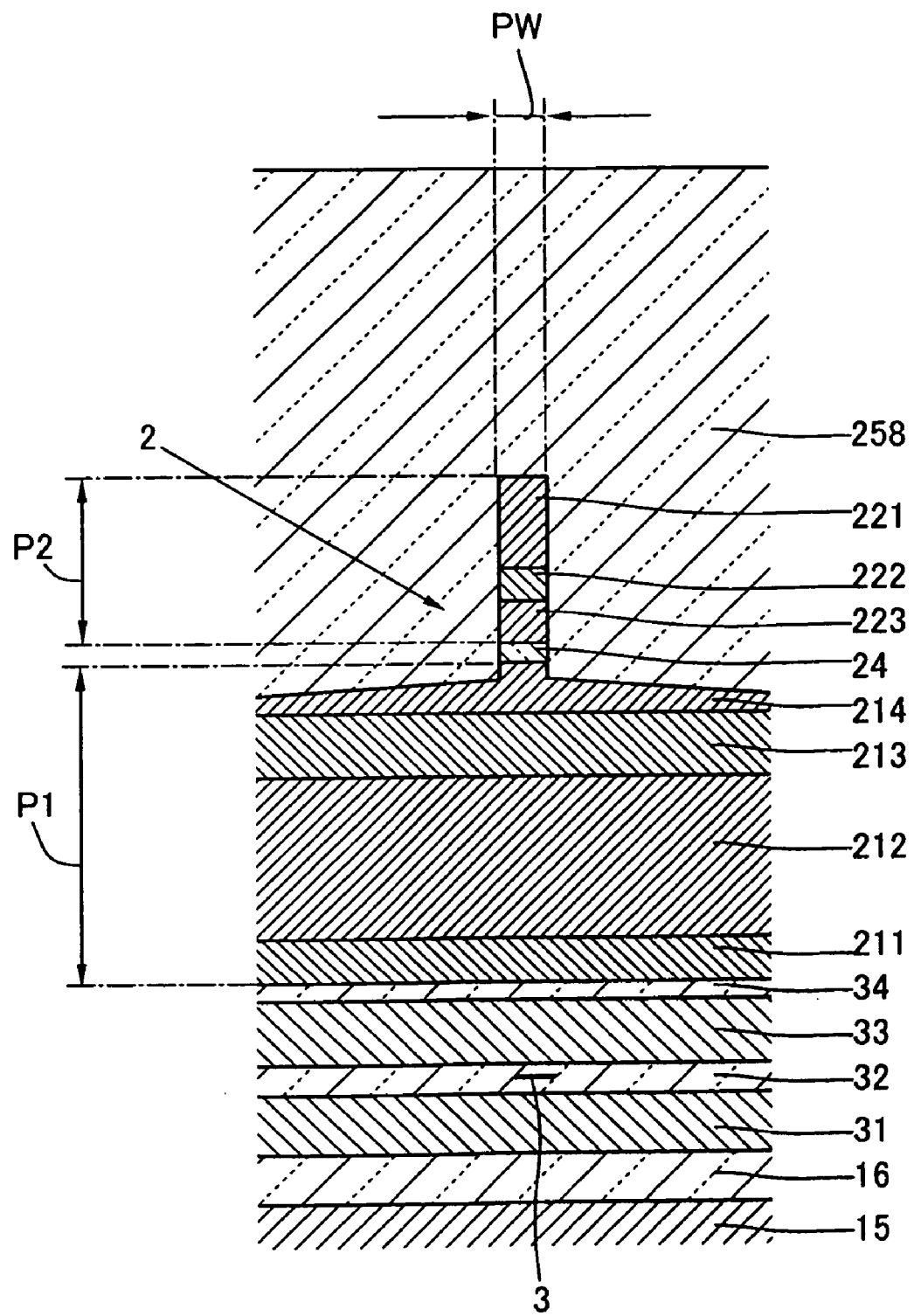
FIG. 4 is a diagram of the electromagnetic converter portion shown in FIG. 3, seen from the ABS side.
Figure 5:
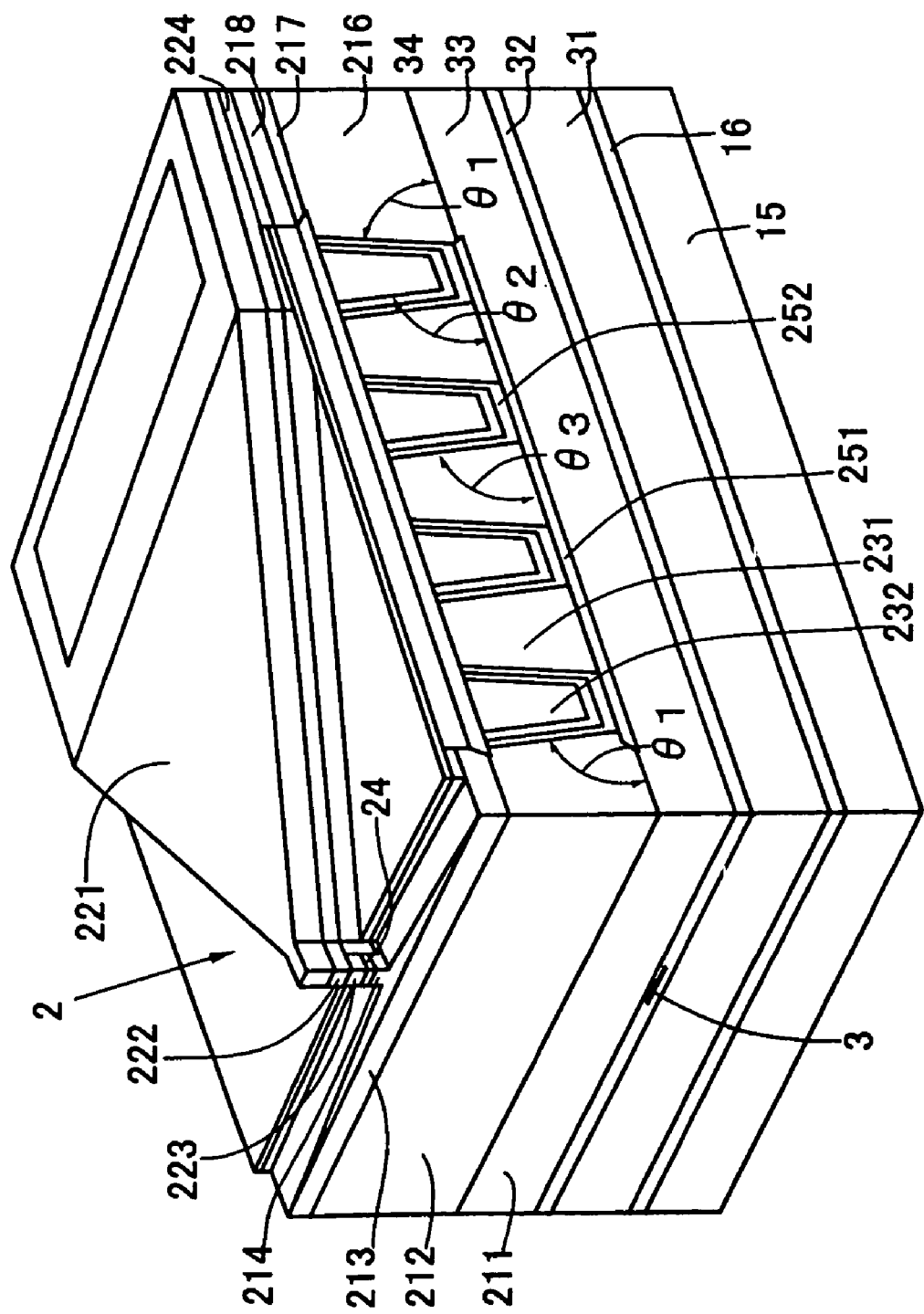
FIG. 5 is a perspective view showing a write element part cut out from the electromagnetic converter portion shown in FIGS. 3 and 4.

Referring to FIGS. 3 and 4, the write element 2 comprises a lower magnetic film 211, an upper magnetic films 221 and 222, a gap film 24 made of alumina or the like, a first pole portion P1, a second pole portion P2, a first coil 231 and a second coil 232. The representations "lower" and "upper" in the lower magnetic film 211 and the upper magnetic films 221, 222 are representations for only referring to illustrated embodiments, and the upper/lower relation in the lower magnetic film 211 and the upper magnetic films 221, 222 may be inverted according to circumstances.

The lower magnetic film 211 is supported by an insulating film 34 and has a substantially flat surface. The insulating film 34 is made of an inorganic material such as $Al_2O_3$, $SiO_2$, AlN or DLC. The upper magnetic films 221, 222 and the lower magnetic film 211 face each other with an inner gap between them.

The lower magnetic film 211 and the upper magnetic films 221, 222 can be made of one or more magnetic materials selected from NiFe, CoFe, CoFeN, CoNiFe, FeN, FeZrN and the like. The lower magnetic film 211 and the upper magnetic films 221, 222 each are determined within 0.25 to 3 μm in thickness, for example. Such lower magnetic film 211 and upper magnetic films 221, 222 can be formed by a frame plating method.

In the illustrated embodiment, it is assumed that the lower magnetic film 211 is made of CoFeN or CoNiFe. And when the lower magnetic film 211 is called a first magnetic film, the upper magnetic films 221, 222 have a multilayer structure of a second magnetic film 221 and a third magnetic film 222. For convenience of description, in the following description the lower magnetic film 211 is called a first magnetic film 211 and two magnetic films forming the upper magnetic films 221, 222 are called a second magnetic film 221 and a third magnetic film 222, respectively. The second magnetic film 221 can be made of CoNiFe and the third magnetic film 222 can be made of CoFeN being high in saturation magnetic flux density.

The fore-end portions of the first magnetic film 211, the second magnetic film 221 and the third magnetic film 222 form parts of the first pole portion P1 and the second pole portion P2 facing each other with a very thin gap film 24 between them, and a write operation is performed in the first pole portion P1 and the second pole portion P2. The gap film 24 is made of a non-magnetic metal film or an inorganic insulating film such as alumina.

In the illustrated embodiment, the first pole portion P1 has a structure in which a pole piece 212, a pole piece 213 and a pole piece 214 are deposited on the first magnetic film 211 in this order. The pole pieces 212, 213 and 214 can be made of CoFeN or CoNiFe.

The second pole portion P2 has a structure in which a pole piece 223 is deposited on the gap film 24, and a seventh pole piece formed out of an end part of the third magnetic film 222 and an eighth pole piece formed out of an end of the second magnetic film 221 are deposited in order on the pole piece 223.

Referring to FIG. 4, an end part of the first magnetic film 211, the pole piece 212 and the pole piece 213 spread in the track width direction of the ABS. However, the pole piece 214 has the upper end part narrowed in track width at both sides so that the upper end part has a narrow track width PW, and the gap film 24, the pole piece 223, an end part of the third magnetic film 222 and an end part of the second magnetic film 221 which are deposited on the pole piece 214 have also nearly the same narrow track width PW as the pole piece 214. Therefore, the narrow track width PW for high-density recording is obtained.

The second magnetic film 221 and the third magnetic film 222 extend to the back of the ABS 52, 53 as holding an inner gap between the first magnetic film 211 and them, and are joined to the first magnetic film 211 by back gap pieces 216, 217, 218 and 224. Consequently, a thin film magnetic circuit going through the first magnetic film 211, the second magnetic film 221, the third magnetic film 222 and the gap film 24 is completed.

The inner gap is filled up with insulating films 254 to 257, and the upper magnetic film comprised of the second magnetic film 221 and the third magnetic film 222 is formed on the insulating film 257.

Figure 6:
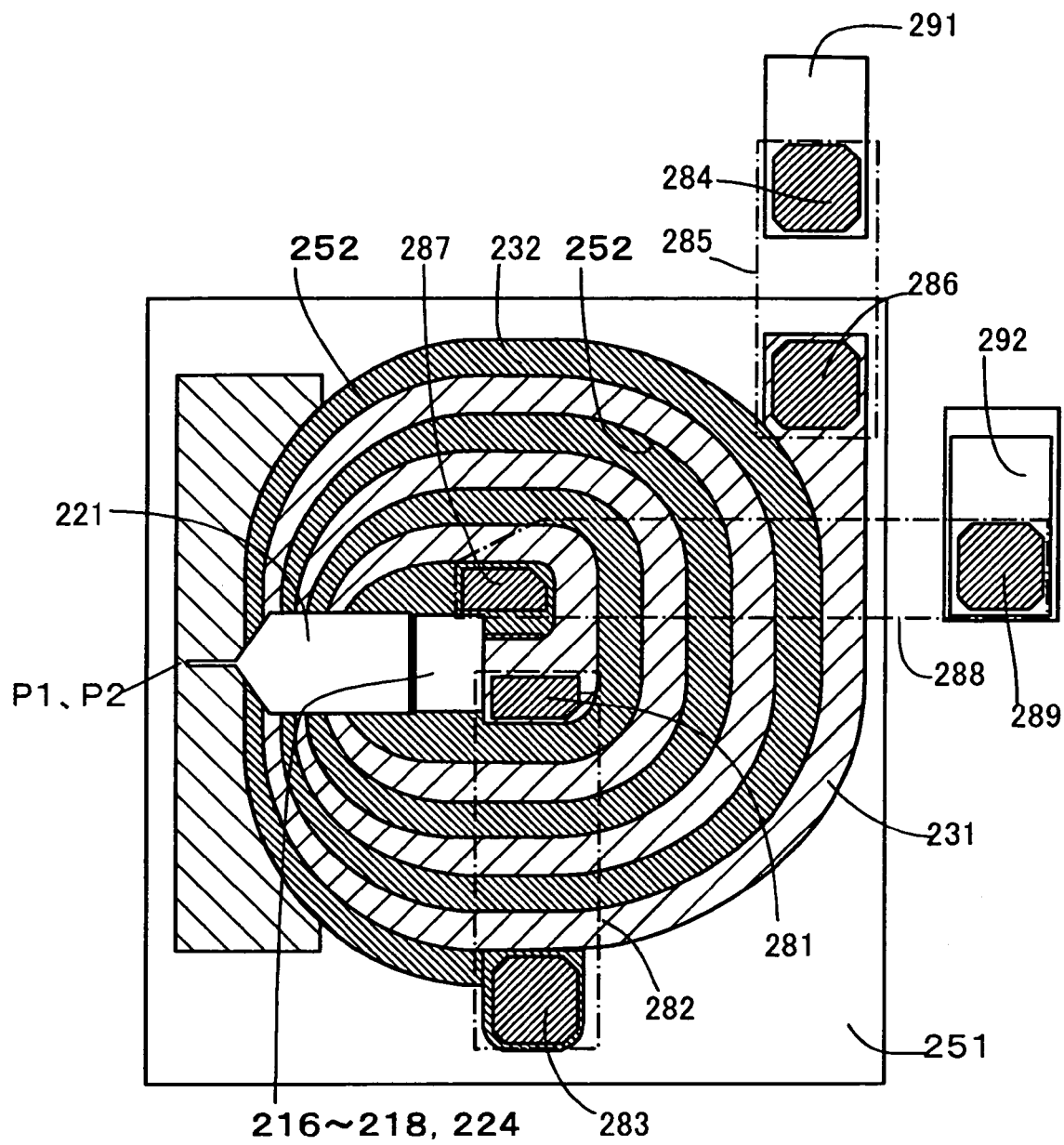
FIG. 6 is a plan view showing a coil structure of the write element part in the electromagnetic converter portion shown in FIGS. 3 to 5.

Next, referring to FIG. 6, the first and second coils 231 and 232 surround the back gap pieces 216, 217, 218 and 224.

The first coil 231, in a spiral shape, is deposited on the surface of an insulating film 251 formed on a flat surface of the first magnetic film 211 and has a coil pattern wound in a flat form around an axis perpendicular to the surface of the insulating film 251. The first coil 231 is made of a conductive metal material such as Cu(copper). The insulating film 251 is made of an inorganic insulating material such as $Al_2O_3$, $SiO_2$, AlN or DLC.

The second coil 232, in a spiral shape as well, is fitted into the space between coil turns of the first coil 231, insulated from the coil turns of the first coil 231 by an insulating film 252, and has a coil pattern wound around the axis in a flat form. The second coil 232 is also made of a conductive metal material such as Cu(copper). The insulating film 252 is also made of an inorganic insulating material such as $Al_2O_3$, $SiO_2$, AlN or DLC.

The periphery of the first coil 231 and the second coil 232 is filled up with an insulating film 253 (see FIG. 3). The insulating film 253 is also made of an inorganic material such as $Al_2O_3$, $SiO_2$, AlN or DLC.

The insulating film 252 between the first coil 231 and the second coil 232 can be formed as a very thin $Al_2O_3$ film of about 0.1 μm in thickness by applying CVD or the like. Therefore, it is possible to maximize the first coil 231 and the second coil 232 in sectional area between the back gap pieces 216 to 218, 224 and the pole portions P1, P2, thereby decreasing the coil resistance and the quantity of generated heat as keeping the number of coil turns. This makes it possible to suppress occurrence of a thermal protrusion in the pole portions P1, P2 during a write operation, thereby avoiding a head crash, damage and destruction of magnetic records on a magnetic recording medium, and thus meeting a demand for a low floating height for a high recording density.

Since the second coil 232 is fitted into the space between coil turns of the first coil 231, insulated from the coil turns of the first coil 231 by the insulating film 252, the wiring density of coil conductors is made high. This makes it possible to shorten the yoke length YL (see FIG. 3) as keeping the same number of coil turns.

The first coil 231 and the second coil 232 are connected to each other so as to generate magnetic flux in the same direction. Since the first coil 231 and the second coil 232 have the same winding direction, it is possible to generate the magnetic flux in the same direction by making a series-connection structure in which the inner end 281 of the first coil 231 and the outer end 283 of the second coil 232 are connected to each other by a connecting conductor 282. The outer end 286 of the first coil 231 is connected to a terminal 284 by a connecting conductor 285, led outside by a lead conductor 291 and connected to a takeout electrode 29 (see FIG. 1). The inner end 287 of the second coil 232 is connected to a terminal 289 by a connecting conductor 288, led outside by a lead conductor 292 and connected to a takeout electrode 30 (see FIG. 1).

Unlike the structure shown in FIG. 6, magnetic flux may be generated in the same direction by connecting the first coil 231 and the second coil 232 in parallel with each other. In this case, the number of coil turns decreases but reduction in coil resistance is achieved.

One of the first coil 231 and the second coil 232 has a side surface adjacent to the pole piece 212 forming the first pole P1, and another side surface adjacent to the back gap piece 216, each of the side surfaces having a taper angle that makes the sectional shape of the coil turn narrower in the lower part and wider in the upper part. In the embodiment illustrated, the second coil 232 has a side surface adjacent to the pole piece 212 forming the first pole portion P1, and another side surface being adjacent to the back gap piece 216, each of the side surfaces having a taper angle $\theta 1$ that makes the sectional shape of the coil turn narrower in the lower part and wider in the upper part.

According to a structure having a taper angle $\theta 1$, the second coil 232 adjacent to the pole piece 212 and the back gap piece 216 can be formed without making a keyhole, and consequently the reliability is improved.

Further, since the second coil 232 is separated from the pole piece 212 and the back gap piece 216 by the insulating film 252 which can become a very thin film of about 0.1 μm in thickness by applying CVD or the like, it is possible to more promote shortening of the yoke length YL.

The upper surfaces of the first coil 231 and the second coil 232 form the same plane. This structure makes it possible to form a common insulating film 254 on the upper surfaces of the first coil 231 and the second coil 232, so an insulating structure of the upper surfaces of the first coil 231 and the second coil 232 is simplified. And this structure makes it possible to form a flat and stable base face on the first coil 231 and the second coil 232 and thereafter form a high-accuracy pattern.

In the illustrated embodiment, the first coil 231 has a taper angle $\theta 2$ making its sectional shape wider in the lower part and narrower in the upper part. Since the second coil 232 fills up the space between coil turns of the first coil 231, insulated from the coil turns of the first coil 231 by the insulating film 252, the second coil 232 has a sectional shape corresponding with that of the first coil 231, and consequently has a taper angle $\theta 3$ ($=\theta 2$) making its sectional shape narrower in the lower part and wider in the upper part. According to this structure, by adopting a process of forming the second coil 232 after forming the first coil 231, it is possible to avoid of occurrence of a keyhole when forming the second coil 232. Consequently, the reliability is improved.

It is preferable that taper angles $\theta 1$, $\theta 2$ and $\theta 3$ are equal to or more than 80 degrees and less than 90 degrees in relation to one surface of the first magnetic film 211 or the insulating film 251. In this case, the first coil 231 is a plating film and is formed on the insulating film 251 formed on one surface of the first magnetic film 211. The second coil 232 is also a plating film and is formed on the insulating film 252 in the space between coil turns of the first coil 231. The insulating film 252 is formed on the bottom face and both side faces of the space.

A protective film 258 covers the whole write element 2. The protective film 258 is made of an inorganic material such as $Al_2O_3$ or $SiO_2$.

In the vicinity of the read element 3, there are provided a first shield film 31, an insulating film 32 and a second shield film 33. The first shield film 31 and the second shield film 33 are made of NiFe or the like. The first shield film 31 is formed on an insulating film 16 made of $Al_2O_3$, $SiO_2$ or the like. The insulating film 16 is formed on a base body 15 made of $Al_2O_3$—TiC or the like.

The read element 3 is provided inside the insulating film 32 between the first shield film 31 and the second shield film 33. The end face of the read element 3 comes out at the ABS 52, 53. The read element 3 includes a giant magnetoresistance effect element (GMR element). The GMR element can be formed of one of a spin valve film and a ferromagnetic tunnel junction element.

Figure 7:
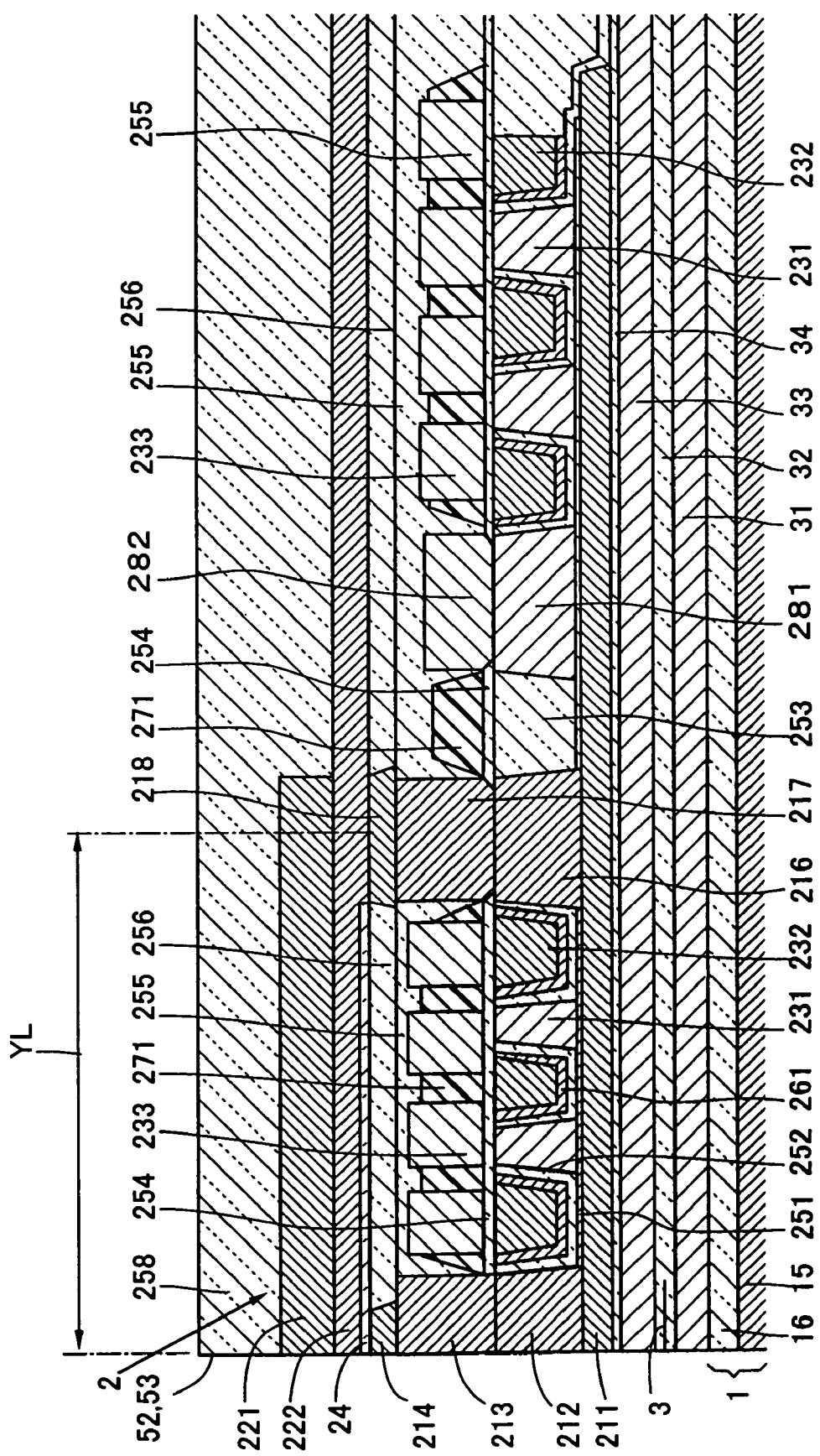
FIG. 7 is a magnified sectional view of another embodiment of an electromagnetic converter portion of a thin film magnetic head according to the present invention.
Figure 8:
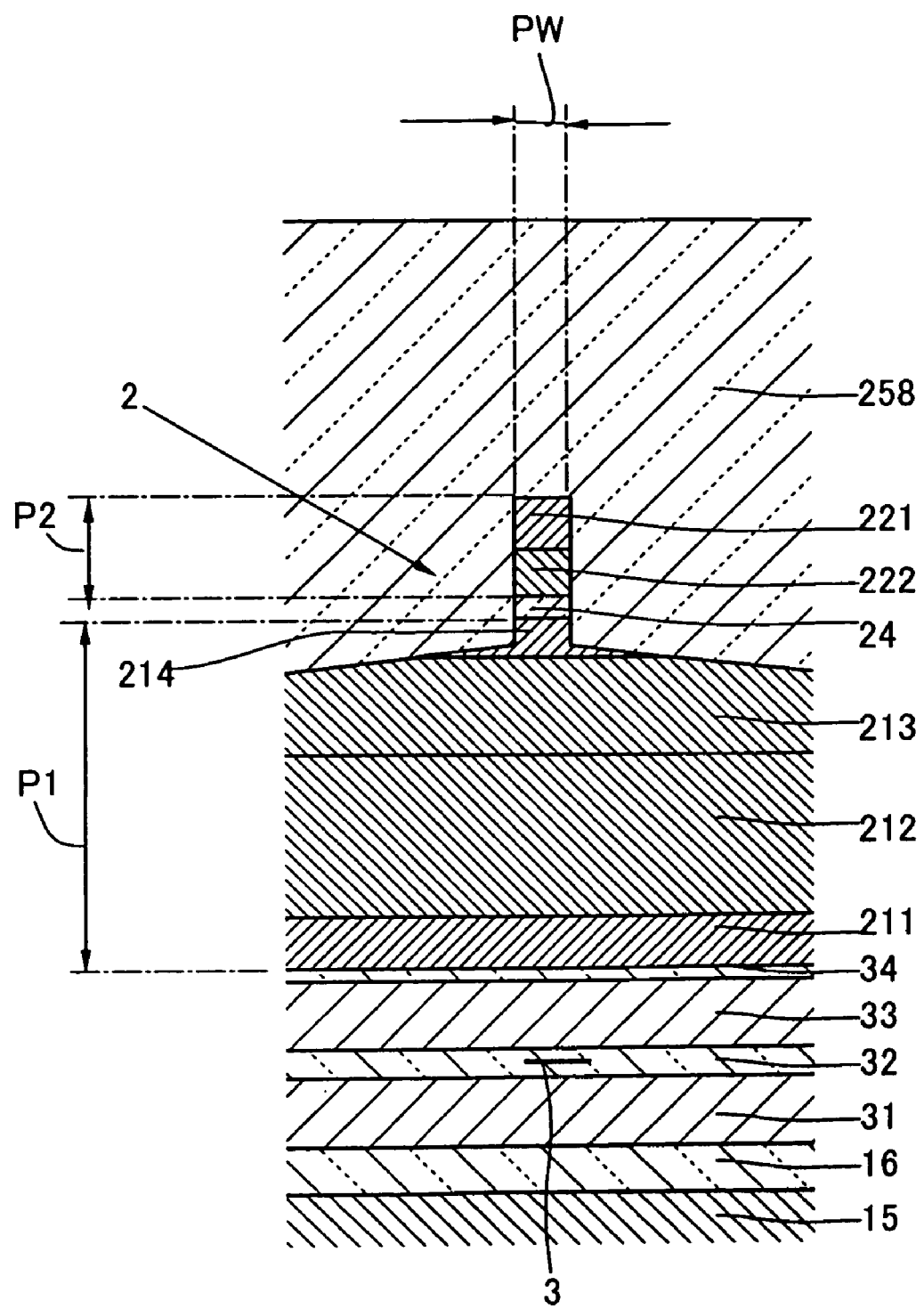
FIG. 8 is a diagram of the electromagnetic converter portion shown in FIG. 7, seen from the ABS side.

Next, another embodiment of a thin film magnetic head according to the present invention is described with reference to FIGS. 7 and 8. In FIGS. 7 and 8, the same components as those shown in FIGS. 1 to 6 are given the same reference symbols. A thin film magnetic head of the illustrated embodiment comprises a first coil 231, a second coil 232 and a third coil 233. The first coil 231 and the second coil 232 have the same structure as the embodiment shown in FIGS. 1 to 6.

The third coil 233 is provided above the first coil 231 and the second coil 232, insulated from the first coil 231 and the second coil 232 by an insulating film 254, and surrounds in a spiral form a back gap piece 217. The third coil 233 is connected in series with the first coil 231 and the second coil 232 so as to generate magnetic flux in the same direction as them. For example, in FIG. 6, the outer end of the third coil 233 is connected to the outer end 283 of the second coil 232, and the coil pattern of the third coil 233 is wound in the same direction as that of the second coil 232, the inner end of the coil pattern being connected to the inner end 281 of the first coil 231.

In the embodiment of FIGS. 7 and 8, the coil turns of the third coil 233 are insulated by an insulating film 271, and the insulating film 271 is covered with an insulating film 255. The insulating film 271 may be made of an organic insulating resin or inorganic insulating resin. The embodiment shows an example with the insulating film 271 made of an organic insulating resin. The insulating film 255 can be made of an inorganic material such as $Al_2O_3$ or $SiO_2$.

In the embodiment of FIGS. 7 and 8, the first coil 231 and the second coil 232 have the same structure as the embodiment shown in FIGS. 1 to 6, so the same advantages are obtained. In addition, by having the additional third coil 233, the number of coil turns is increased and a magneto motive force for a write operation is increased.

Figure 9:
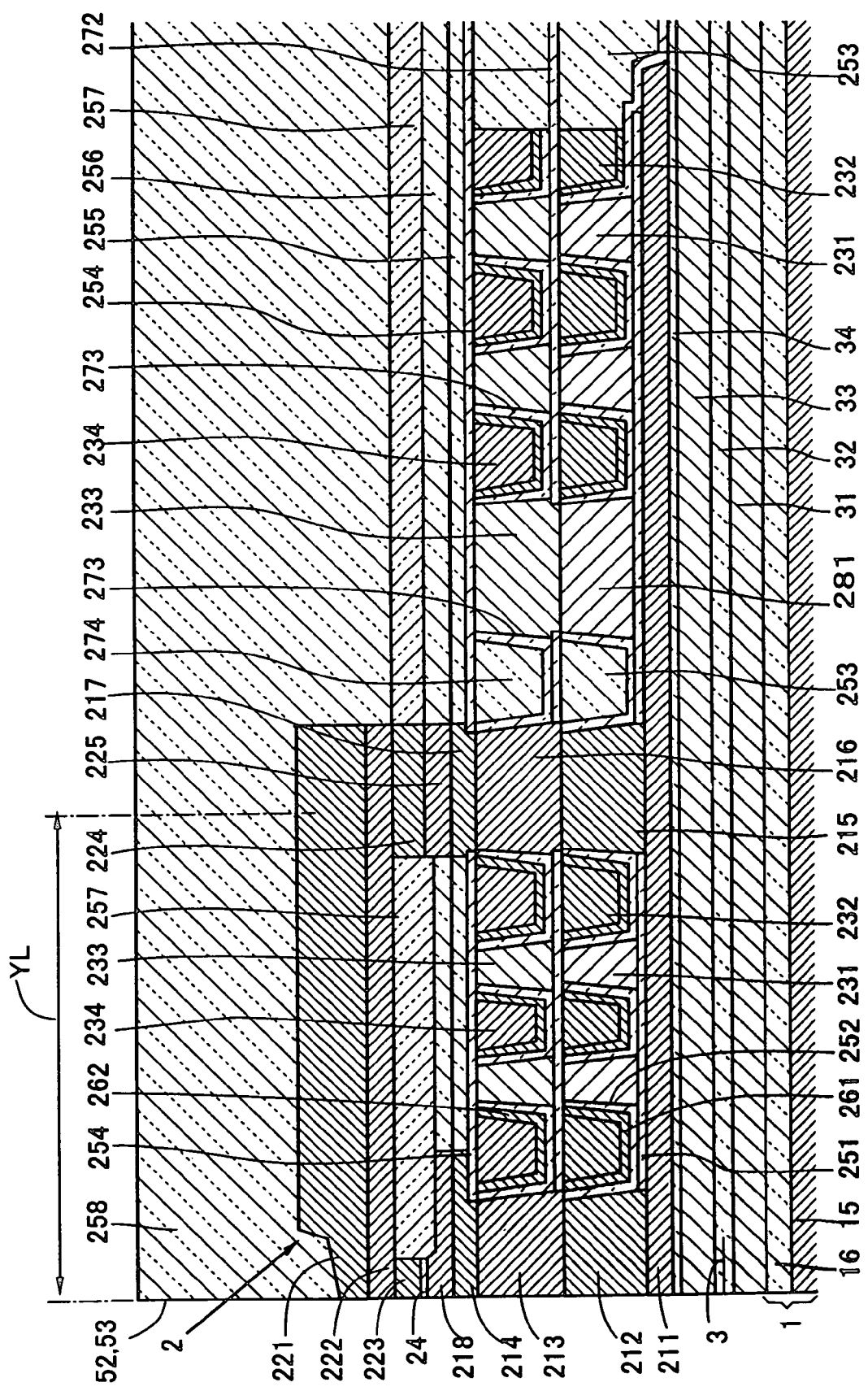
FIG. 9 is a magnified sectional view of a further other embodiment of an electromagnetic converter portion of a thin film magnetic head according to the present invention.
Figure 10:
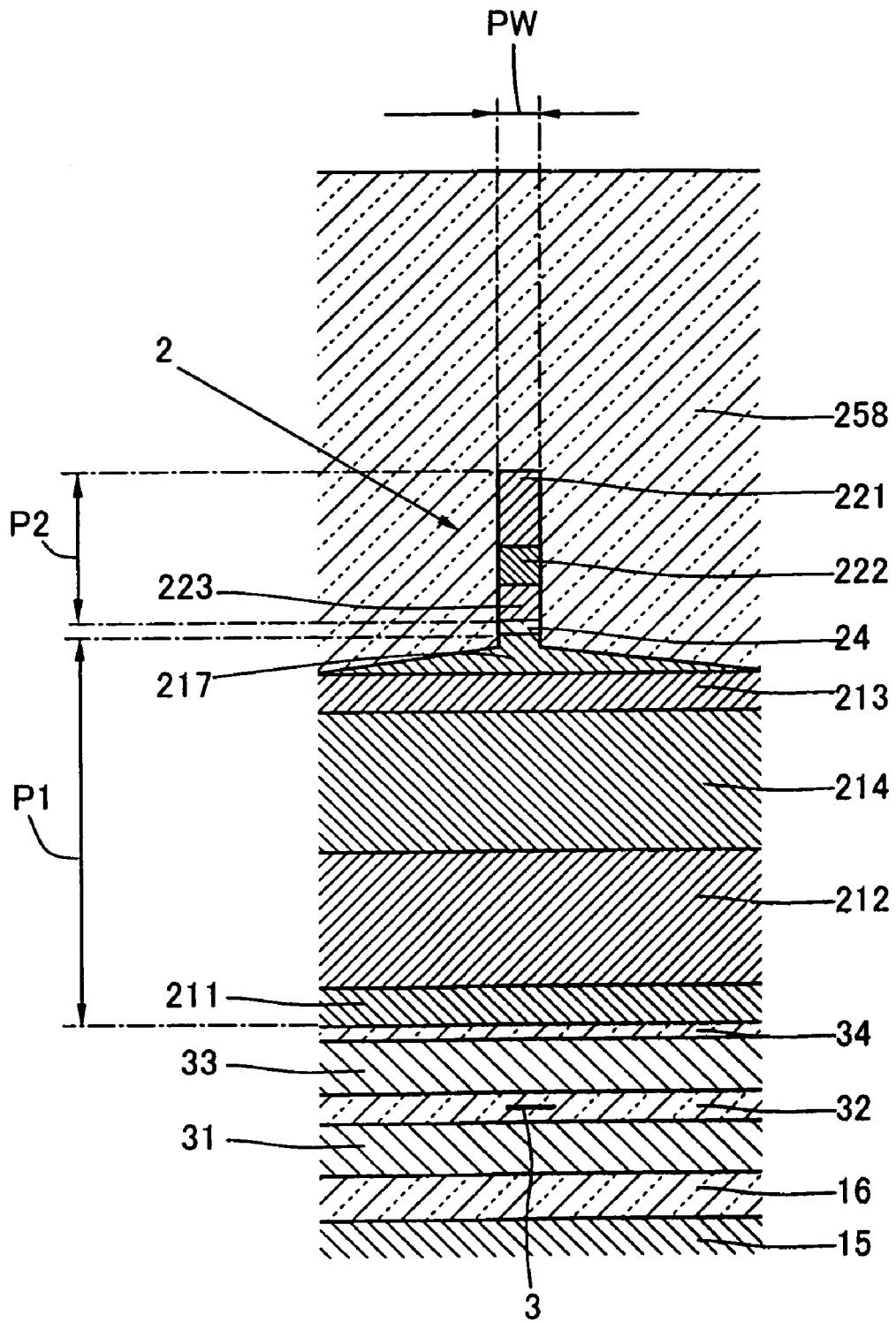
FIG. 10 is a diagram of the electromagnetic converter portion shown in FIG. 9 seen from the ABS side.

Further, another embodiment of a thin film magnetic head according to the present invention is described with reference to FIGS. 9 and 10. In FIGS. 9 and 10, the same components as the components shown in FIGS. 1 to 6 are given the same reference symbols. A thin film magnetic head of the illustrated embodiment comprises a first coil 231, a second coil 232, a third coil 233 and a fourth coil 234. The first coil 231 and the second coil 232 have the same structure as the embodiment shown in FIGS. 1 to 6.

The third coil 233 and the fourth coil 234 are provided above the first coil 231 and the second coil 232, insulated from the first coil 231 and the second coil 232 by an insulating film 272, and surround in a spiral form a back gap piece 216 on the surface of the insulating film 272, and one of them is fitted into the space between coil turns of the other, insulated from the coil turns of the other by an insulating film 273.

In the fourth coil 234, the outermost coil turn of it is adjacent to the first pole portion P1 with the insulating film 273 and the innermost coil turn is adjacent to the back gap piece 216 with the insulating film 273.

In the thin film magnetic head of the above-mentioned aspect, the pole piece 213 forming the first pole portion P1, the back gap piece 217, the third coil 233 and the fourth coil 234 provide the same action and effect as those described with regard to the pole piece 212 forming the first pole portion P1, the back gap piece 216, the first coil 231 and the second coil 232, and additionally the additional third and fourth coils 233 and 234 increases the coil turns, thereby increasing a magneto motive force for a write operation.

In the embodiment illustrated, the fourth coil 234 has a side surface being adjacent to the pole piece 213 of the first pole portion P1 with the insulating film 273, and another side surface being adjacent to the back gap piece 217 with the insulating film 273, each of the side surfaces having a taper angle making the sectional shape of the coil narrower in the lower part and wider in the upper part. According to this structure, since the fourth coil 234 adjacent to the pole piece 213 of the pole portion P1 and the back gap piece 217 can be formed without making a keyhole, the reliability is improved.

Further, since the fourth coil 234 is separated from the pole piece 213 of the pole portion P1 and the back gap piece 217 by the insulating film 273 which can become a very thin film of about 0.1 μm in thickness by applying CVD or the like, it is possible to shorten the yoke length YL, thereby providing improvement in high-frequency characteristic.

As a concrete aspect, the third coil 233 may have a taper angle making its sectional shape wider in the lower part and narrower in the upper part, and the fourth coil 234 may have a taper angle making its sectional shape narrower in the lower part and wider in the upper part.

According to this structure, by adopting a process of forming the fourth coil 234 after forming the third coil 233, it is possible to avoid occurrence of a keyhole when forming the fourth coil 234. Consequently, the reliability is improved.

It is preferable that the taper angles are equal to or more than 80 degrees and less than 90 degrees in relation to one surface of the insulating film 272. In this case, the third coil 233 is a plating film and is formed on the insulating film 272. The fourth coil 234 is also a plating film and is formed on the insulating film 273 formed on the bottom face and both side faces of the space.

2. Method For Manufacturing A Thin Film Magnetic Head

(1) Embodiment 1

Embodiment 1 related to a manufacturing method is a process for manufacturing a thin film magnetic head of the first aspect having the first coil 231 and the second coil 232 (FIGS. 1 to 6). It is notified in advance that processes illustrated in FIGS. 11 to 44 are performed on a wafer.

Figure 11:
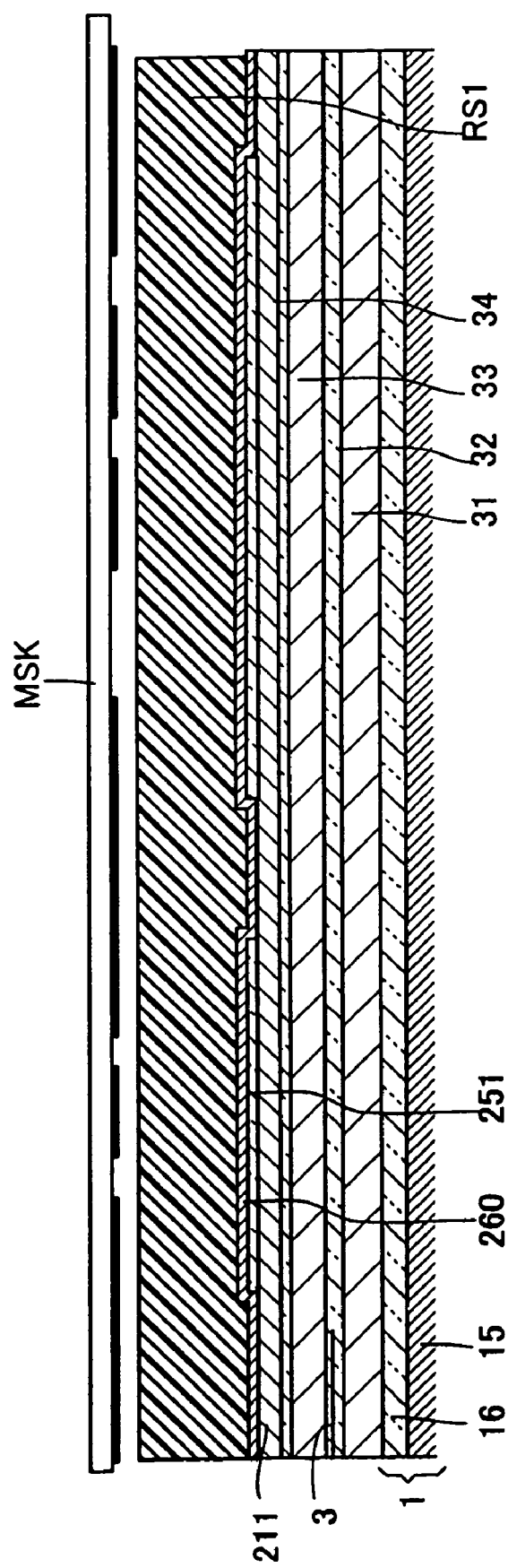
FIG. 11 is a diagram showing a process of manufacturing a thin film magnetic head having the electromagnetic converter portion shown in FIGS. 3 to 6.

First, referring to FIG. 11, on an insulating film 16 deposited on a base body 15 there are formed a first shield film 31, a read element 3, an insulating film 32, a second shield film 33, an insulating film 34 and a first magnetic film 211 by means of publicly known processes. After that, an insulating film 251 is formed on the flat surface of the first magnetic film 211, the insulating film 251 having an area slightly larger than an area necessary for forming a coil. On the surface of the insulating film 251 there is formed a seed film 260. The seed film 260 is formed so as to cover the surface of the insulating film 251 and the surface of the first magnetic film 211. The seed film 260 is made of a material suitable for a Cu-plating ground, formed 50 nm to 80 nm thick by a Cu-CVD process.

Next, a photoresist film RS1 is formed on the seed film 260 by applying a spin coat method or the like, and then is exposed with a mask MSK having a coil pattern and developed. The photoresist film RS1 may be either positive photoresist or negative photoresist. In the embodiment, the case of using a positive photoresist is described as an example.

In the above-mentioned photolithography process, the depth of focus of an exposure system (stepping projection aligner) is adjusted to be minus-focused, namely, positioned below the seed film. Due to this, the photoresist film RS1 is exposed in such a manner that a wider area is exposed in the lower part of it and a narrower area is exposed in the upper part. The minus focus is set to be in the range of 0 to 0.5 μm or the range of 0 to 1.2 μm, in relation to the surface of the seed film 260.

Figure 12:
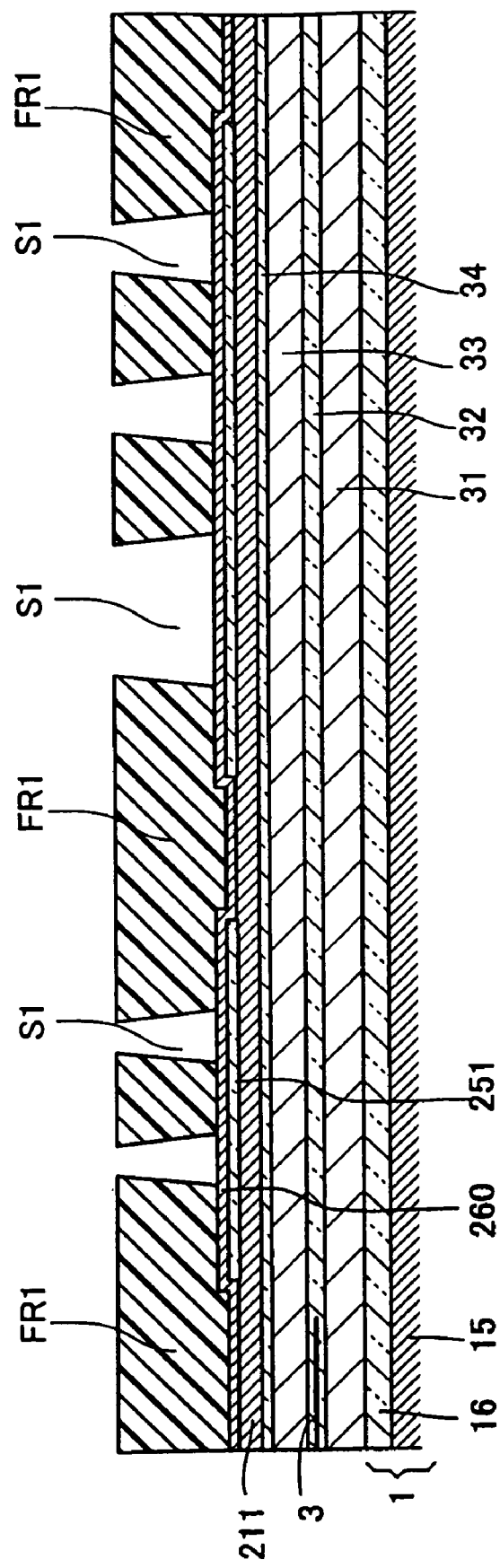
FIG. 12 is a diagram showing a process after the process shown in FIG. 11.

By the above-mentioned exposure process and the following development process, a coil forming pattern S1 which is wider in the lower part and narrower in the upper part is obtained as shown in FIG. 12. The coil forming pattern S1 is defined by a resist frame FR1.

Figure 13:
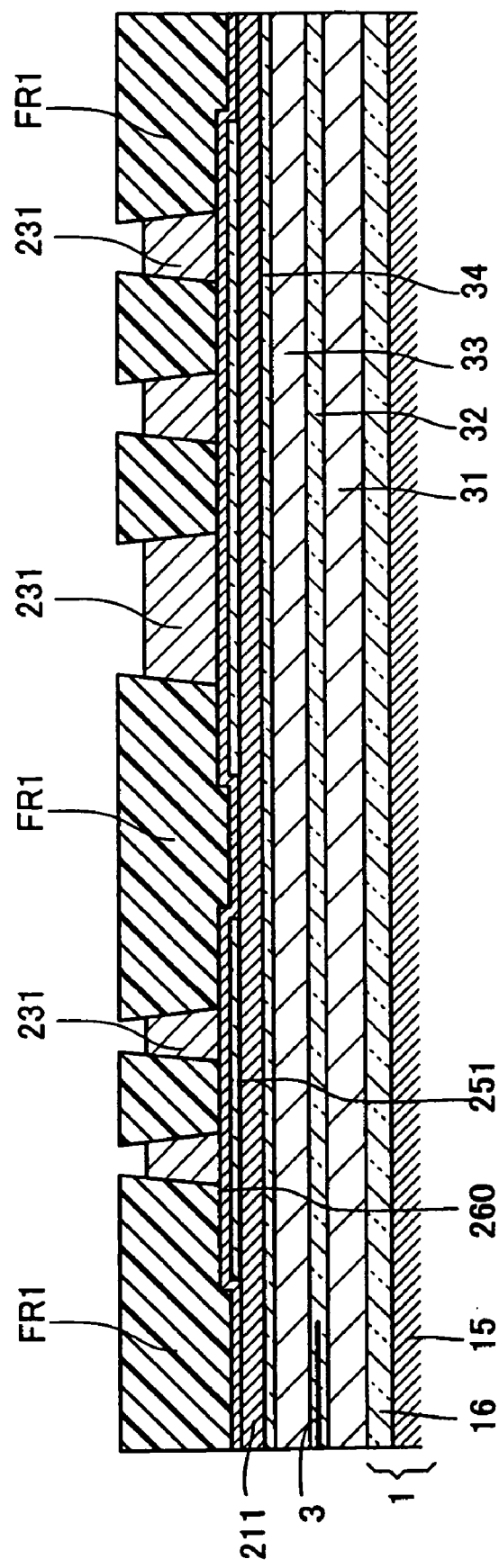
FIG. 13 is a diagram showing a process after the process shown in FIG. 12.

Next, a selective Cu-plating process is performed, and thus a first coil 231 is grown 3 to 3.5 μm thick on the seed film 260 present inside the coil forming pattern S1. The first coil 231 is formed so that its sectional shape is wider in the lower part and narrower in the upper part, corresponding to the shape of the coil forming pattern S1. FIG. 13 shows a state in which the above-mentioned selective Cu-plating process has been performed.

Next, the resist frame FR1 is removed by means of chemical etching or the like, and after that a photolithography process for forming a pole piece and back gap piece is performed so that a resist frame for forming a pole piece and a back gap piece is formed. In this photolithography process, the depth of focus of an exposure system is adjusted to be minus-focused, namely, positioned below the first magnetic film 211. Due to this, the photoresist film RS1 is exposed in such a manner that a wider area is exposed in the lower part of it and a narrower area is exposed in the upper part.

Figure 14:
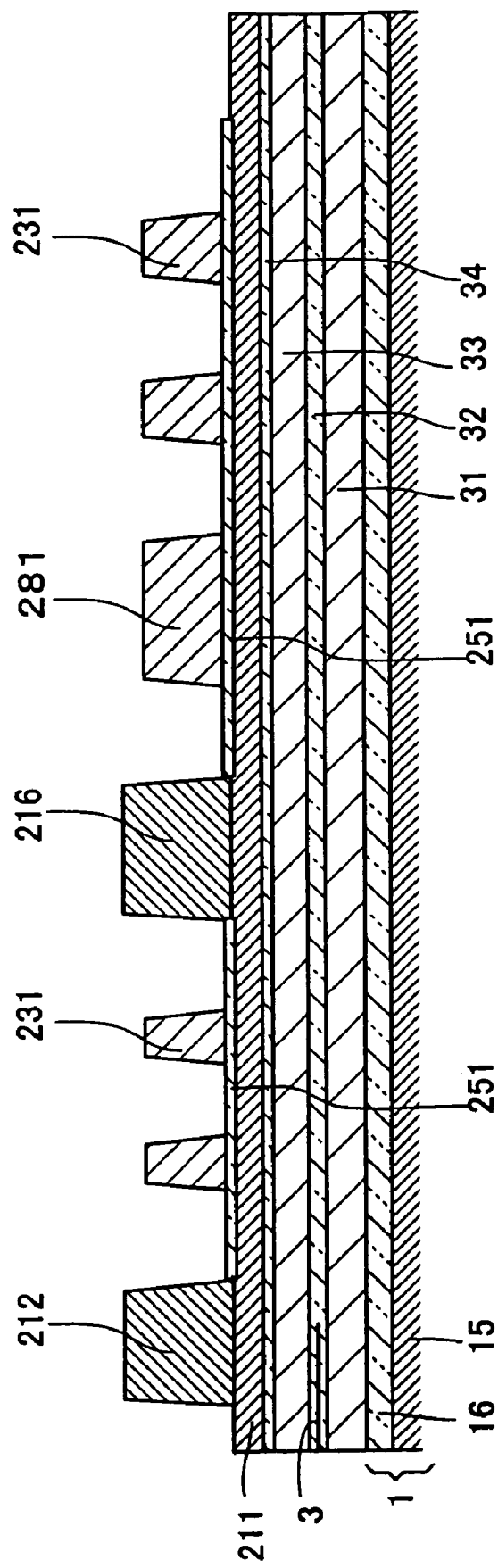
FIG. 14 is a diagram showing a process after the process shown in FIG. 13.

Next, a selective plating process is performed, and thus a pole piece and a back gap piece are grown on the first magnetic film 211. After that, the resist frame is removed by means of chemical etching or the like. Consequently, as shown in FIG. 14, a pole piece 212 and a back gap piece 216 are formed with a space between them on one surface of the first magnetic film 211. The pole piece 212 and the back gap piece 216 each are formed so that its sectional shape is wider in the lower part and narrower in the upper part. It is also possible to apply an ion beam etching process to form the pole piece 212 and the back gap piece 216 each having sectional shape that is wider in the lower part and narrower in the upper part.

Figure 15:
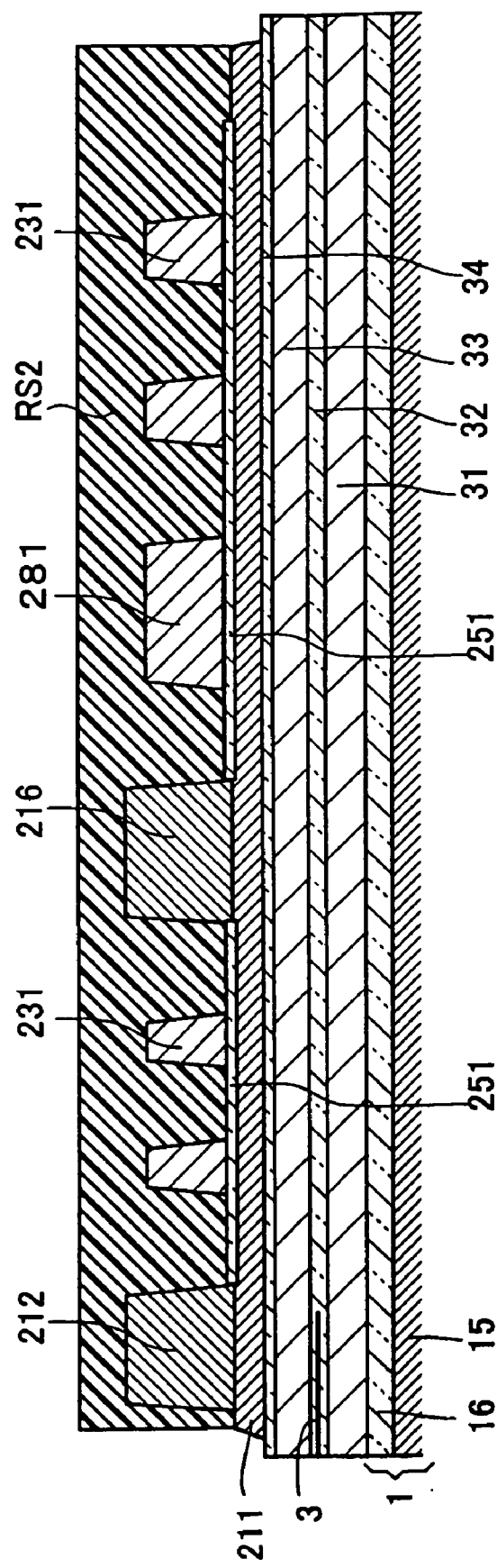
FIG. 15 is a diagram showing a process after the process shown in FIG. 14.
Figure 16:
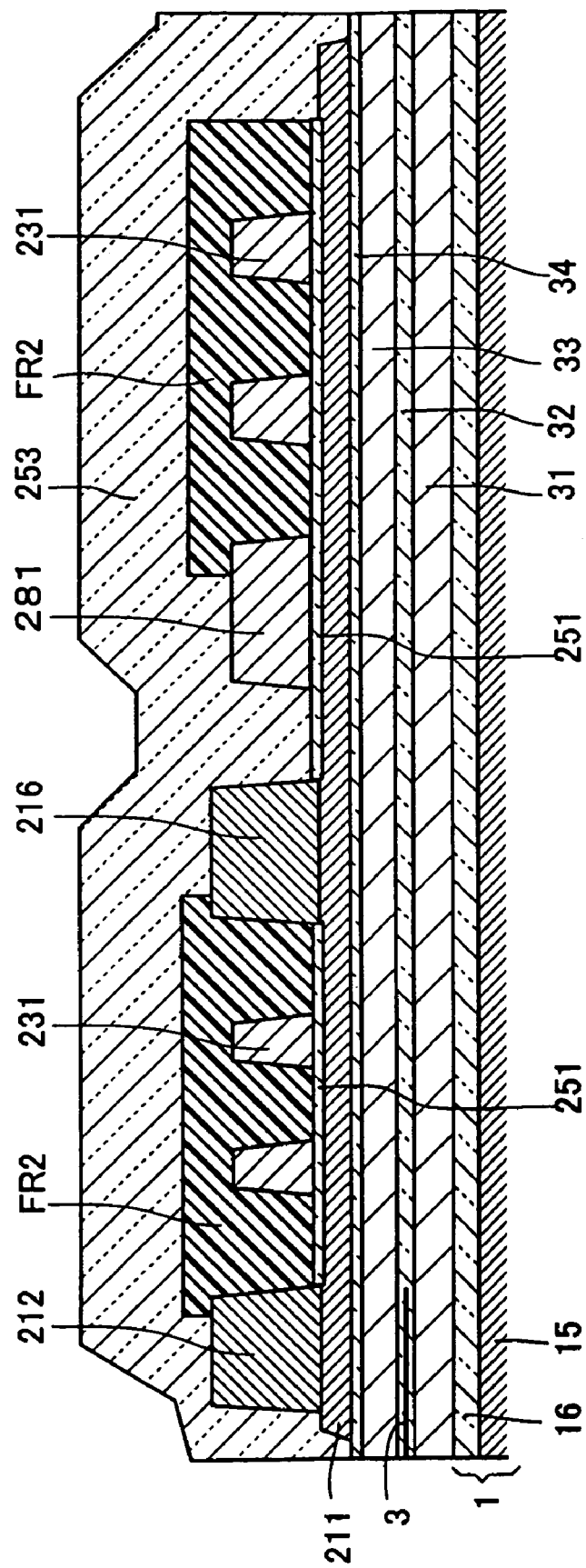
FIG. 16 is a diagram showing a process after the process shown in FIG. 15.

Next, as shown in FIG. 15, a photoresist film RS2 covering the first coil 231, the pole piece 212 and the back gap piece 216 is formed. After that, a photolithography process is performed on the photoresist film RS2 so that a resist cover FR2 covering the first coil and its periphery is formed as shown FIG. 16. In addition, an insulating film 253 covering the whole resist cover FR2 is deposited. The insulating film 253 is formed 4 to 5 µm thick.

Figure 17:
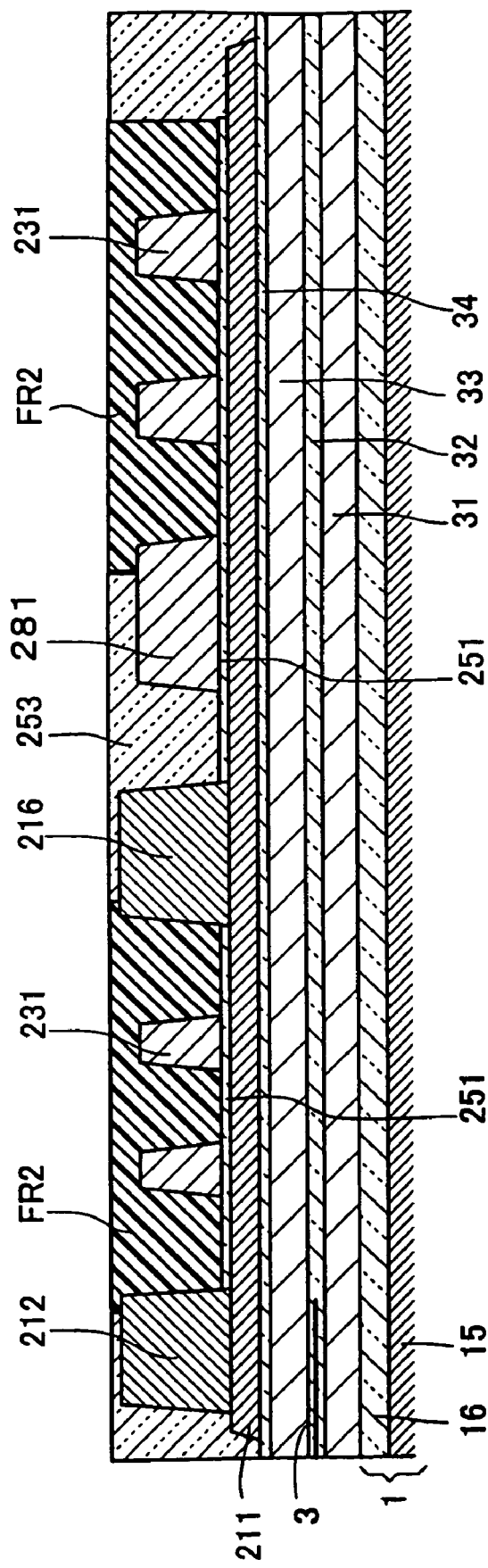
FIG. 17 is a diagram showing a process after the process shown in FIG. 16.

Next, the insulating film 253 and the resist cover FR2 are polished by chemical mechanical polishing (hereinafter, referred to as CMP) to be flattened. Alumina-based slurry is used in CMP. FIG. 17 shows a state in which the CMP process has been performed.

Figure 18:
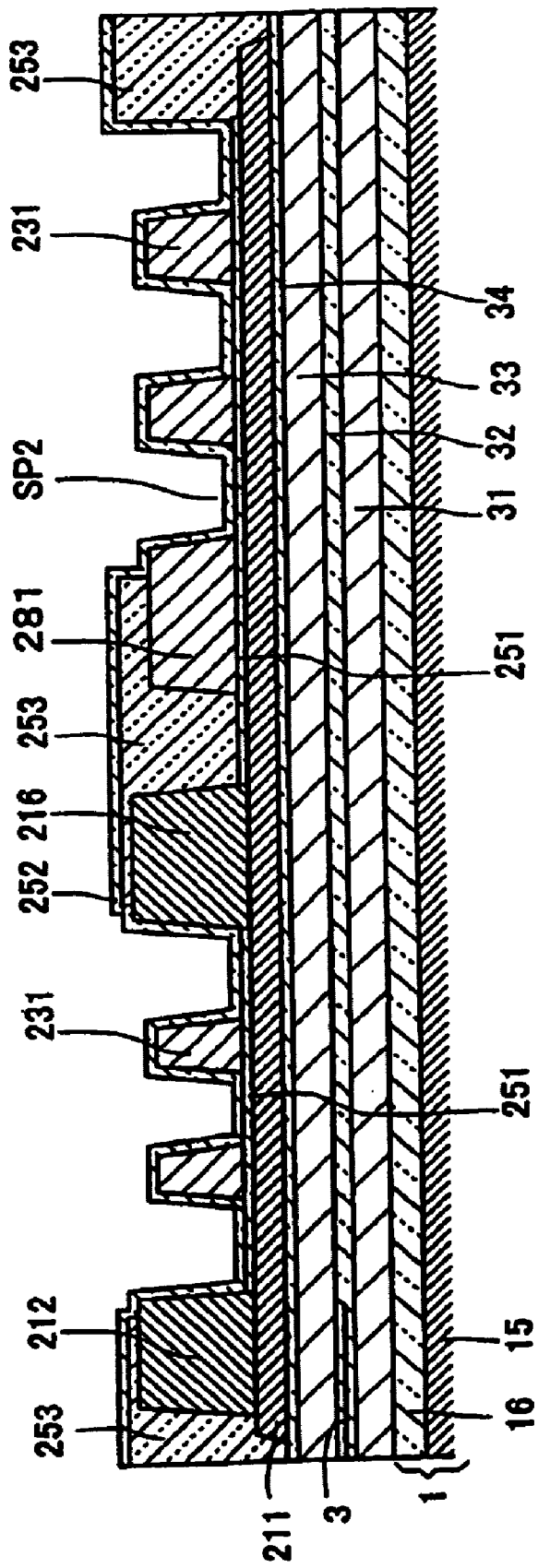
FIG. 18 is a diagram showing a process after the process shown in FIG. 17.

Next, the resist cover FR2 is removed and after that, as shown in FIG. 18, an insulating film 252 is deposited on the surfaces and side faces of the insulating films 251 and 253, the first coil 231, the pole piece 212 and the back gap piece 216. Concretely, the insulating film 252 is formed about 0.1 µm in thickness by an $Al_2O_3$-CVD process.

Figure 19:
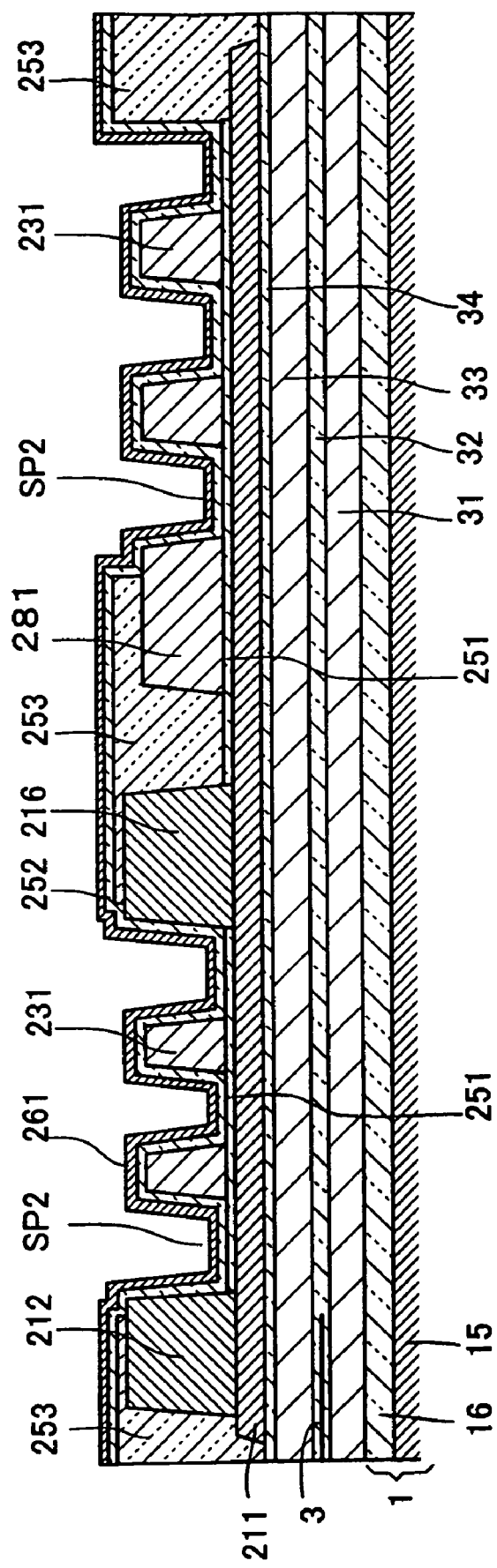
FIG. 19 is a diagram showing a process after the process shown in FIG. 18.

Next, as shown in FIG. 19, a seed film 261 is deposited 0.05 to 0.1 µm thick on the surface of the insulating film 252 by a Cu-CVD process.

Figure 20:
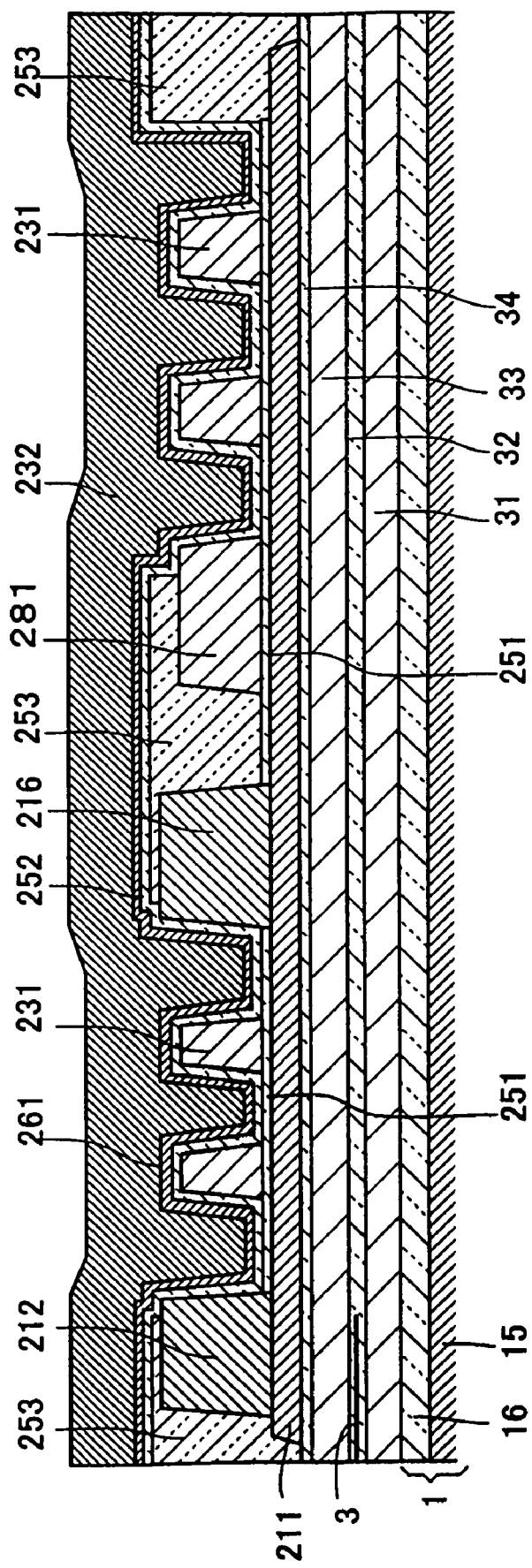
FIG. 20 is a diagram showing a process after the process shown in FIG. 19.

Next, as shown in FIG. 20, a plating film 232 to become a second coil is formed 5 µm thick on the seed film 261. The plating film 232 comprises Cu as its main constituent.

Figure 21:
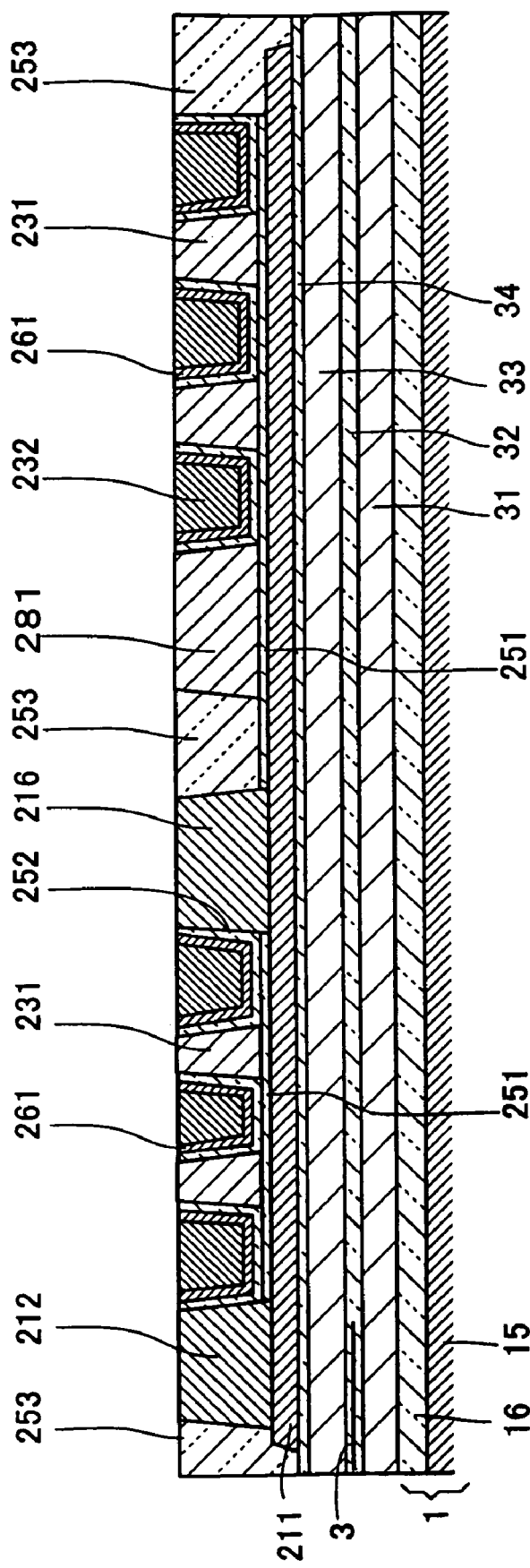
FIG. 21 is a diagram showing a process after the process shown in FIG. 20.

Next, as shown in FIG. 21, the plating film 232 is polished by CMP to be flattened. Alumina-based slurry is used in the CMP. Consequently, the second coil 232 of a flat spiral pattern is obtained, insulated from the first coil 231 by the insulating film 252. In CMP, the surfaces of the pole piece 212, the back gap piece 216 and the insulating film 253 are also polished so as to form the same plane as the surfaces of the first coil 231 and the second coil 232.

Figure 22:
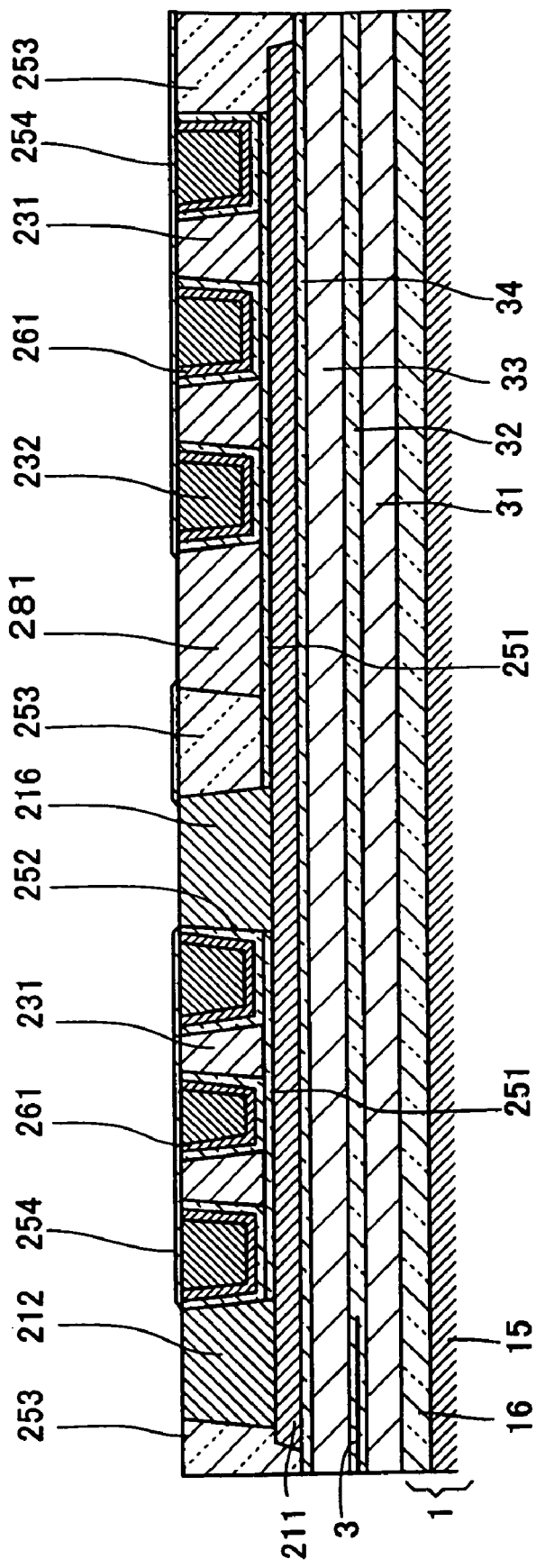
FIG. 22 is a diagram showing a process after the process shown in FIG. 21.
Figure 23:
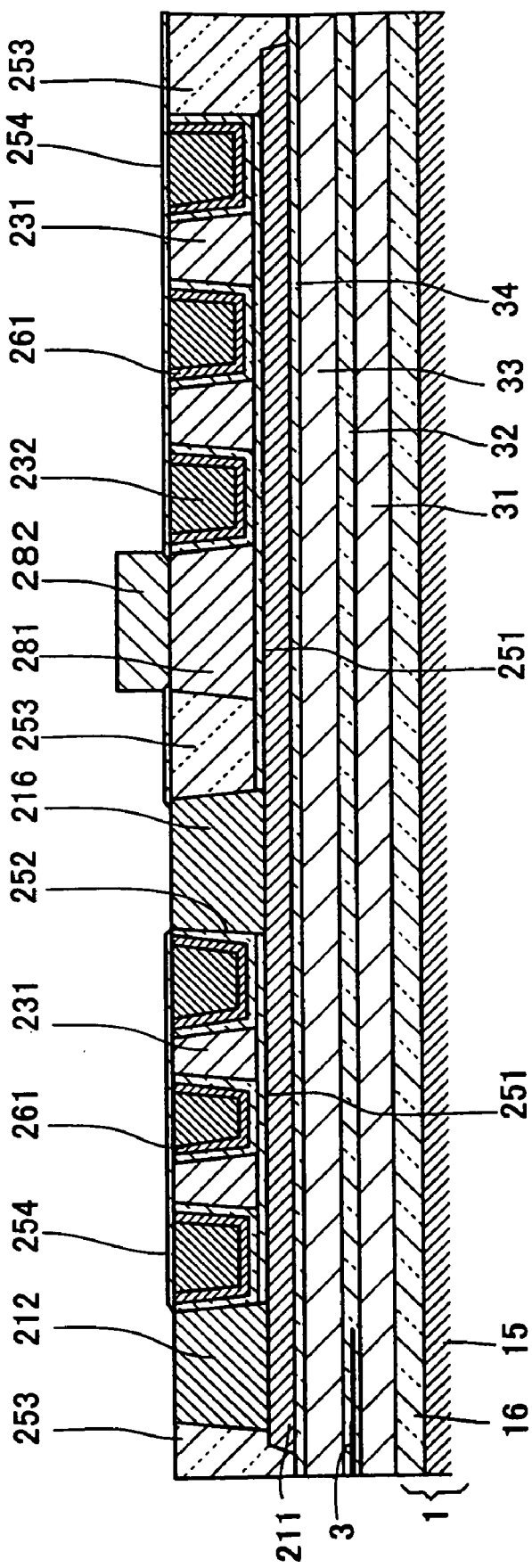
FIG. 23 is a diagram showing a process after the process shown in FIG. 22.

Next, as shown in FIG. 22, an insulating film 254 covering the surfaces of the first coil 231 and the second coil 232 is deposited. The insulating film 254 is made of $Al_2O_3$, formed 0.2 µm thick, for example.

Next, a photolithography process is performed on one surface where the insulating film 254 has been formed, so that a resist frame for forming a connecting conductor 282 for connecting the inner end 281 of the first coil 231 with the outer end 283 of the second coil 232 (see FIG. 6) is formed. According to a pattern defined by the resist frame thus obtained, the connecting conductor 282 is formed by a frame plating method. Its thickness is 1.0 to 1.8 µm, for example.

Figure 24:
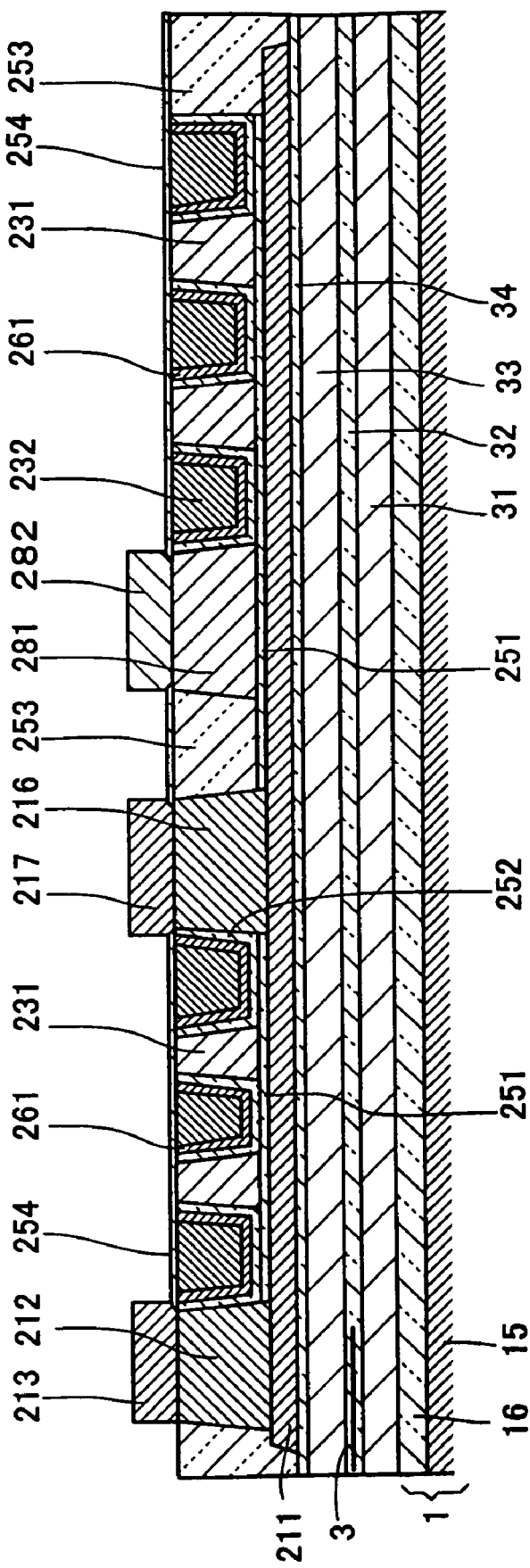
FIG. 24 is a diagram showing a process after the process shown in FIG. 23.

Next, a photolithography process is performed on one surface where the connecting conductor 282 has been formed, so that a resist frame for forming a pole piece 213 and a back gap piece 217 (see FIG. 7) is formed. According to a pattern defined by the resist frame thus obtained, the pole piece 213 and the back gap piece 217 are formed by a frame plating method as shown in FIG. 24. After the pole piece 213 and the back gap piece 217 are formed, the resist frame is removed. FIG. 24 shows a state in which the resist frame has been removed. The pole piece 213 and the back gap piece 217 each are a plating film of CoFe or CoNiFe and are 1 to 2 µm thick, for example.

Figure 25:
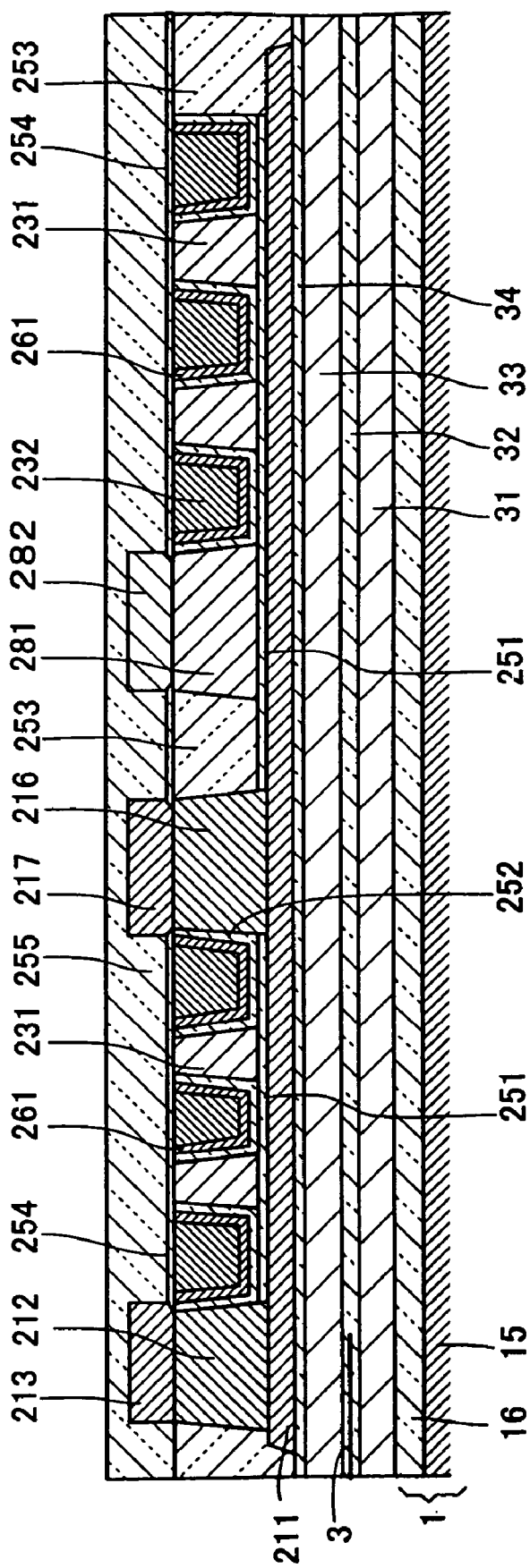
FIG. 25 is a diagram showing a process after the process shown in FIG. 24.
Figure 26:
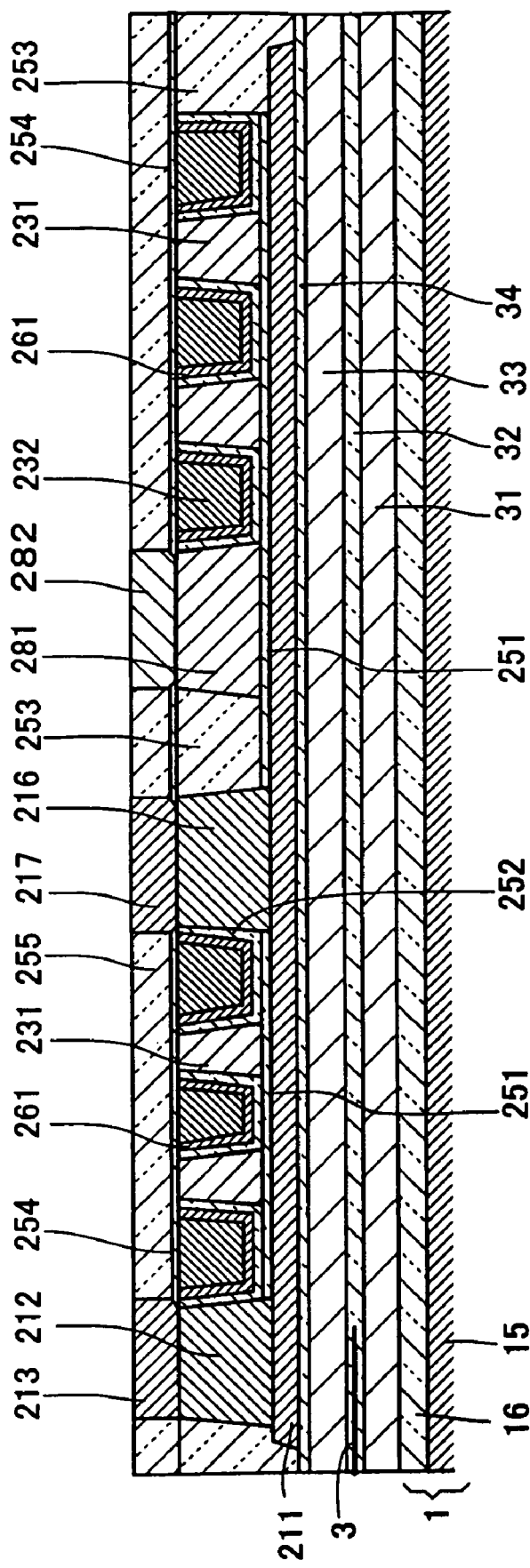
FIG. 26 is a diagram showing a process after the process shown in FIG. 25.

Next, as shown in FIG. 25, an insulating film 255 of $Al_2O_3$ is deposited on the surface where the pole piece 213 and the back gap piece 217 have been formed, the insulating film 255 being 2 to 3 µm thick, for example. After that, as shown in FIG. 26, the surfaces of the insulating film 255, the pole piece 213, the back gap piece 217 and the connecting conductor 282 are polished by CMP. This CMP is performed so that the pole piece 213 and the back gap piece 217 are 0.2 to 0.6 µm thick, for example.

Figure 27:
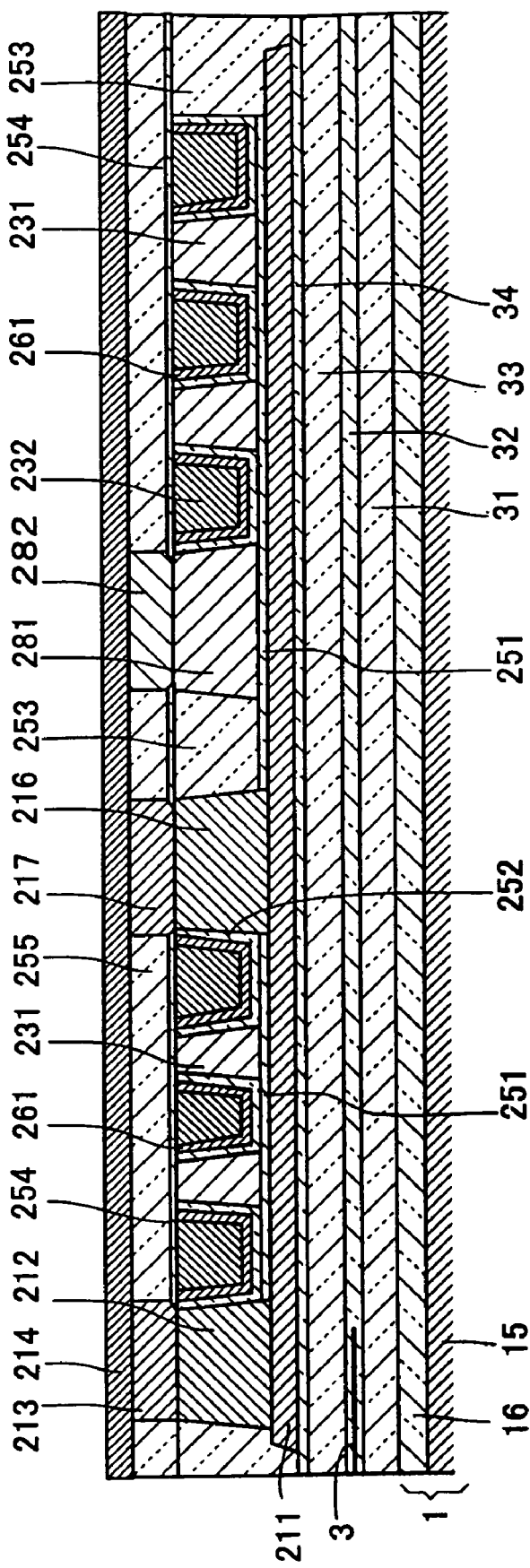
FIG. 27 is a diagram showing a process after the process shown in FIG. 26.

Next, as shown in FIG. 27, a magnetic film 214 for forming a pole piece 214 (see FIG. 3) is formed 0.5 µm thick on the polished surfaces of the insulating film 255, the pole piece 213 and the back gap piece 217.

Figure 28:
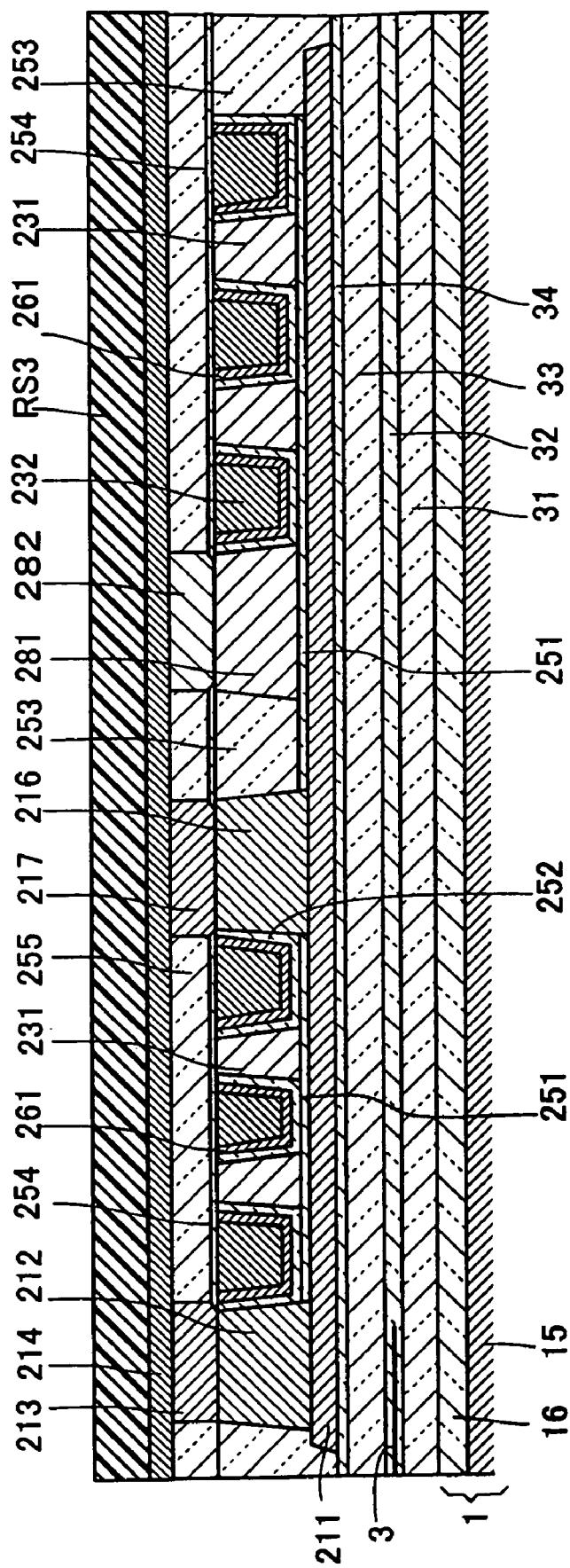
FIG. 28 is a diagram showing a process after the process shown in FIG. 27.
Figure 29:
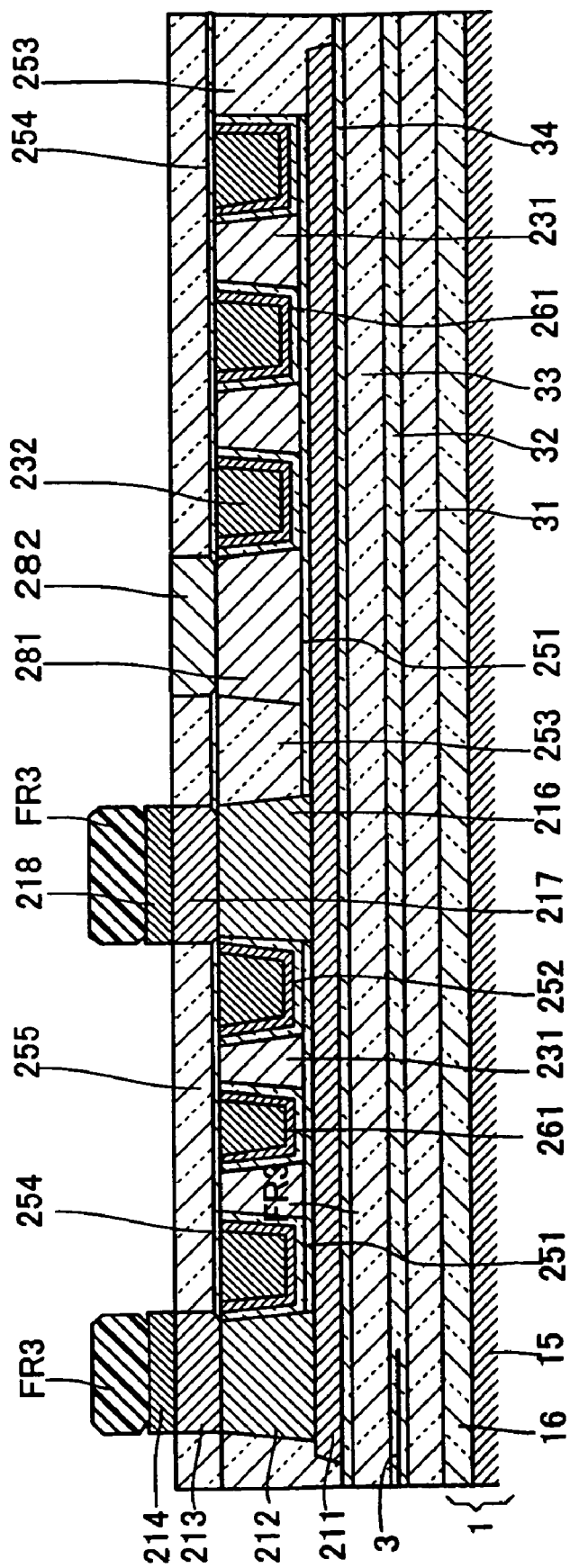
FIG. 29 is a diagram showing a process after the process shown in FIG. 28.

The magnetic film 214 can be made of CoFeN. Next, as shown in FIG. 28, a photoresist film RS3 is formed on the surface of the magnetic film 214 and then a photolithography process is performed. In this photolithography process, as shown in FIG. 29, the photoresist film RS3 is patterned so that a T-shaped resist cover FR3 is left in the areas where a pole piece 213 and a back gap piece 217 are to be formed. After that, an ion beam etching process is performed using the resist cover FR3 as a mask so that the magnetic film 214 is patterned. Consequently, the pole piece 214 and the back gap piece 218 are formed as shown in FIG. 29.

Figure 30:
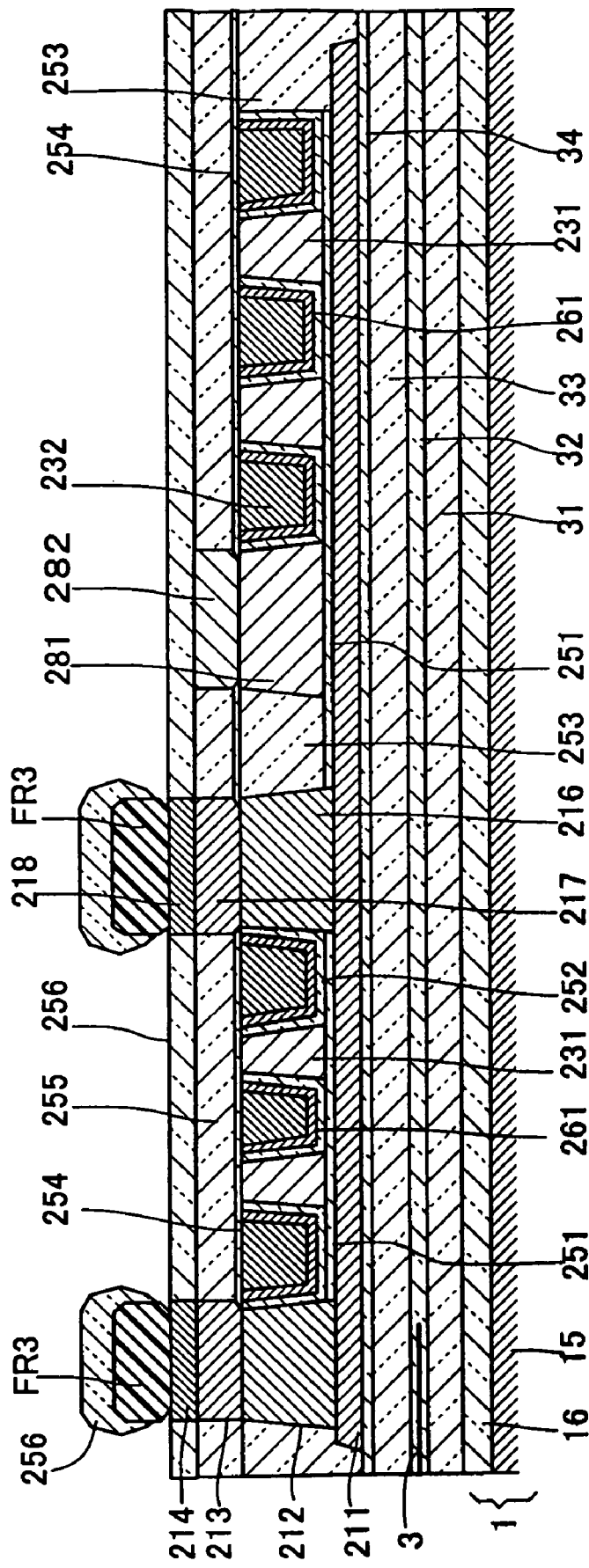
FIG. 30 is a diagram showing a process after the process shown in FIG. 29.
Figure 31:
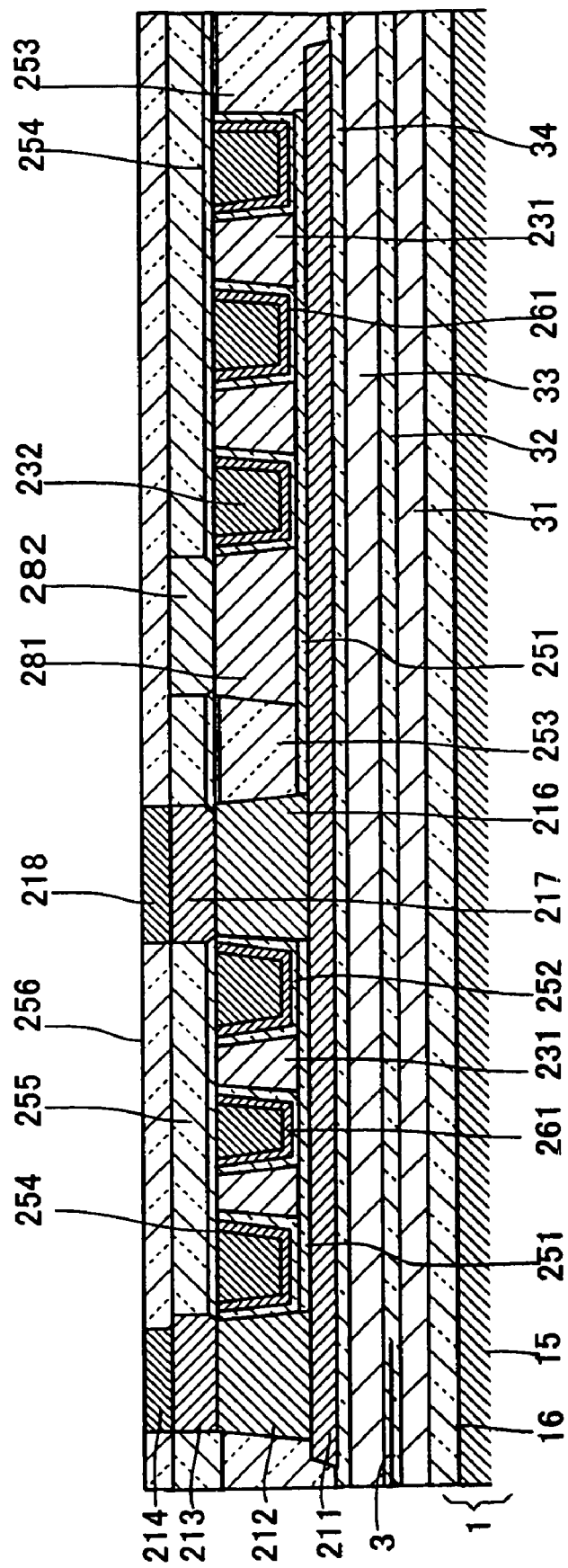
FIG. 31 is a diagram showing a process after the process shown in FIG. 30.

Next, as shown in FIG. 30, an insulating film 256 of $Al_2O_3$ is deposited 0.6 µm thick by means of sputtering or the like. After that, the resist cover FR3 on the pole piece 214 and the back gap piece 218 is removed and, as shown in FIG. 31, the surfaces of the insulating film 256, the pole piece 214 and the back gap piece 218 are polished by CMP to be flattened more completely. This CMP is performed by such a small degree as to produce a polishing quantity of 0.03 to 0.05 µm in thickness, for example.

Figure 32:
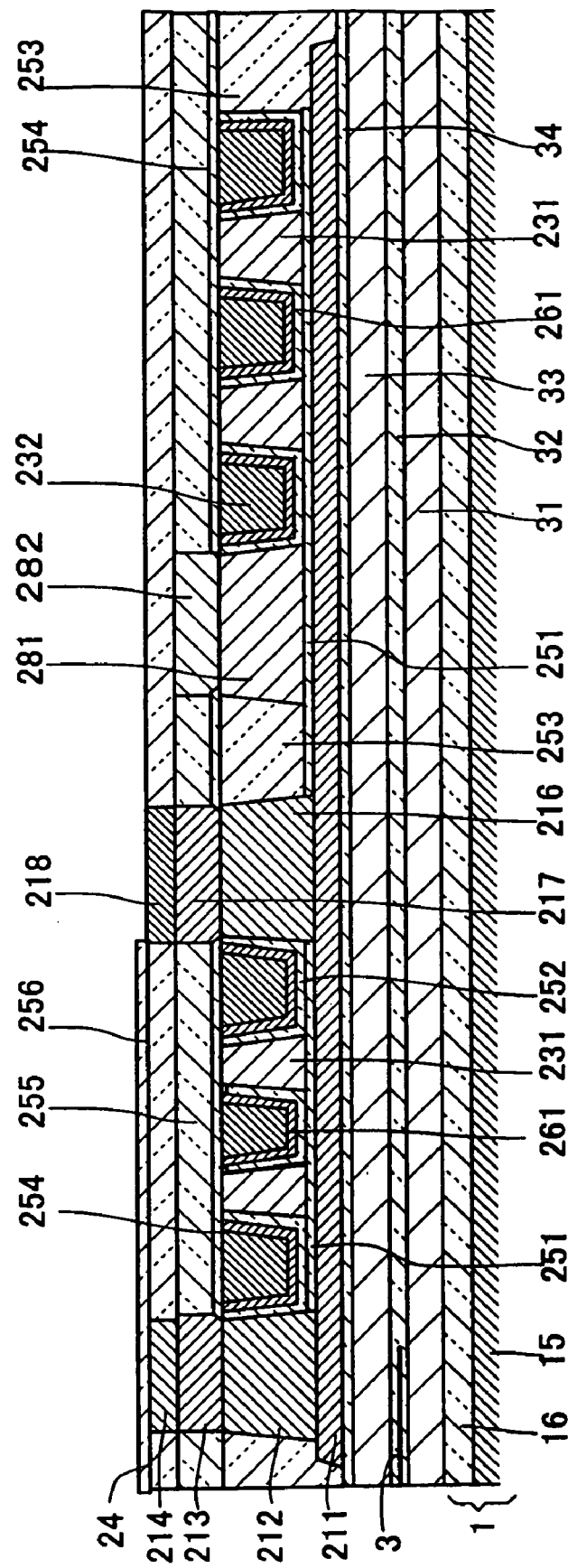
FIG. 32 is a diagram showing a process after the process shown in FIG. 31.

Next, as shown in FIG. 32, a patterned gap film 24 is formed on the flattened surface of the pole piece 214 and the flattened surface of the insulating film 256. The gap film 24 is made of a non-magnetic material such as $Al_2O_3$, Ru, NiCu or Ta, formed 0.1 µm thick, for example.

Figure 33:
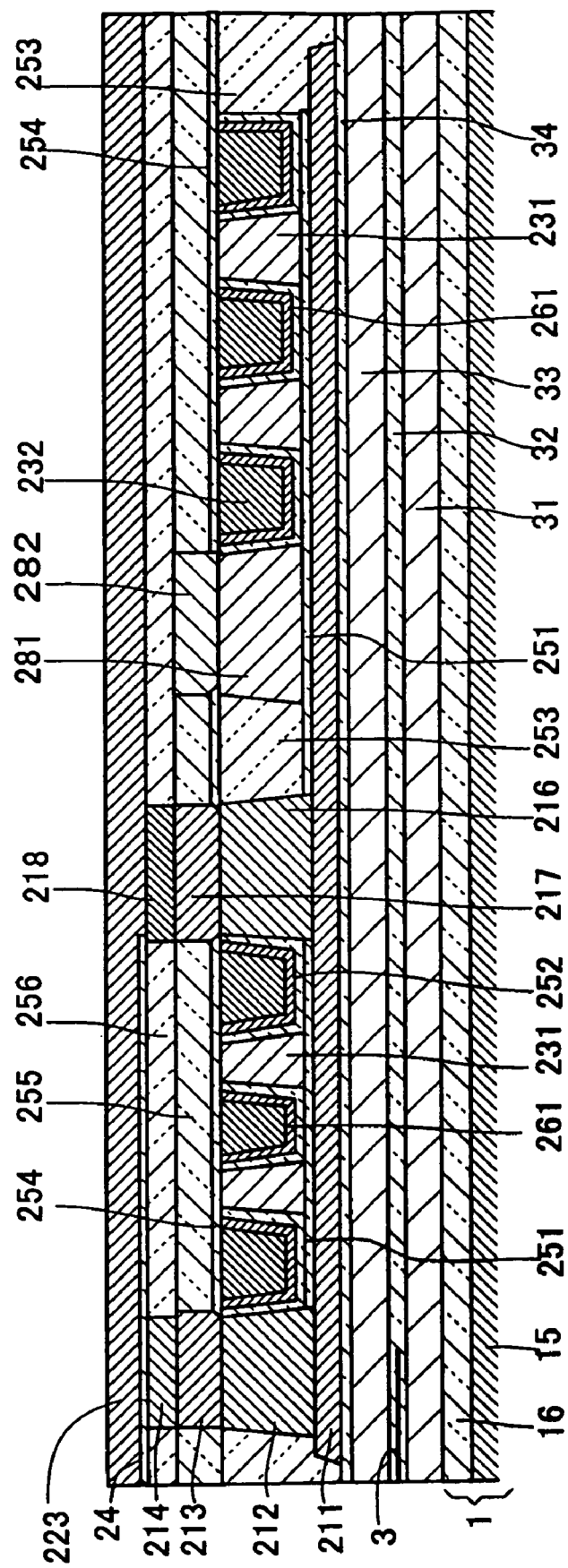
FIG. 33 is a diagram showing a process after the process shown in FIG. 32.

Next, as shown in FIG. 33, a magnetic film 223 is deposited so as to cover the surfaces of the gap film 24, the back gap piece 218 and the insulating film 256. The magnetic film 223, which is for forming a pole piece 223 and a back gap piece 224, is made of a magnetic material such as CoFeN, formed 0.2 to 0.6 µm thick, for example.

Figure 34:
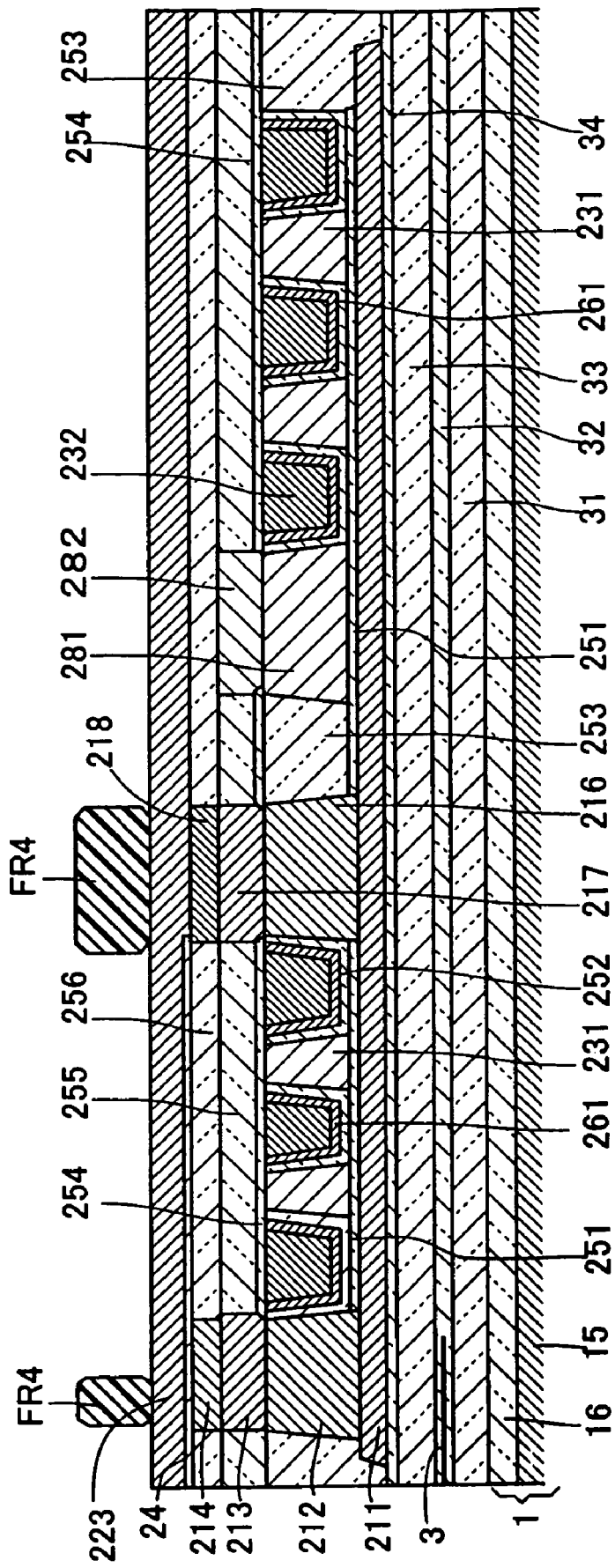
FIG. 34 is a diagram showing a process after the process shown in FIG. 33.
Figure 35:
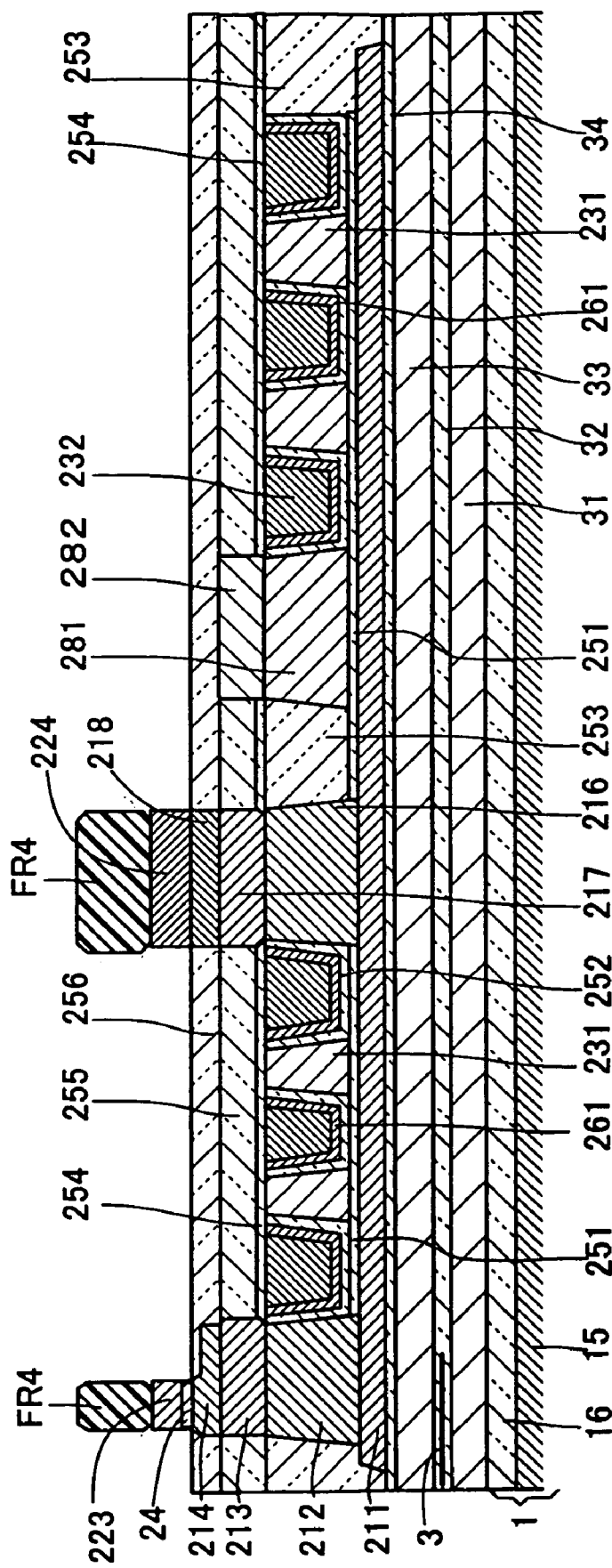
FIG. 35 is a diagram showing a process after the process shown in FIG. 34.
Figure 36:
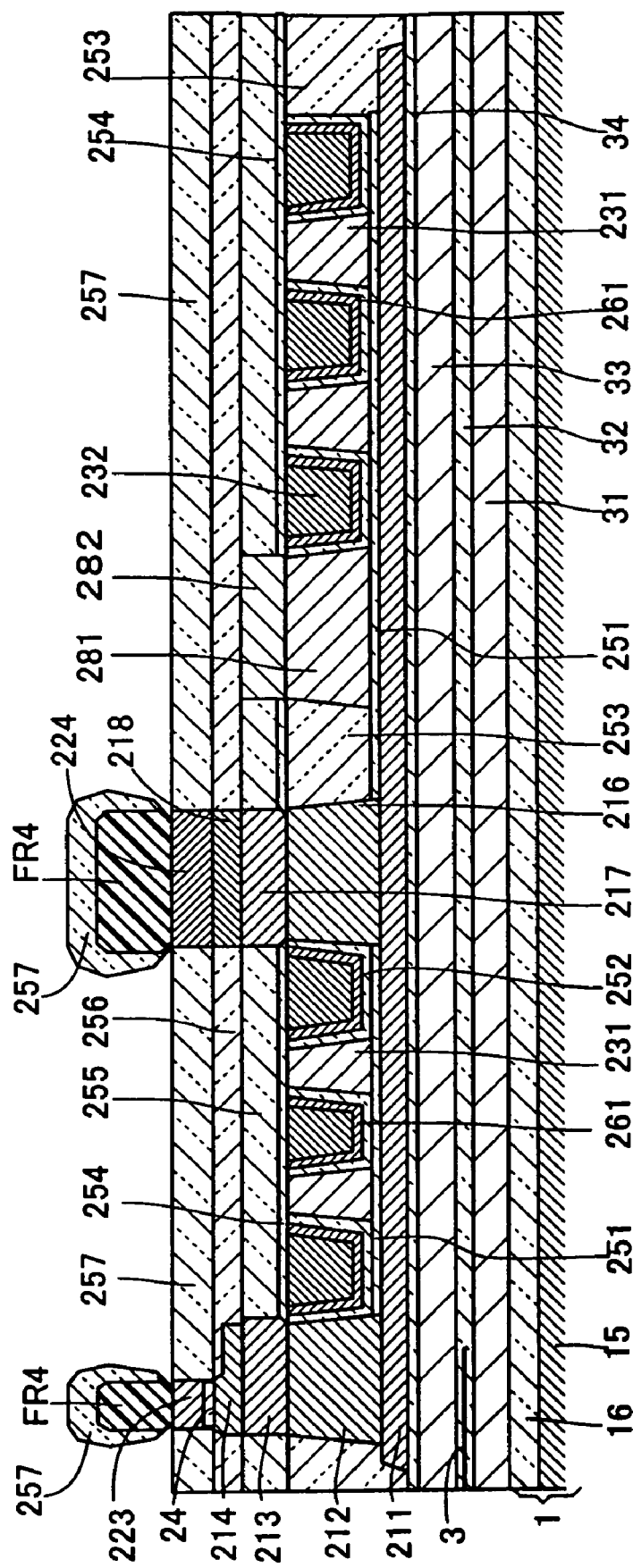
FIG. 36 is a diagram showing a process after the process shown in FIG. 35.

Next, as shown in FIG. 34, a T-shaped resist cover FR4 is formed on the surface of the magnetic film 223 by a photolithography process. The resist cover FR4 is formed so as to be positioned above the pole pieces 212 to 214 and the back gap pieces 216 to 218. After that, an ion beam etching process (IBE process) is performed so that shaped patterns of a pole piece 223, a gap film 24 and a back gap piece 224 are obtained as shown in FIG. 35. This IBE process can be performed by applying ion beams, for example, at 0 degree and 75 degrees so that the pole piece 223 is etched by a depth of 0.3 to 0.6 µm, and further etched to expose the gap film 24 or to expose the pole piece 214 positioned under the gap film 24. After that, as shown in FIG. 36, an insulating film 257 is deposited so as to fill up the depth that has been etched by IBE.

Figure 37:
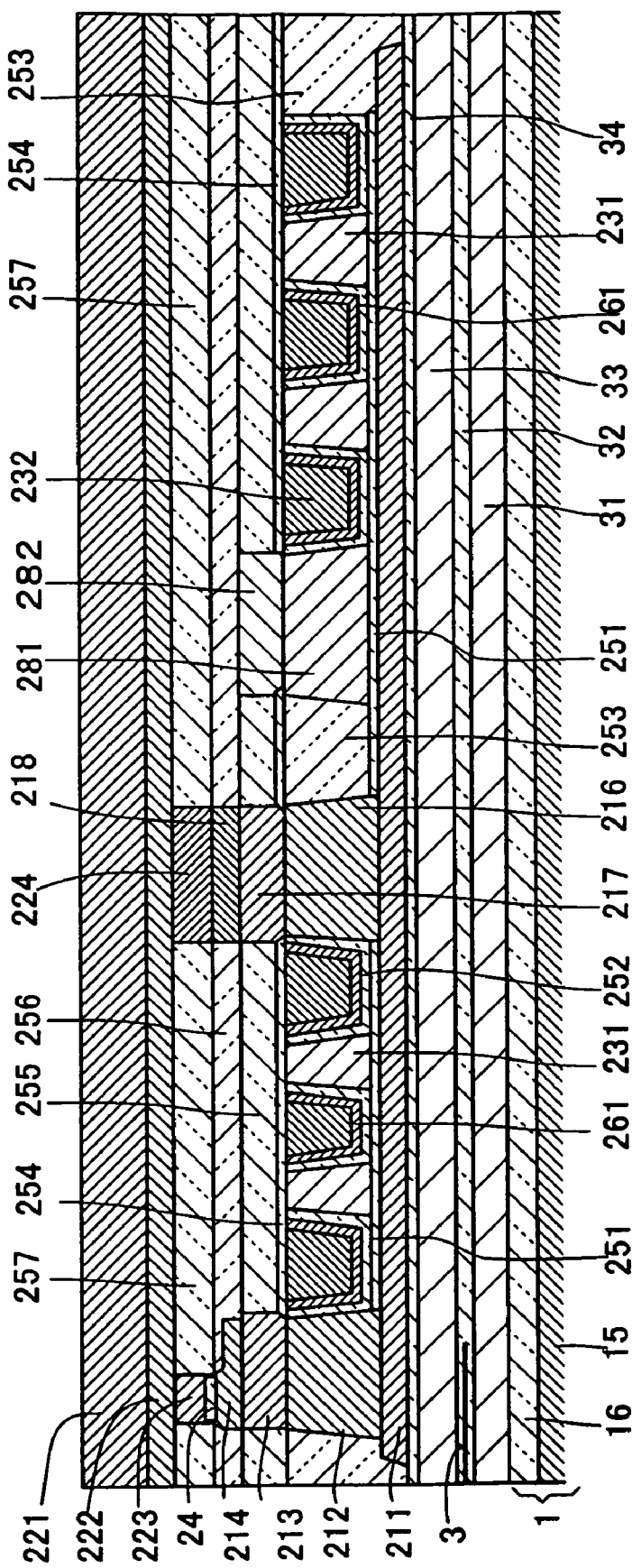
FIG. 37 is a diagram showing a process after the process shown in FIG. 36.

Next, the resist cover FR4 is removed and then the surfaces of the insulating film 257, the pole piece 223 and the back gap piece 224 are polished within a range of 30 to 80 nm by CMP to be flattened. After that, as shown in FIG. 37, a third magnetic film 222 of CoFeN or the like is deposited 50 to 500 nm thick on the flattened surfaces by means of sputtering or the like, and then the surface of the third magnetic film 222, used as a seed film, is selectively plated with a second magnetic film 221 of CoNiFe. The plating thickness is 3.0 to 3.5 µm, for example.

Figure 38:
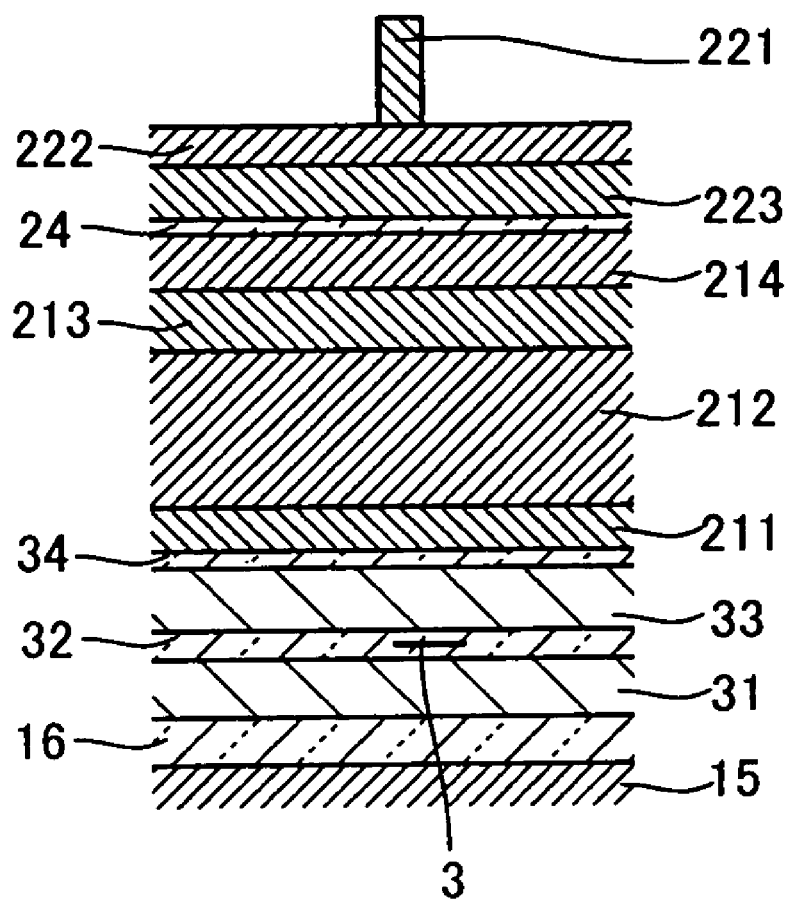
FIG. 38 is a diagram showing a process after the process shown in FIG. 37.

Next, the second magnetic film 221 is etched by IBE. By this etching process, the second magnetic film 221 is made narrow in track width at a second pole portion P2 as shown in FIG. 38.

Figure 39:
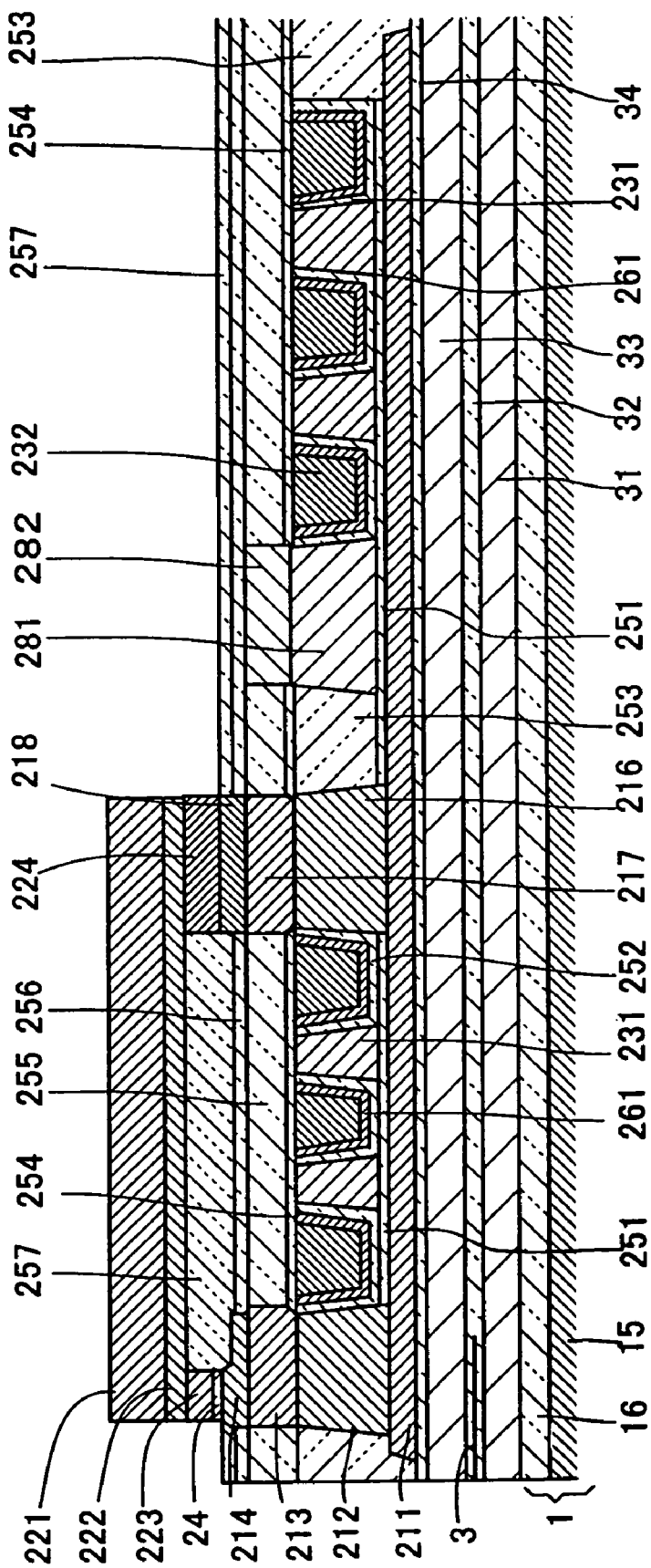
FIG. 39 is a diagram showing a process after the process shown in FIG. 38.
Figure 40:
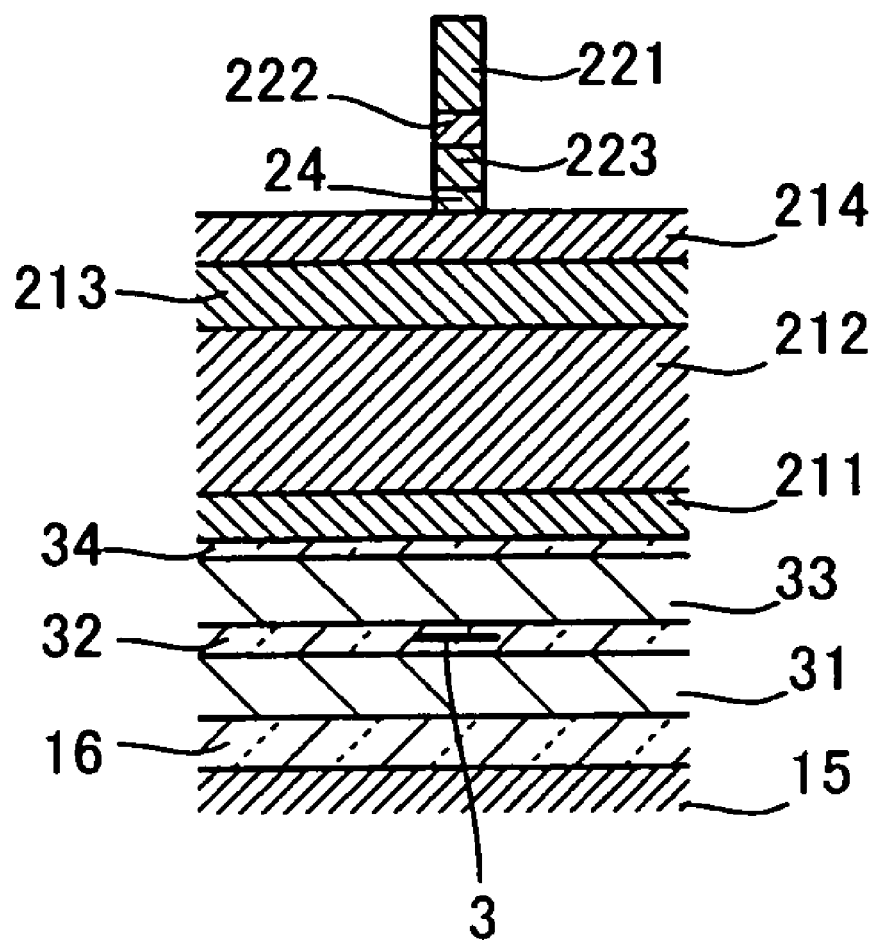
FIG. 40 is a diagram of a write element obtained through the process shown in FIG. 39, seen from the ABS side.

Next, as shown in FIGS. 39 and 40, the third magnetic film 222, the pole piece 223 and the gap film 24 are etched by IBE. By this etching process, the third magnetic film 222, the pole piece 223 and the gap film 24 are made narrow in track width as shown in FIG. 40.

Figure 41:
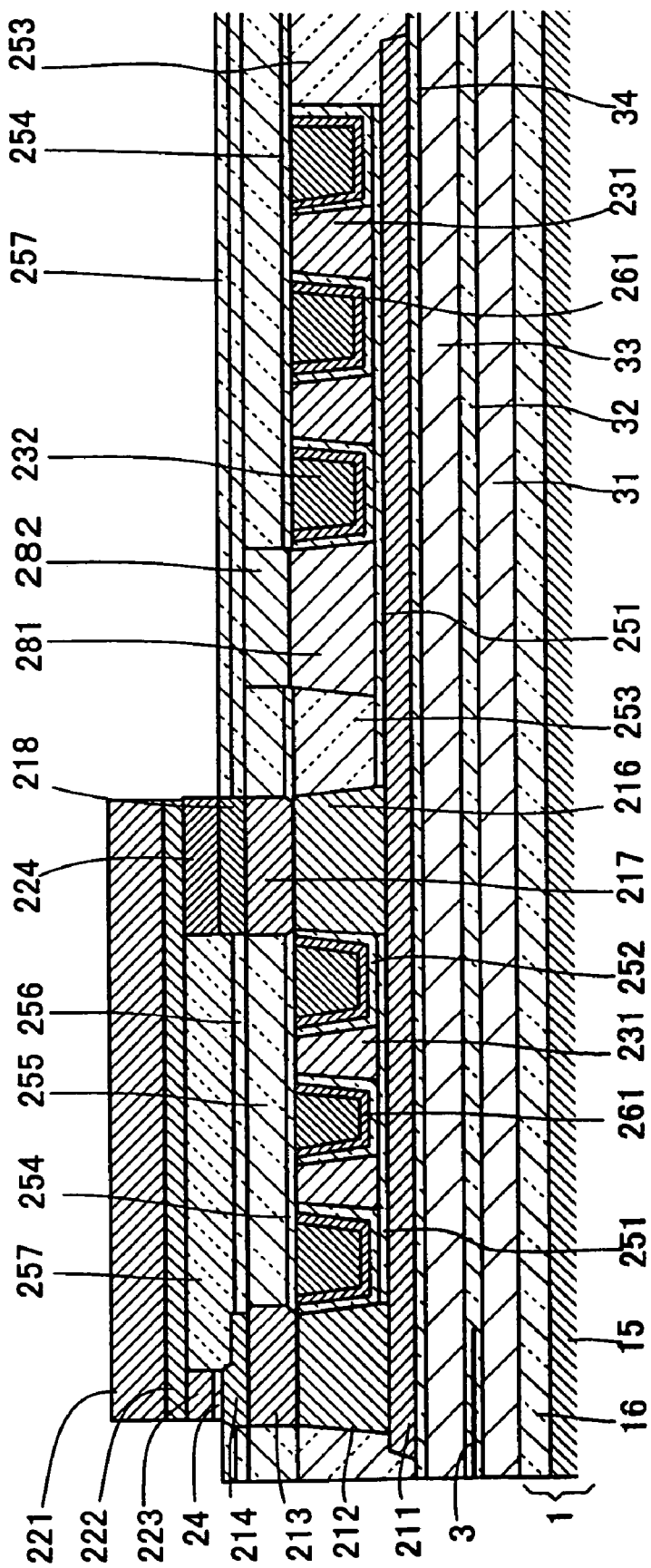
FIG. 41 is a diagram showing a process after the process shown in FIGS. 39 and 40.
Figure 42:
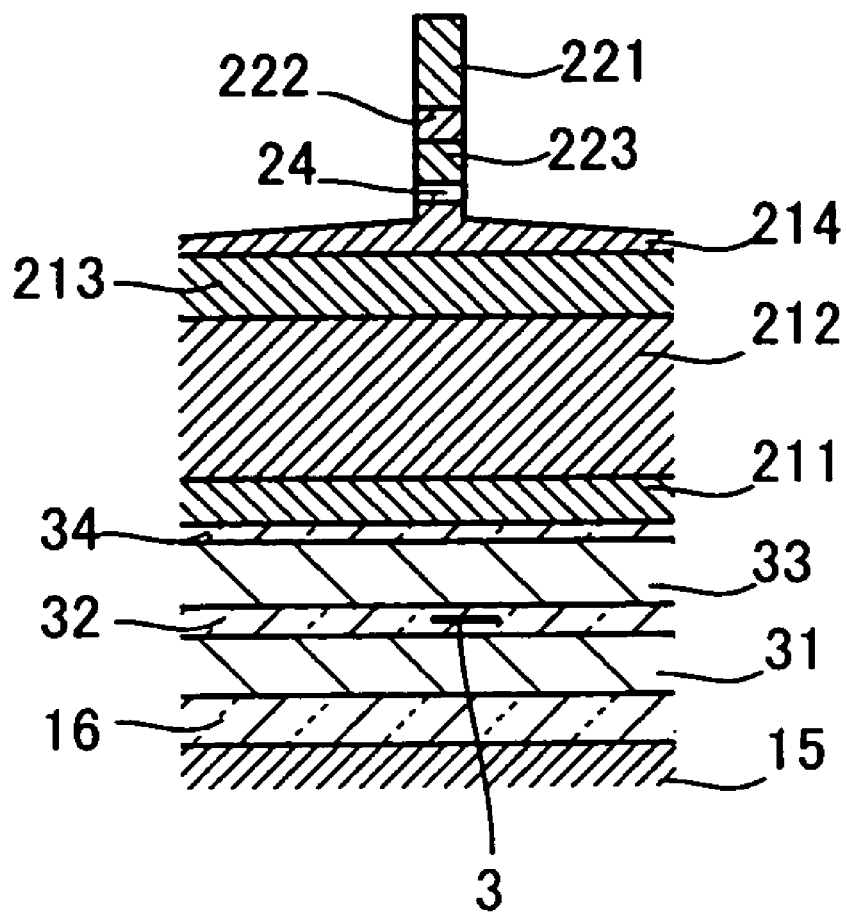
FIG. 42 is a diagram of a write element obtained through the process shown in FIG. 41, seen from the ABS side.

Next, as shown in FIGS. 41 and 42, the pole piece 214 is etched by IBE. By this etching process, a part of the pole piece 214 adjacent to the gap film 24 is made narrow in track width as shown in FIG. 42. The etching depth of the pole piece 214 is 0.3 to 0.35 μm, for example.

Figure 43:
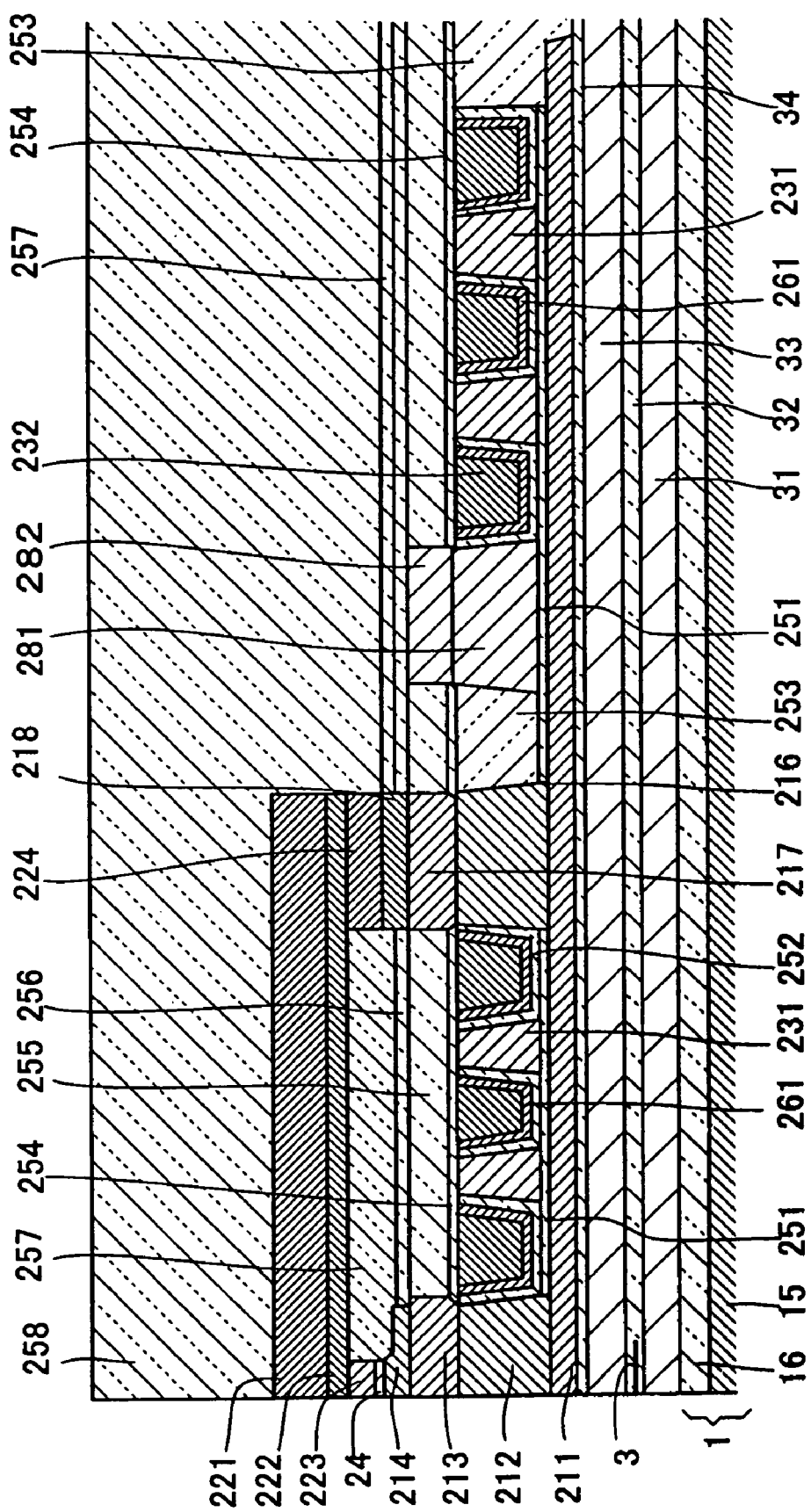
FIG. 43 is a diagram showing a process after the process shown in FIGS. 41 and 42.
Figure 44:
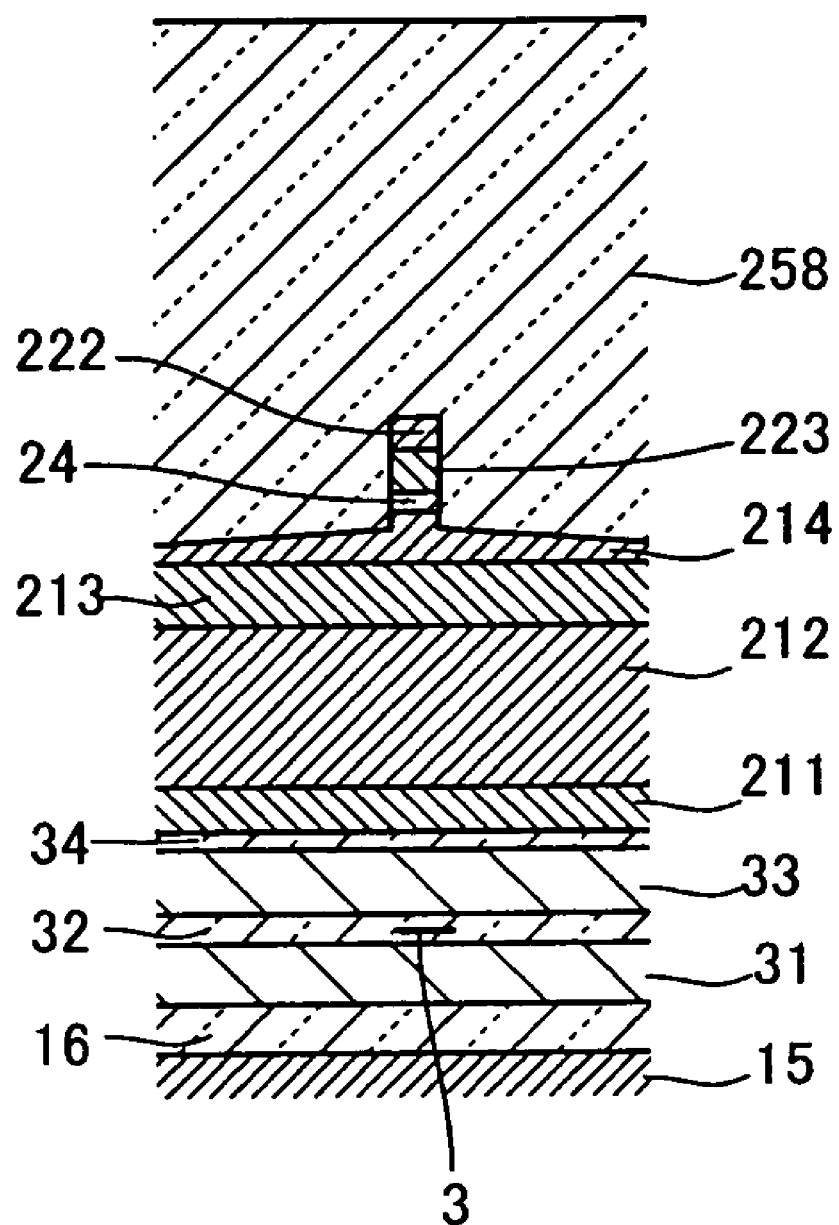
FIG. 44 is a diagram of a write element obtained through the process shown in FIG. 43, seen from the ABS side.

After that, as shown in FIGS. 43 and 44, a protective film 258 of $Al_2O_3$ is deposited 20 to 40 μm thick.

The above-mentioned processes are performed on a wafer. After that, publicly known post-processes such as cutting out a bar-shaped head assembly from the wafer, polishing for determining a throat height, ABS processing and the like are performed. FIGS. 43 and 44 show a state in which polishing for determining a throat height has been performed.

Although described above with reference to the drawings showing a concrete embodiment, it is apparent that the present invention is not limited to such an embodiment. For example, the pole piece 213 included in the first pole portion P1 may protrude over the second coil 232 or may be equal to or longer than the pole piece 212 positioned beneath the pole piece 213. In the embodiment, the pole piece 214, the second magnetic film 221, and the third magnetic film 222 used as a seed film of the second magnetic film 221 are made of CoFeN which is a high saturation magnetic flux density material (2.4 tesla), but they may be a sputtering film or a plating film containing FeCo (2.1 to 3 tesla). In the embodiment, when the pole piece 223 for determining a throat height TH is etched by IBE, the pole piece 214 positioned beneath the gap film 24 is etched to be 0.3 to 0.35 μm in depth (see FIGS. 41 and 42), but the etching may be stopped in the middle of the gap film 24 or on the surface of the pole piece 214.

There has been shown an example of providing a taper angle of 80 to 90 degrees by controlling a focusing position in a photolithography process in order to provide the first coil 231 with a taper angle, but the same taper angle may be provided by means of IBE. A process of providing the second coil 232 with a taper angle can be performed in the same manner.

(2) Embodiment 2

Embodiment 2 relates to a method for manufacturing a thin film magnetic head shown in FIGS. 7 and 8. FIGS. 45 to 68 show a process of manufacturing the same. It is notified in advance that processes illustrated in FIGS. 45 to 66 are also performed on a wafer.

Figure 45:
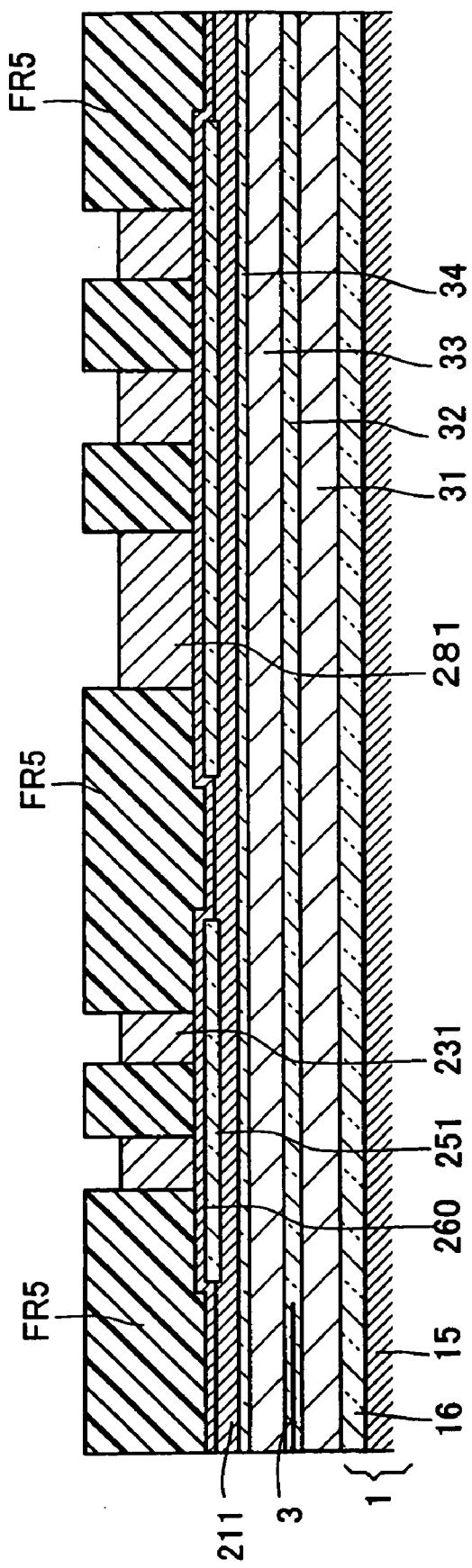
FIG. 45 is a diagram showing a process of manufacturing a thin film magnetic head having the electromagnetic converter portion shown in FIGS. 7 and 8.

First, referring to FIG. 45, a first shield film 31, a read element 3, an insulating film 32, a second shield film 33, an insulating film 34 and a first magnetic film 211 are formed on an insulating film 16 deposited to a base body 15 by means of publicly known processes. After that, an insulating film 251 having an area slightly larger than an area necessary for forming a coil is formed on the flat surface of the first magnetic film 211, and a seed film 260 is formed on the insulating film 251. The seed film 260 is formed so as to cover the surface of the insulating film 251 and the surface of the first magnetic film 211. The seed film 260 is made of a material suitable for a Cu-plating ground film and is formed 50 nm to 80 nm thick by a Cu-CVD process.

Next, a photoresist film is formed on the seed film 260 by applying a spin coat method and the like, and then is exposed with a mask MSK having a coil pattern and developed. The photoresist film may be either positive photoresist or negative photoresist. By performing development following the above-mentioned exposure process, a resist frame FR5 is obtained as shown in FIG. 45. Next, a selective Cu-plating process is performed, and thus a first coil 231 is grown 3 to 3.5 μm thick on the seed film 260 present inside the coil forming pattern. FIG. 45 shows a state in which the above-mentioned selective Cu-plating process has been performed.

Next, the resist frame FR5 is removed by means of chemical etching or the like, and after that a photolithography process for forming a pole piece and back gap piece is performed so that a resist frame for forming a pole piece and a back gap piece is formed.

Figure 46:
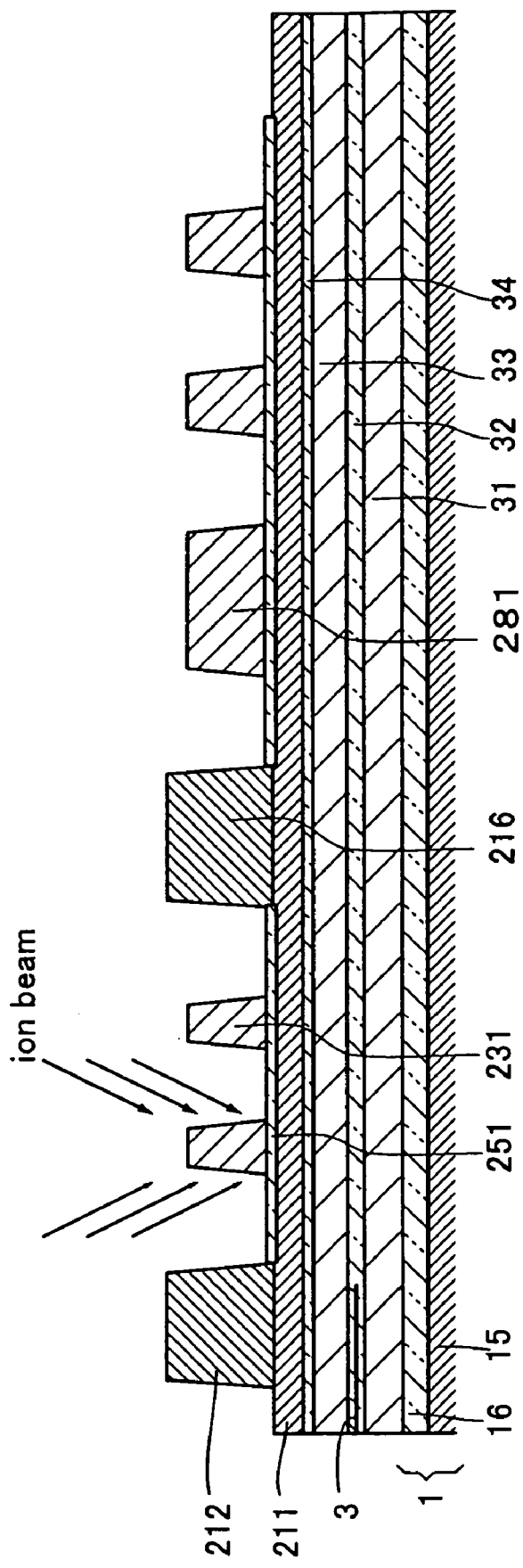
FIG. 46 is a diagram showing a process after the process shown in FIG. 45.

Next, a selective plating process is performed, and thus a pole piece and a back gap piece are grown on the first magnetic film 211. After that, the resist frame is removed by means of chemical etching or the like. Consequently, as shown in FIG. 46, a pole piece 212 and a back gap piece 216 are formed with a space between them on one surface of the first magnetic film 211.

It is necessary that the first coil 231, the pole piece 212 and the back gap piece 216 each are formed so that its sectional shape is wider in the lower part and narrower in the upper part. The taper angle is equal to or more than 80 degrees and less than 90 degrees in relation to the surface of the first magnetic film 211 or the insulating film 251 formed thereon. As a means for achieving the above-mentioned taper angle, the embodiment 1 includes adjusting the depth of focus of an exposure system, but the embodiment 2 includes applying ion beam etching (IBE) to both side faces of coil turns of the first coil 231, the pole piece 212 and the back gap piece 216 so as to make their sectional shapes wider in the lower parts and narrower in the upper parts. In the IBE process, ion beams are applied onto one side face at 15 to 30 degrees, and onto the other side face at 20 to 47 degrees, preferably.

Figure 47:
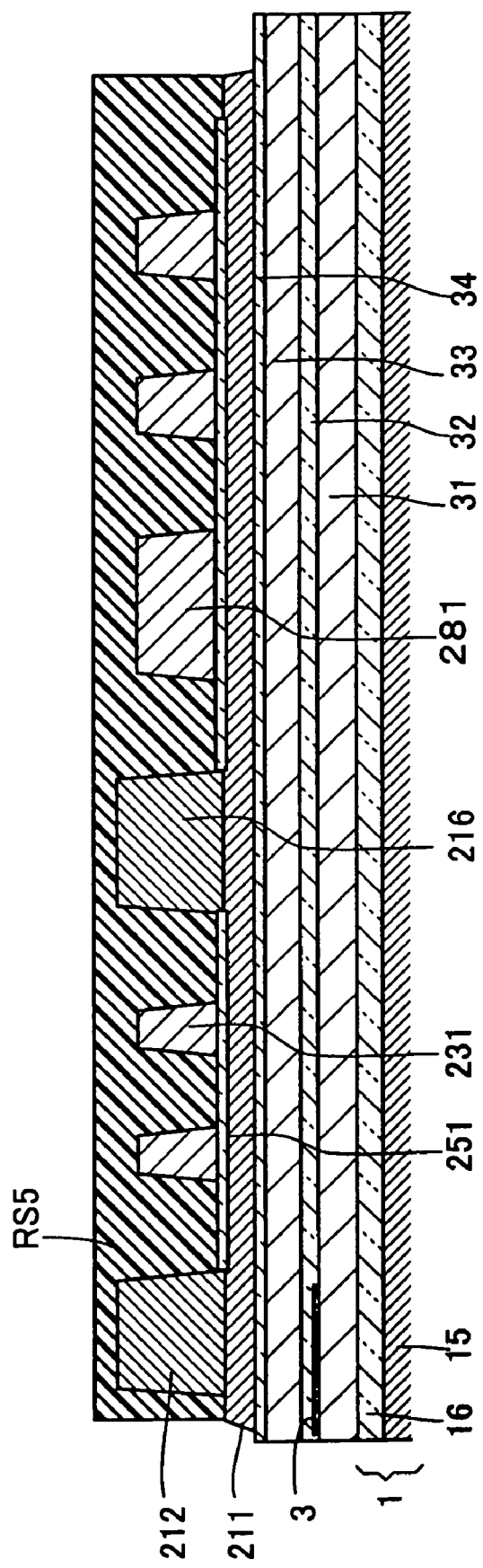
FIG. 47 is a diagram showing a process after the process shown in FIG. 46.

Next, as shown in FIG. 47, a photoresist film RS5 covering the first coil 231, the pole piece 212 and the back gap piece 216 is formed. After that, the first magnetic film 211 is selectively etched by IBE using the photoresist film RS5 as a mask.

Figure 48:
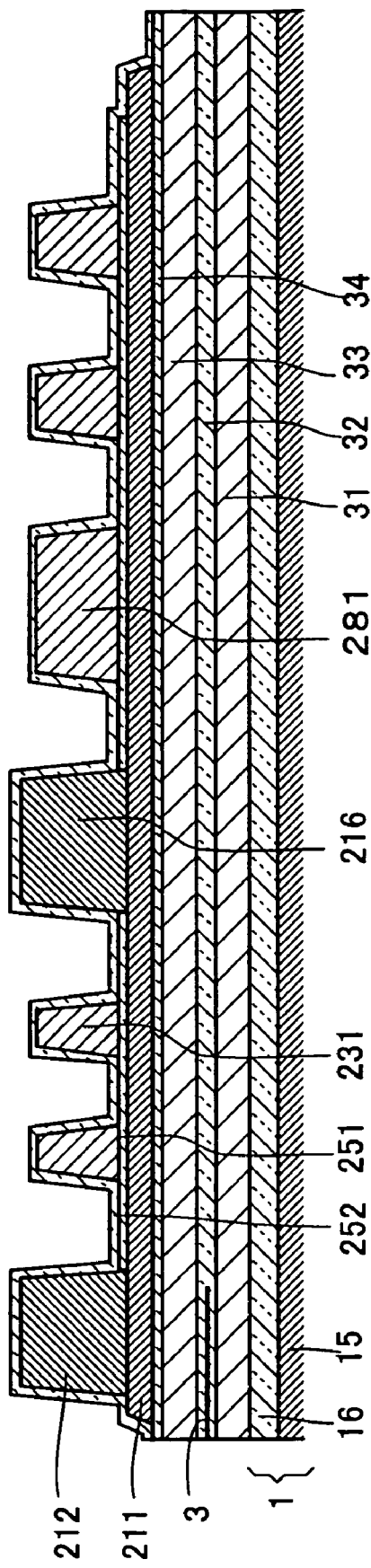
FIG. 48 is a diagram showing a process after the process shown in FIG. 47.

Next, the resist cover FR5 is removed, and after that, as shown in FIG. 48, an insulating film 252 is deposited on the surfaces and side faces of the insulating film 251, the first coil 231, the pole piece 212 and the back gap piece 216. Concretely, the insulating film 252 is formed 0.05 to 0.15 μm thick by an $Al_2O_3$-CVD process.

Figure 49:
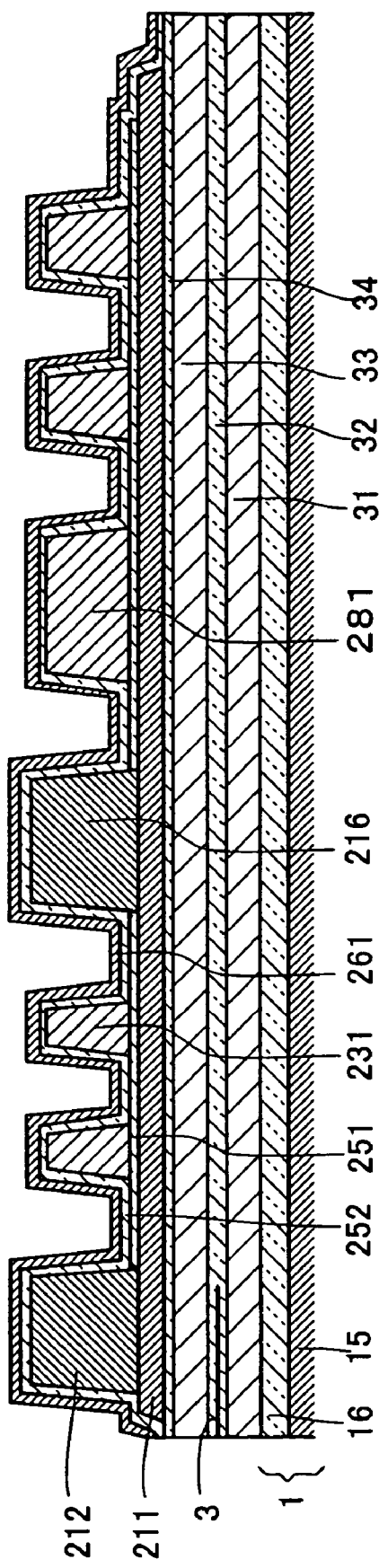
FIG. 49 is a diagram showing a process after the process shown in FIG. 48.

Next, as shown in FIG. 49, a seed film 261 is deposited 50 nm thick on the surface of the insulating film 252 by Cu-sputtering.

Figure 50:
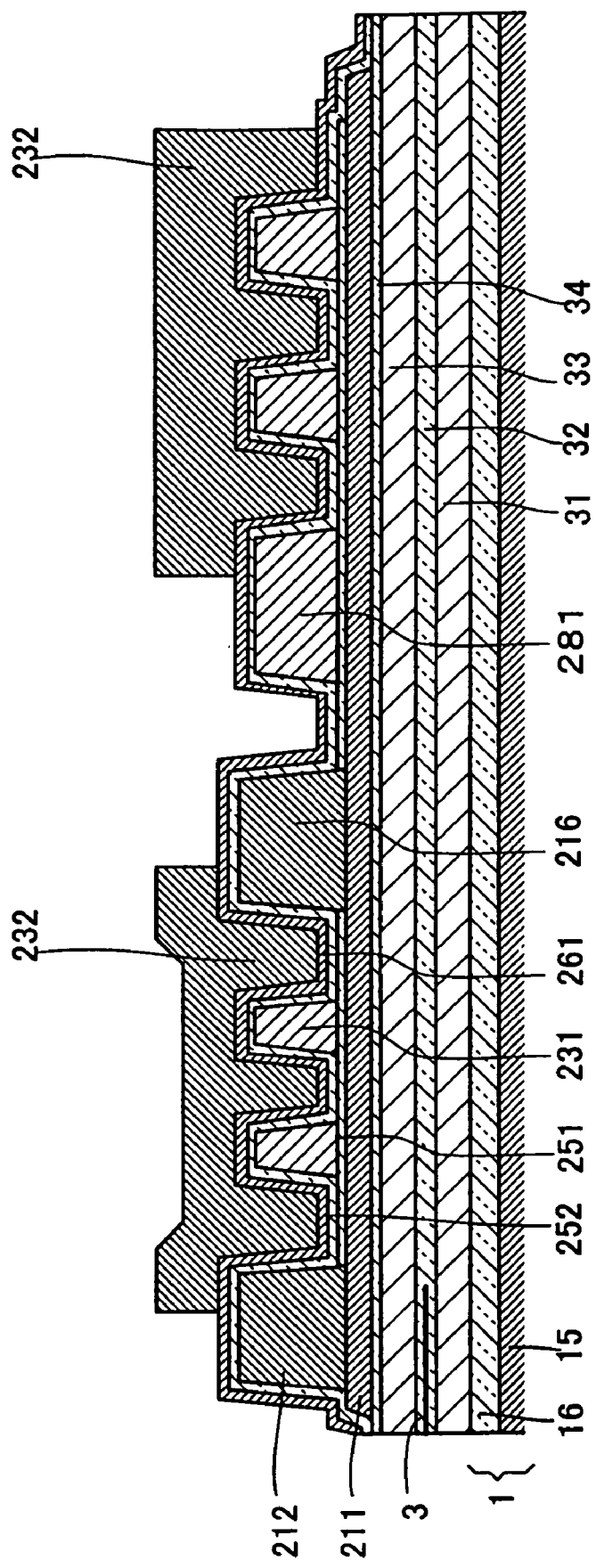
FIG. 50 is a diagram showing a process after the process shown in FIG. 49.

Next, as shown in FIG. 50, a plating film 232 to become a second coil is formed 3 to 5 μm thick on the seed film 261 by a frame plating method. The plating film 232 comprises Cu as its main constituent.

Figure 51:
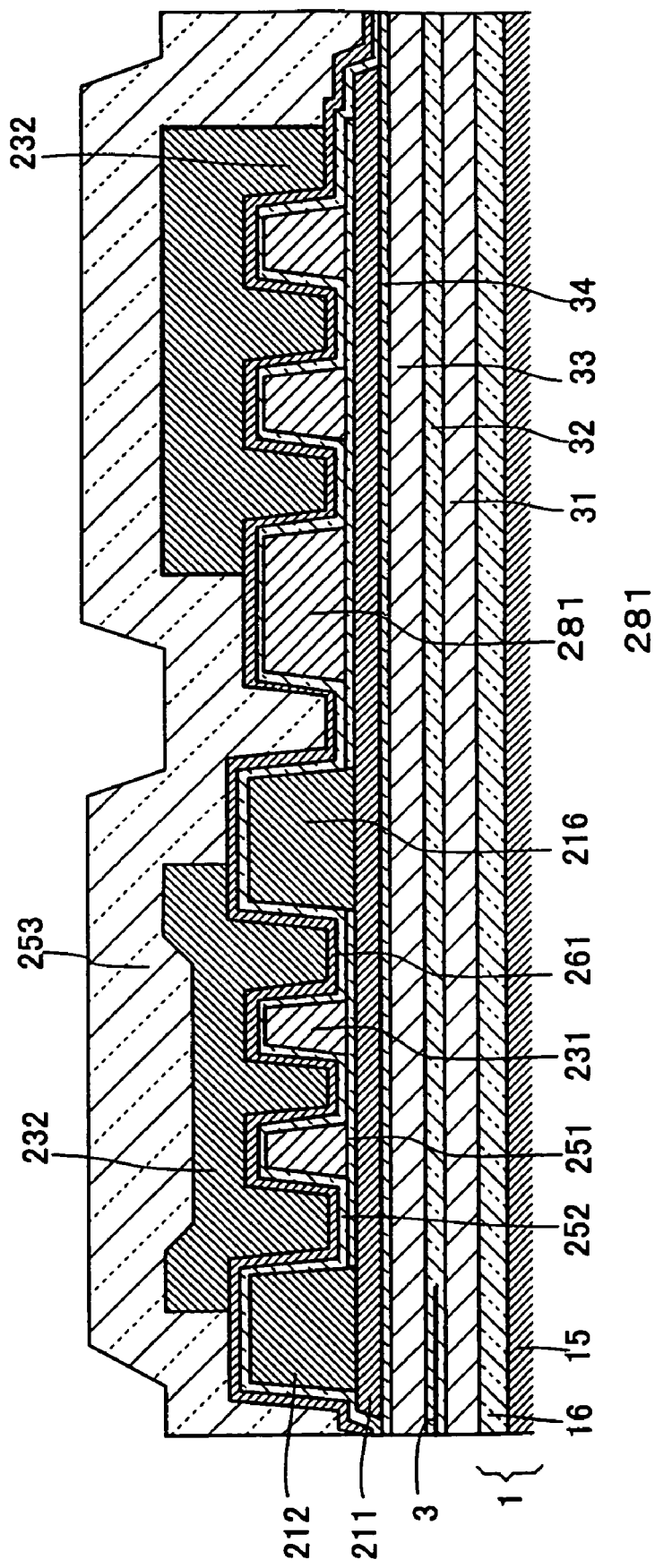
FIG. 51 is a diagram showing a process after the process shown in FIG. 50.

Next, as shown in FIG. 51, an insulating film 253 of $Al_2O_3$ is formed so as to cover the plating film 232 and the area not covered with the plating film 232. The insulating film 253 is formed as a sputtering film of 4 to 6 μm in thickness.

Figure 52:
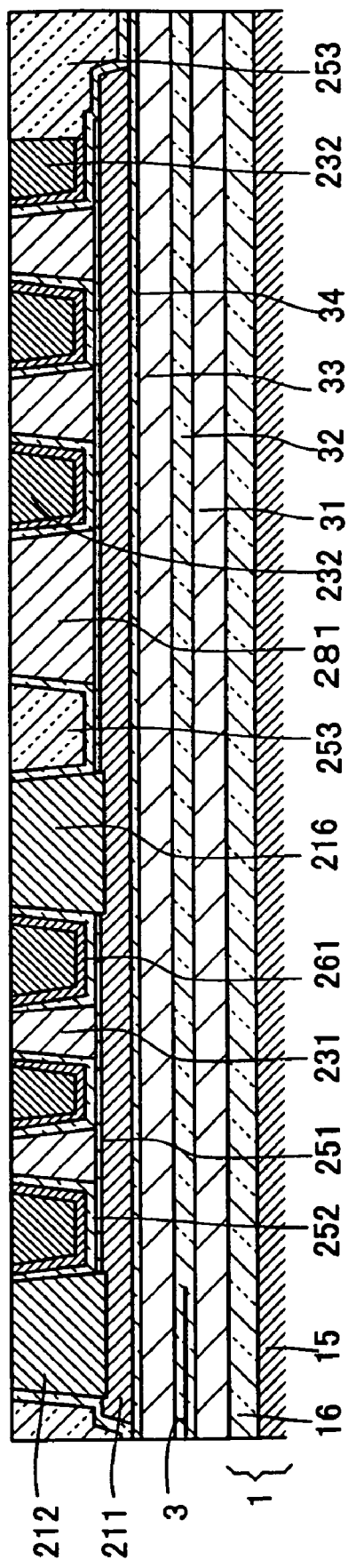
FIG. 52 is a diagram showing a process after the process shown in FIG. 51.

Next, as shown in FIG. 52, the insulating film 253 and the plating film 232 are polished by CMP to be flattened. Consequently, the second coil 232 of a flat spiral pattern is obtained, insulated from the first coil 231 by the insulating film 252. In CMP, the surfaces of the pole piece 212, the back gap piece 216 and the insulating film 253 are also polished so as to form the same plane as the surfaces of the first coil 231 and the second coil 232.

Figure 53:
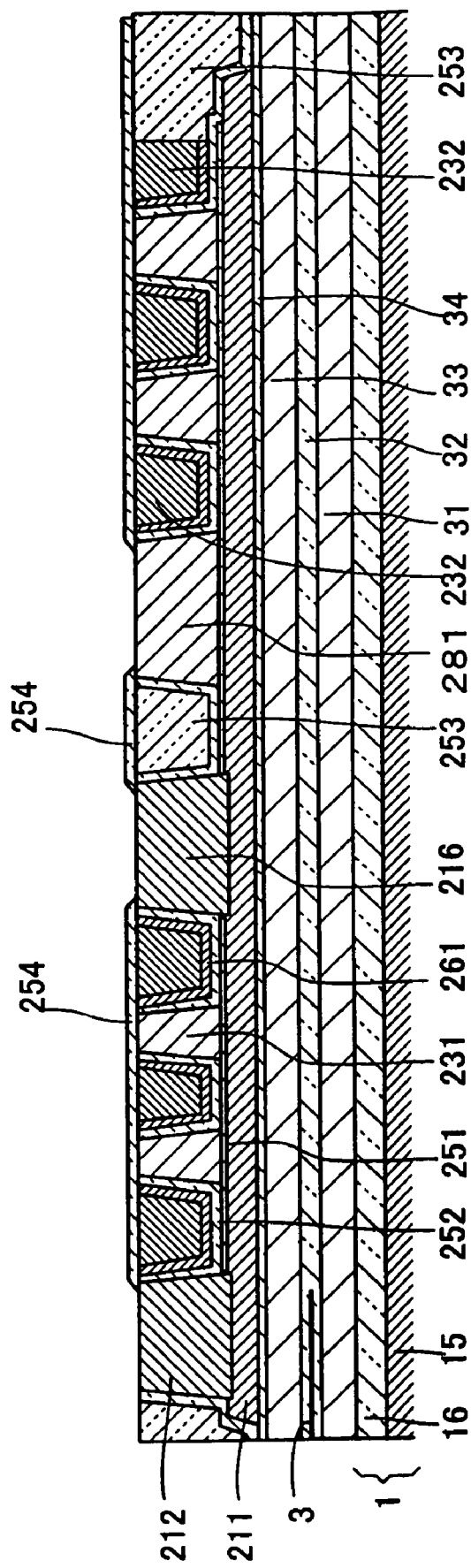
FIG. 53 is a diagram showing a process after the process shown in FIG. 52.

Next, as shown in FIG. 53, an insulating film 254 covering the surfaces of the first coil 231 and the second coil 232 is deposited. The insulating film 254 is made of $Al_2O_3$, formed 0.2 µm thick, for example.

Figure 54:
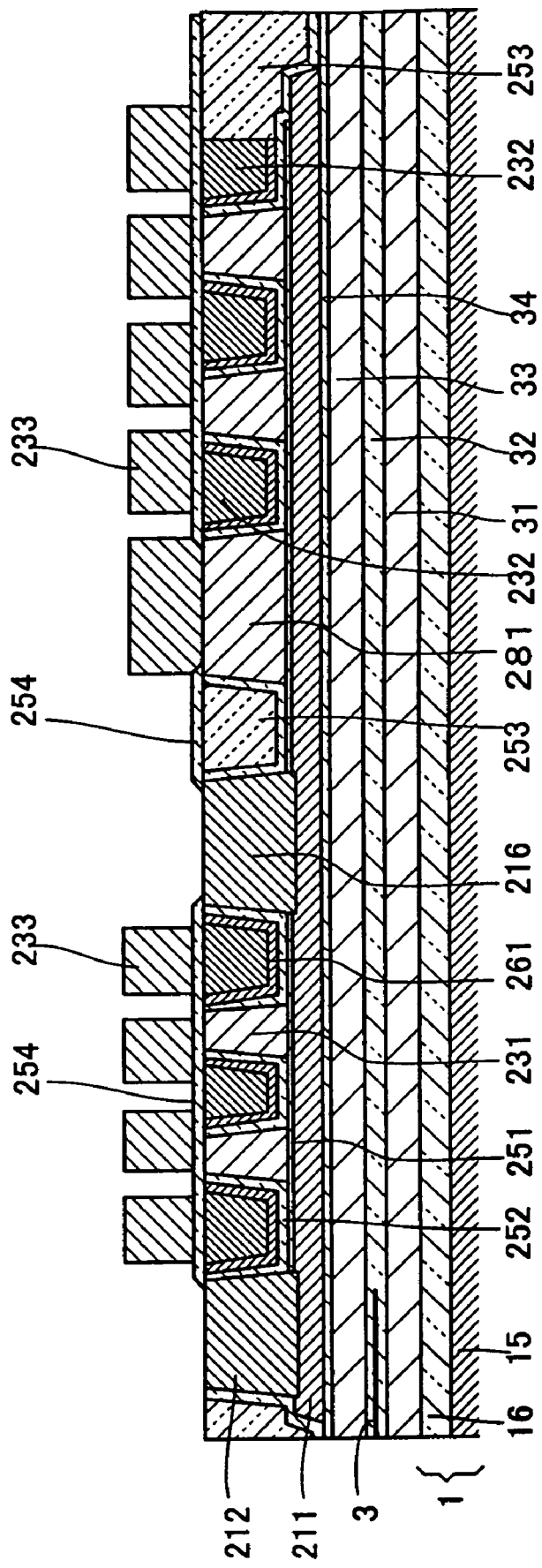
FIG. 54 is a diagram showing a process after the process shown in FIG. 53.

Next, as shown in FIG. 54, a photolithography process is performed on one surface where the insulating film 254 has been formed, and a resist frame plating method is subsequently performed so that a third coil 233 is formed. A connecting conductor 282 is formed by a frame plating method. Its thickness is 1.5 to 2.5 µm, for example.

Figure 55:
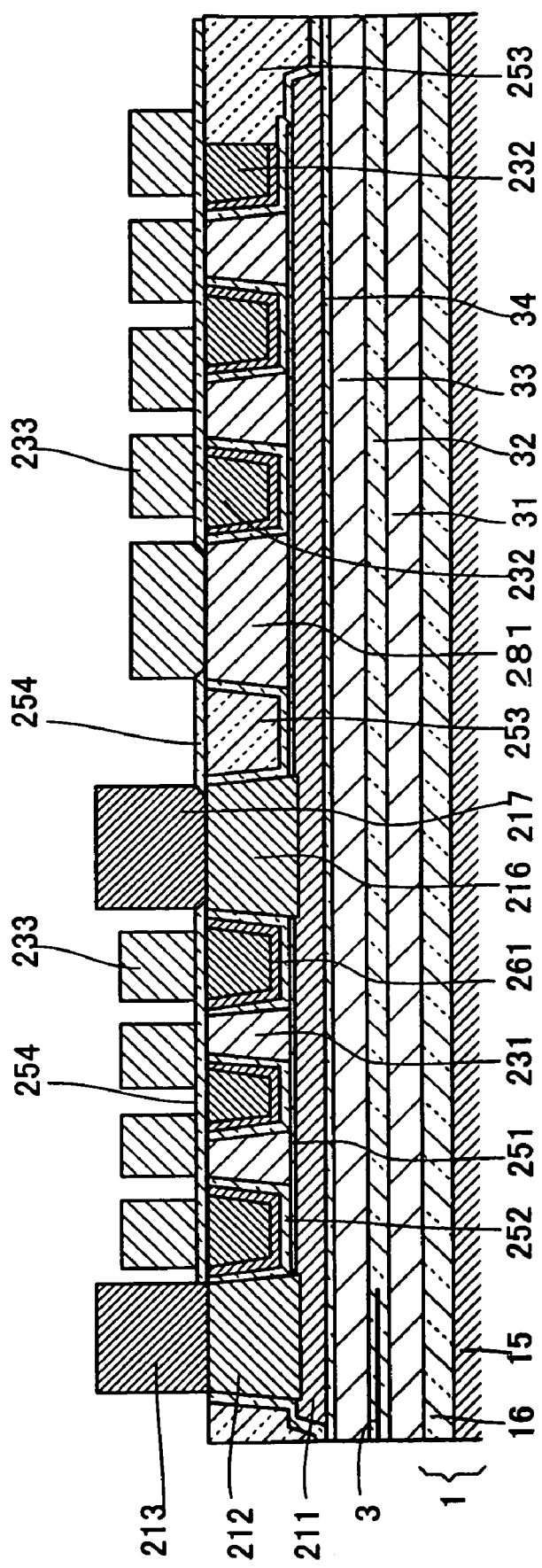
FIG. 55 is a diagram showing a process after the process shown in FIG. 54.

Next, a photolithography process is performed on one surface where the connecting conductor 282 has been formed, so that a resist frame for forming a pole piece 213 and a back gap piece 217 (see FIGS. 7 and 8) is formed. According to a pattern defined by the resist frame thus obtained, the pole piece 213 and the back gap piece 217 are formed by a frame plating method as shown in FIG. 55. After the pole piece 213 and the back gap piece 217 are formed, the resist frame is removed. FIG. 55 shows a state in which the resist frame has been removed. The pole piece 213 and the back gap piece 217 each are a plating film of CoFe or CoNiFe (2.1 to 2.3 tesla) and are 2 to 3 µm thick, for example.

Figure 56:
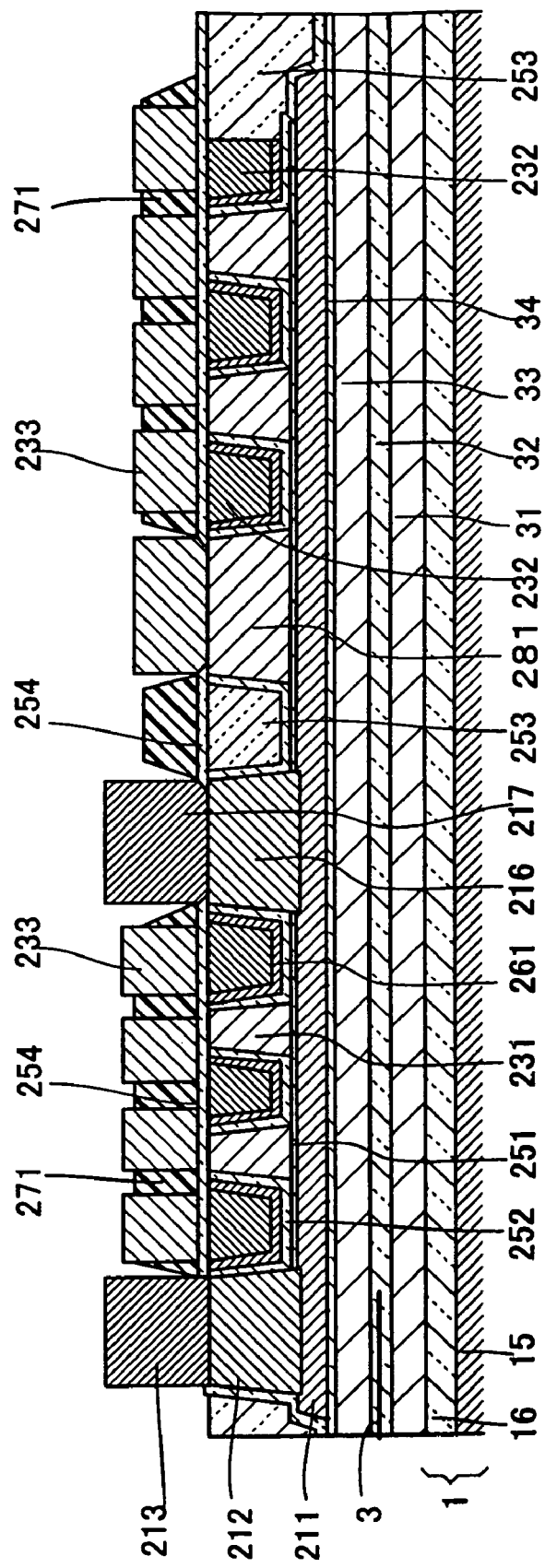
FIG. 56 is a diagram showing a process after the process shown in FIG. 55.

Next, as shown in FIG. 56, an insulating film 271 made of photoresist is formed in the space between coil turns of the third coil 233.

Figure 57:
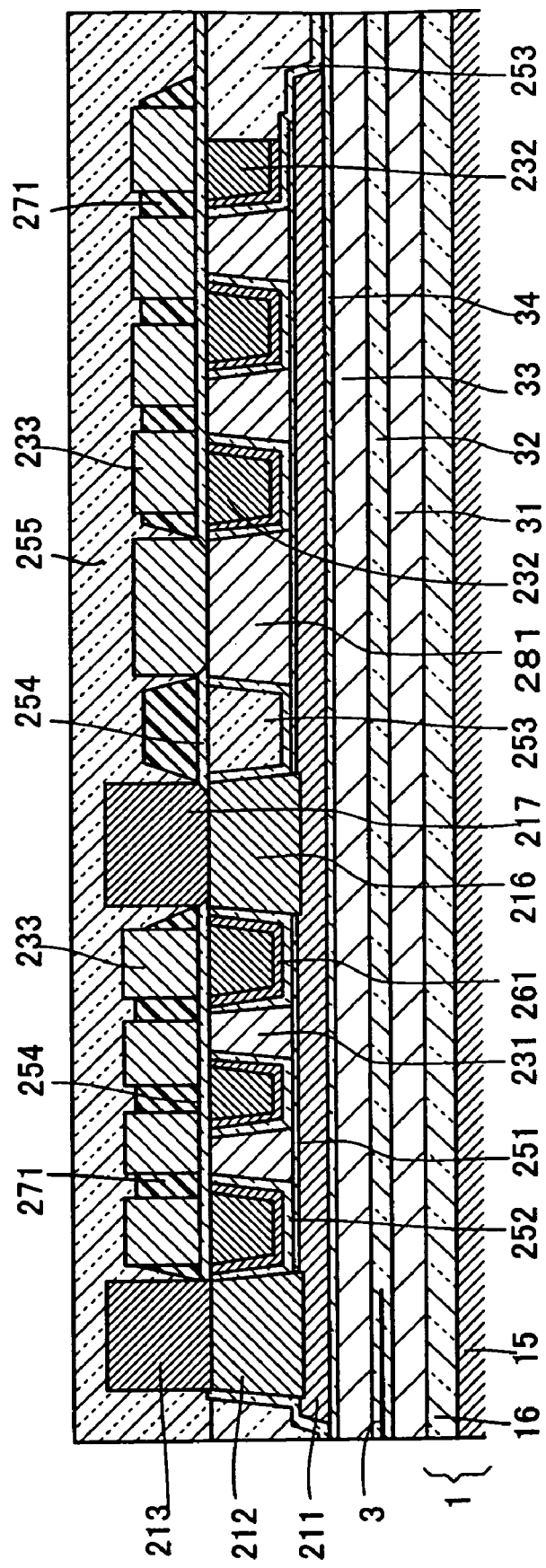
FIG. 57 is a diagram showing a process after the process shown in FIG. 56.
Figure 58:
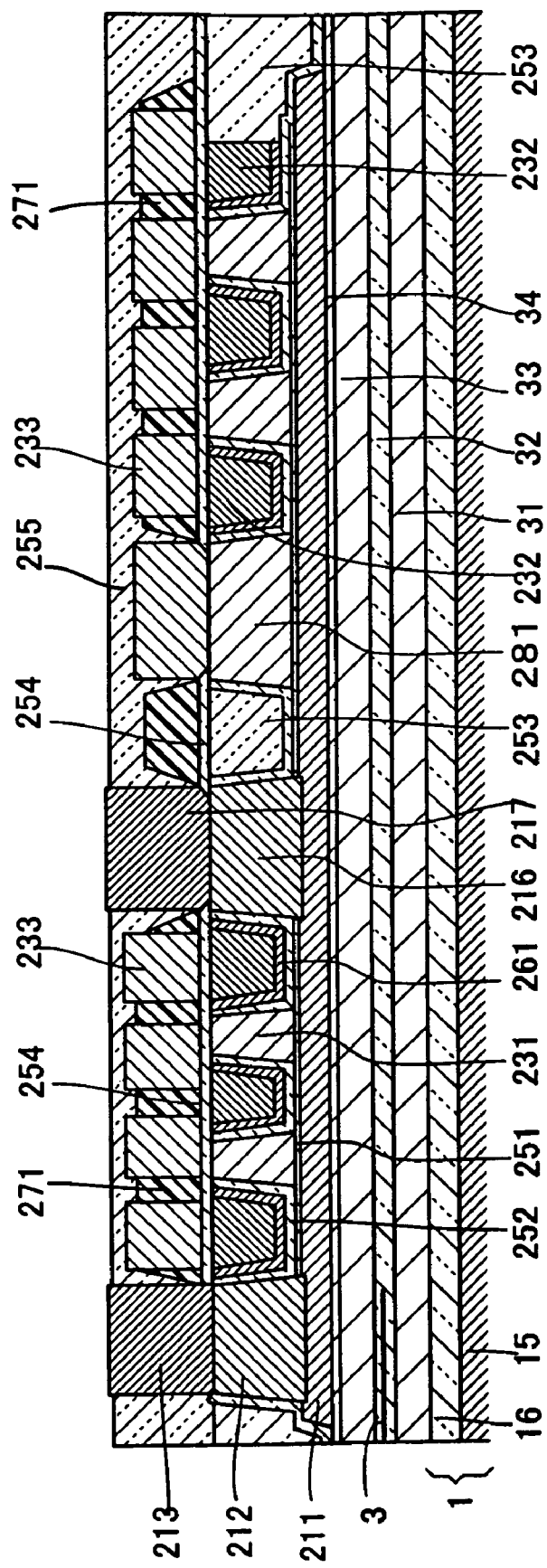
FIG. 58 is a diagram showing a process after the process shown in FIG. 57.

Next, as shown in FIG. 57, an insulating film 255 of $Al_2O_3$ is deposited 3 to 4 µm thick on the surface where the pole piece 213 and the back gap piece 217 have been formed. After that, as shown in FIG. 58, the surfaces of the insulating film 255, the pole piece 213 and the back gap piece 217 are polished by CMP.

Figure 59:
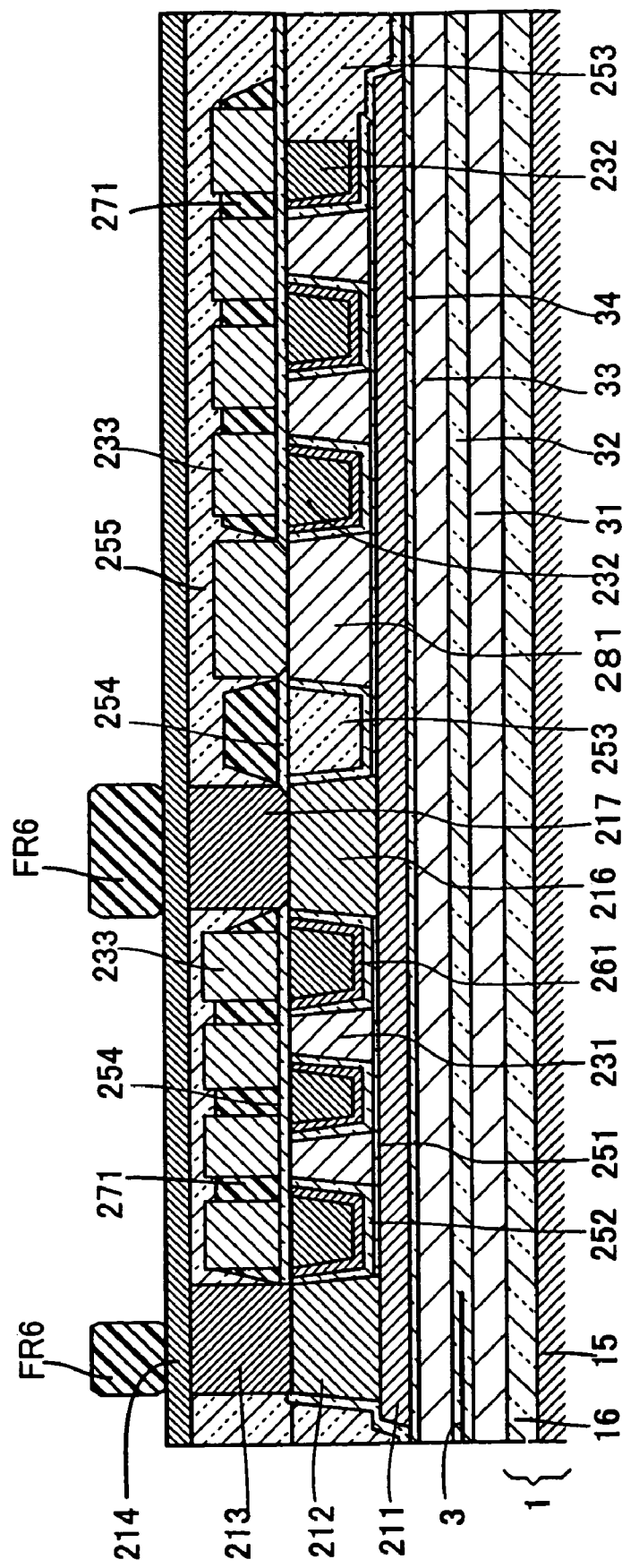
FIG. 59 is a diagram showing a process after the process shown in FIG. 58.
Figure 60:
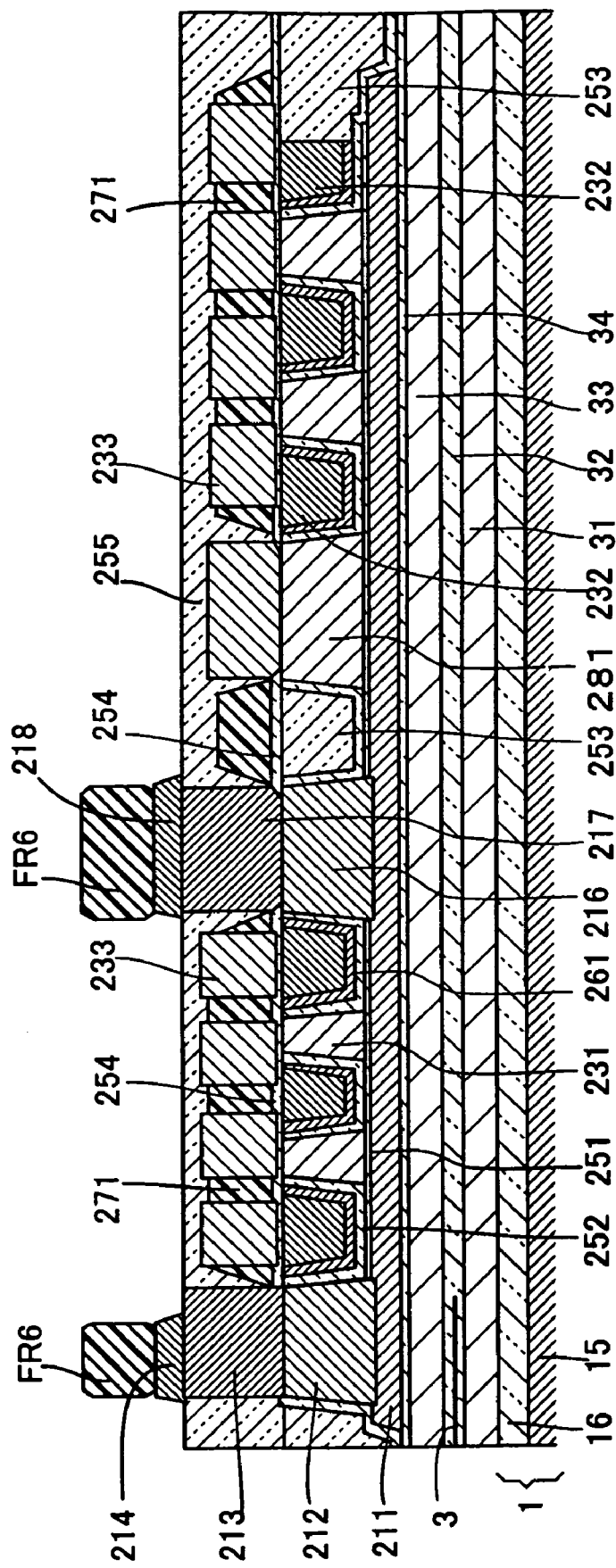
FIG. 60 is a diagram showing a process after the process shown in FIG. 59.

Next, as shown in FIG. 59, a magnetic film 214 for forming a pole piece 214 (see FIGS. 7 and 8) is formed 0.3 to 0.6 µm thick on the polished surfaces of the insulating film 255, the pole piece 213 and the back gap piece 217. The magnetic film 214 can be made of CoFeN (2.4 tesla). After that, a photolithography process is performed on the surface of the magnetic film 214. In this photolithography process, a T-shaped resist cover FR6 is formed above the pole piece 213 and the back gap piece 217, as shown in FIG. 60. After that, an ion beam etching process is performed using the resist cover FR6 as a mask so that the magnetic film 241 is patterned. Consequently, a pole piece 214 and a back gap piece 218 are formed as shown in FIG. 60.

Figure 61:
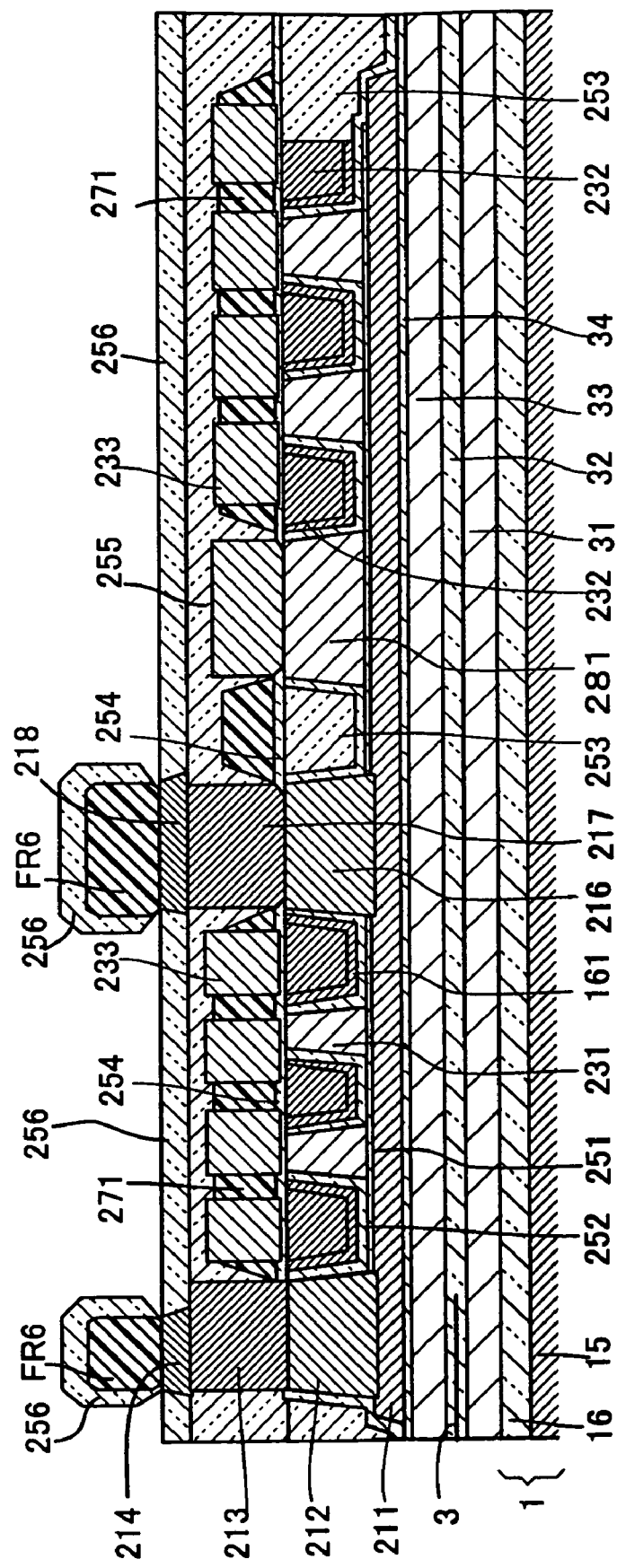
FIG. 61 is a diagram showing a process after the process shown in FIG. 60.

Next, ion beam etching is applied onto both sides of the pole piece 214 and the back gap piece 218, ion beams applied onto one side at 0 degree and onto the other side at 75 degrees. After that, as shown in FIG. 61, an insulating film 256 of $Al_2O_3$ is deposited 0.3 to 0.7 µm thick by means of sputtering or the like. After that, the resist cover FR6 on the pole piece 214 and the back gap piece 218 is removed by a lift-off method or the like. After that, the surfaces of the insulating film 256, the pole piece 214 and the back gap piece 218 are polished by CMP to be more completely flattened. This CMP is performed by such a small degree as to produce a polishing quantity of 3 to 5 nm in thickness, for example.

Figure 62:
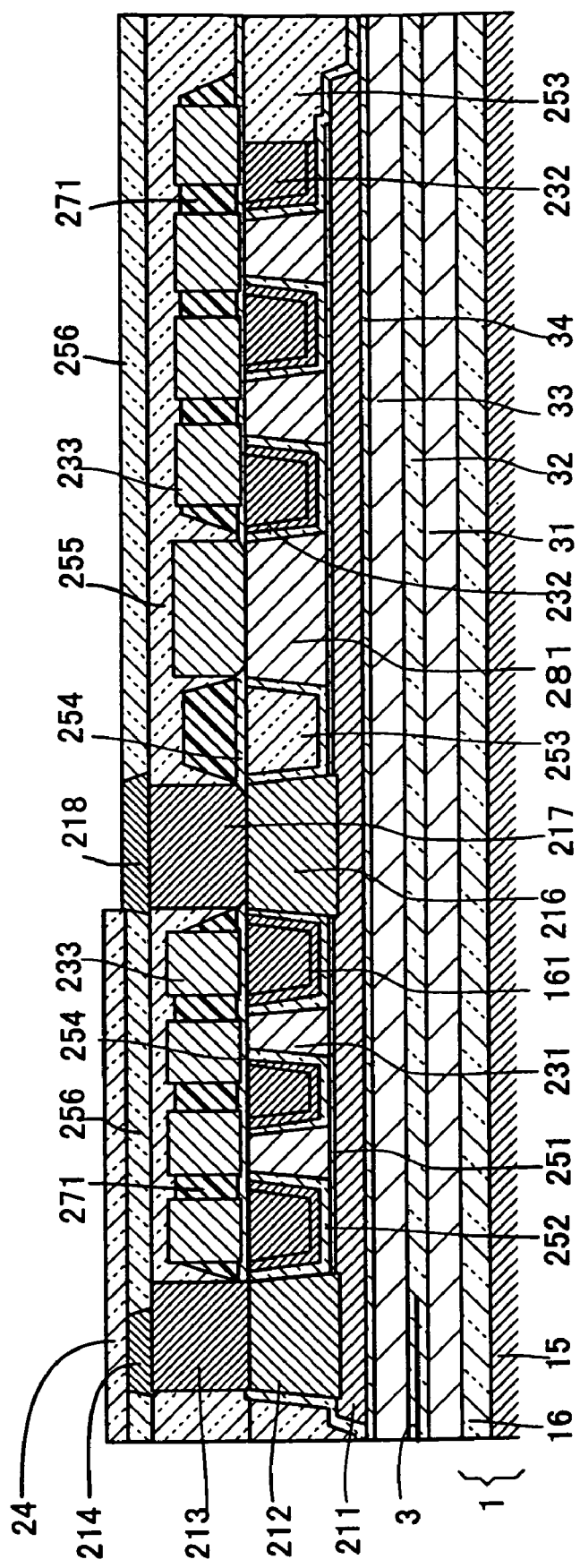
FIG. 62 is a diagram showing a process after the process shown in FIG. 61.

Next, as shown in FIG. 62, a patterned gap film 24 is formed on the flattened surface of the pole piece 214 and the flattened surface of the insulating film 256. The gap film 24 is made of a non-magnetic material such as $Al_2O_3$, Ru, NiCu or Ta, formed 0.1 µm thick, for example.

Figure 63:
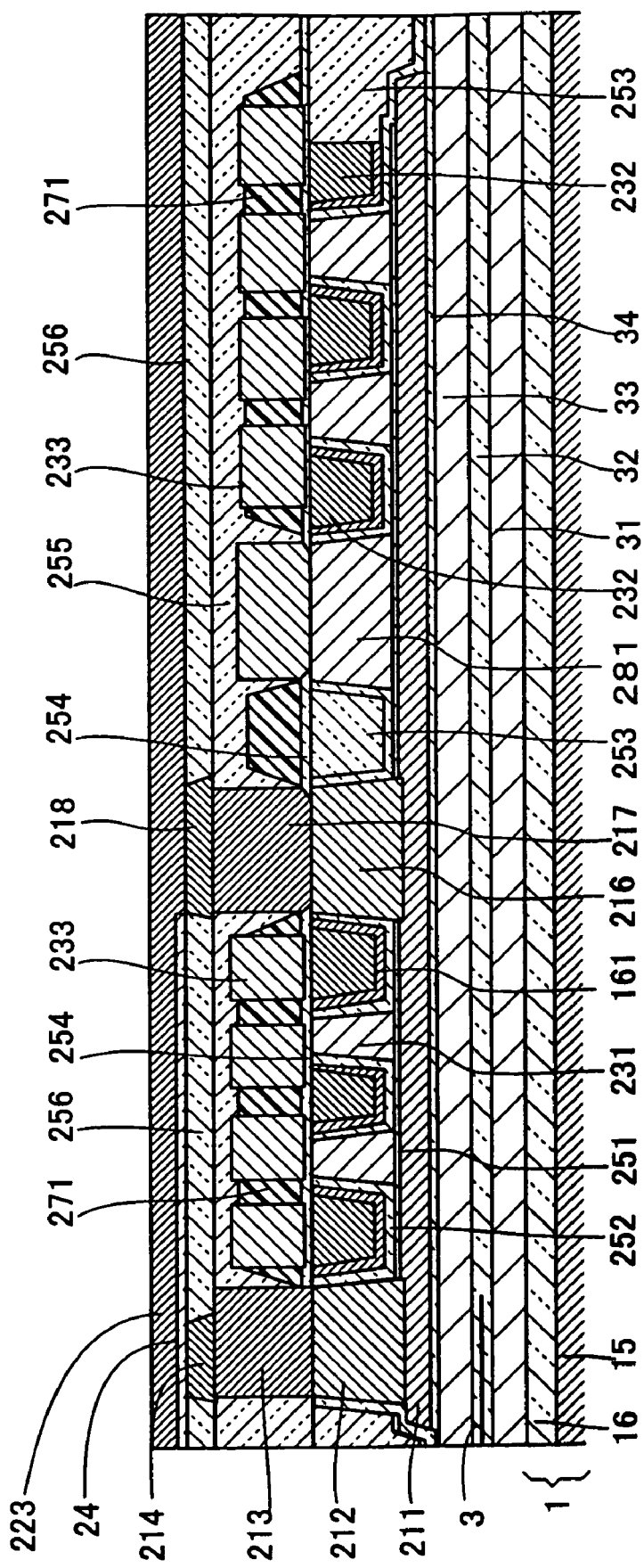
FIG. 63 is a diagram showing a process after the process shown in FIG. 62.

Next, as shown in FIG. 63, a magnetic film 222 is deposited by sputtering so as to cover the surfaces of the gap film 24, the back gap piece 218 and the insulating film 256. The magnetic film 222 is made of a magnetic material such as CoFeN (2.4 tesla), formed 0.2 to 0.6 µm thick, for example.

Figure 64:
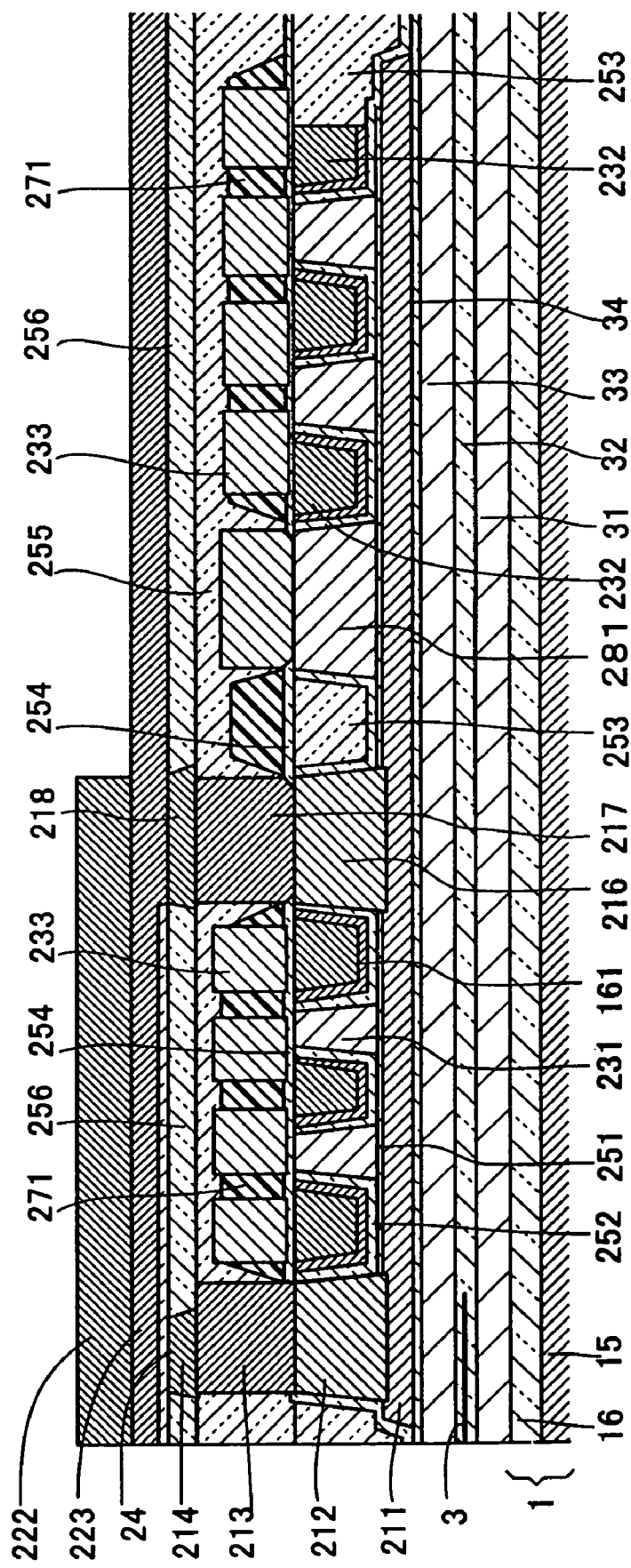
FIG. 64 is a diagram showing a process after the process shown in FIG. 63.
Figure 65:
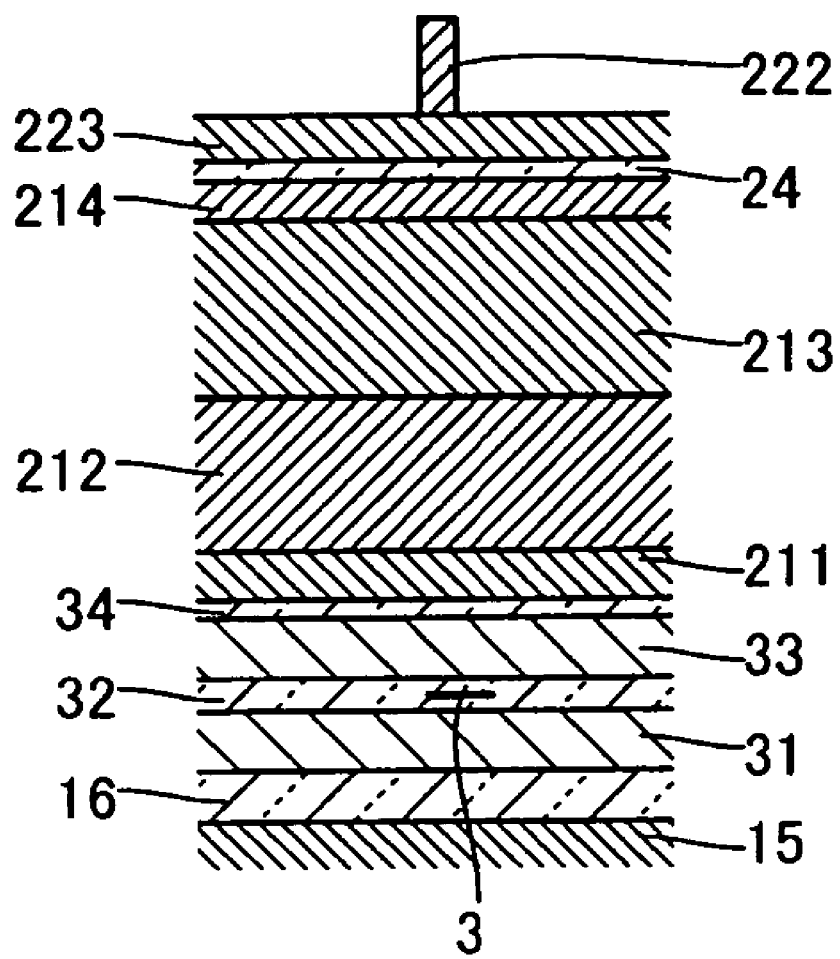
FIG. 65 is a diagram of a write element obtained through the process shown in FIG. 64, seen from the ABS side.

Next, as shown in FIGS. 64 and 65, a second magnetic film 221 is formed on the surface of the magnetic film 222. The second magnetic film 221 is formed 3.0 to 3.5 µm thick by a frame plating method.

Figure 66:
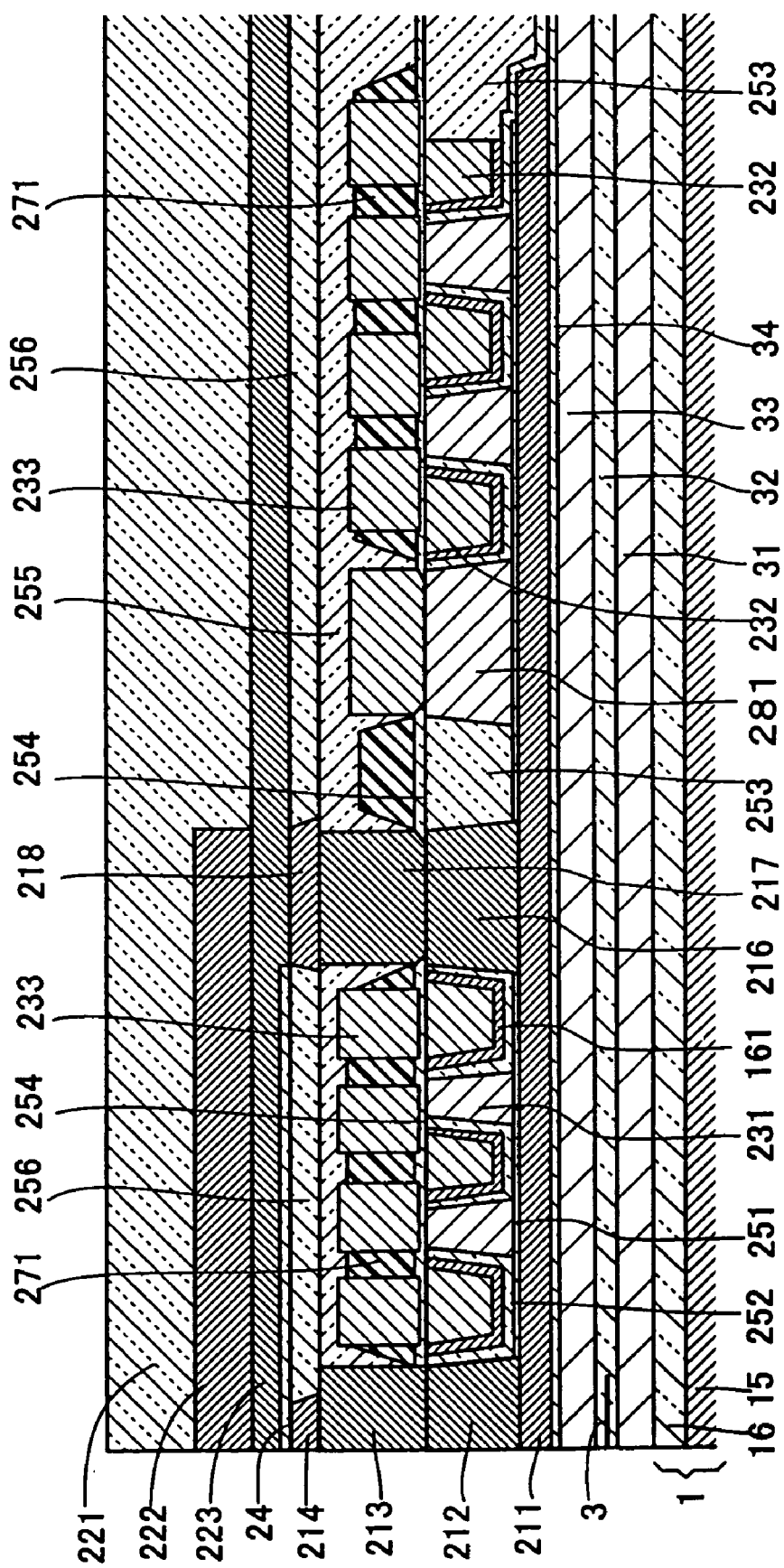
FIG. 66 is a diagram showing a process after the process shown in FIGS. 64 and 65.
Figure 67:
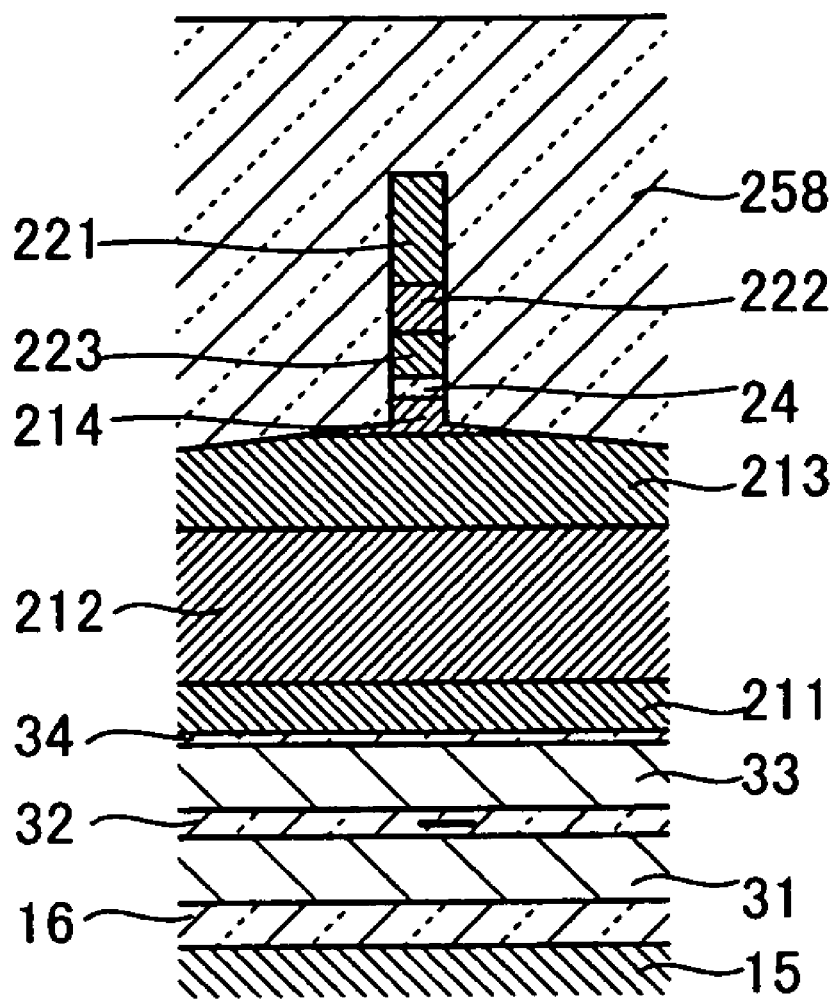
FIG. 67 is a diagram of a write element obtained through the process shown in FIG. 66, seen from the ABS side.

Next, IBE is applied to a third magnetic film 222 using the second magnetic film 221 as a mask so that the third magnetic film 222 has a narrow track width. The pole piece 214 of the first pole portion P1 is trimmed at a depth of 0.25 to 0.35 µm, and then a protective film 258 is deposited 20 to 40 µm thick thereon, as shown in FIGS. 66 and 67. The protective film 258 can be deposited by sputtering.

The above-mentioned processes are performed on a wafer. After that, publicly known post-processes such as cutting out a bar-shaped head assembly from the wafer, polishing for determining a throat height, ABS processing and the like are performed. FIGS. 66 and 67 show a state in which polishing for determining a throat height has been performed.

(3) Embodiment 3

Embodiment 3 is a process of manufacturing a thin film magnetic head shown in FIGS. 9 and 10, and is illustrated in FIGS. 68 to 78. Processes which have been illustrated and described in embodiment 1 or 2 and are used also in embodiment 3 are referred to the description of embodiment 1 or 2 and the illustrations of the processes may be omitted.

Figure 68:
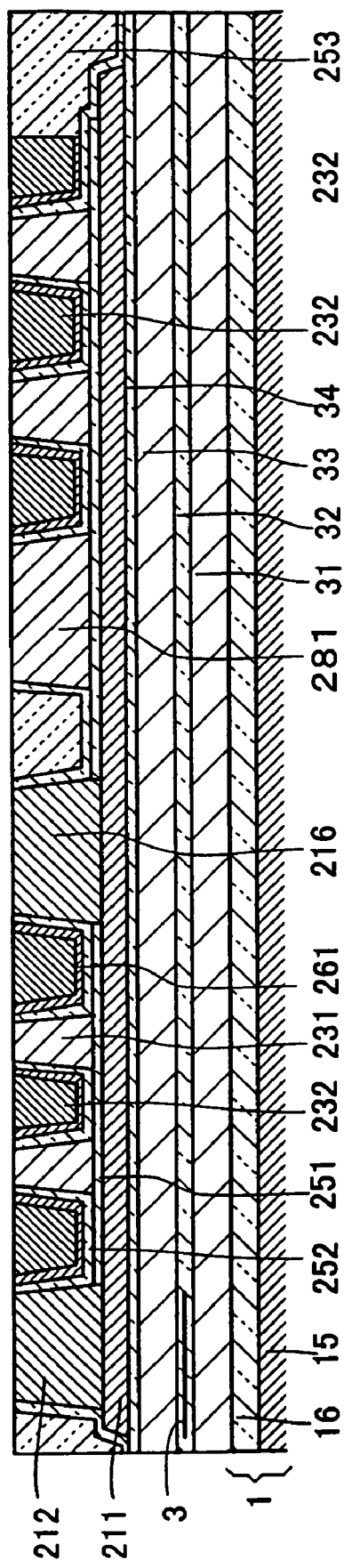
FIG. 68 is a diagram showing a process of manufacturing a thin film magnetic head having the electromagnetic converter portion shown in FIGS. 9 and 10.

(A) Process Leading to a State of FIG. 68

FIG. 68 shows a state in which the manufacturing processes shown in FIGS. 45 to 52 have been performed. In the state of FIG. 68, a flat spiral pattern of the second coil 232 is obtained by CMP, insulated from the first coil 231 by the insulating film 252. And the surfaces of the pole piece 212, the back gap piece 216 and the insulating film 253 are polished so as to form the same plane as the surfaces of the first coil 231 and the second coil 232.

Figure 69:
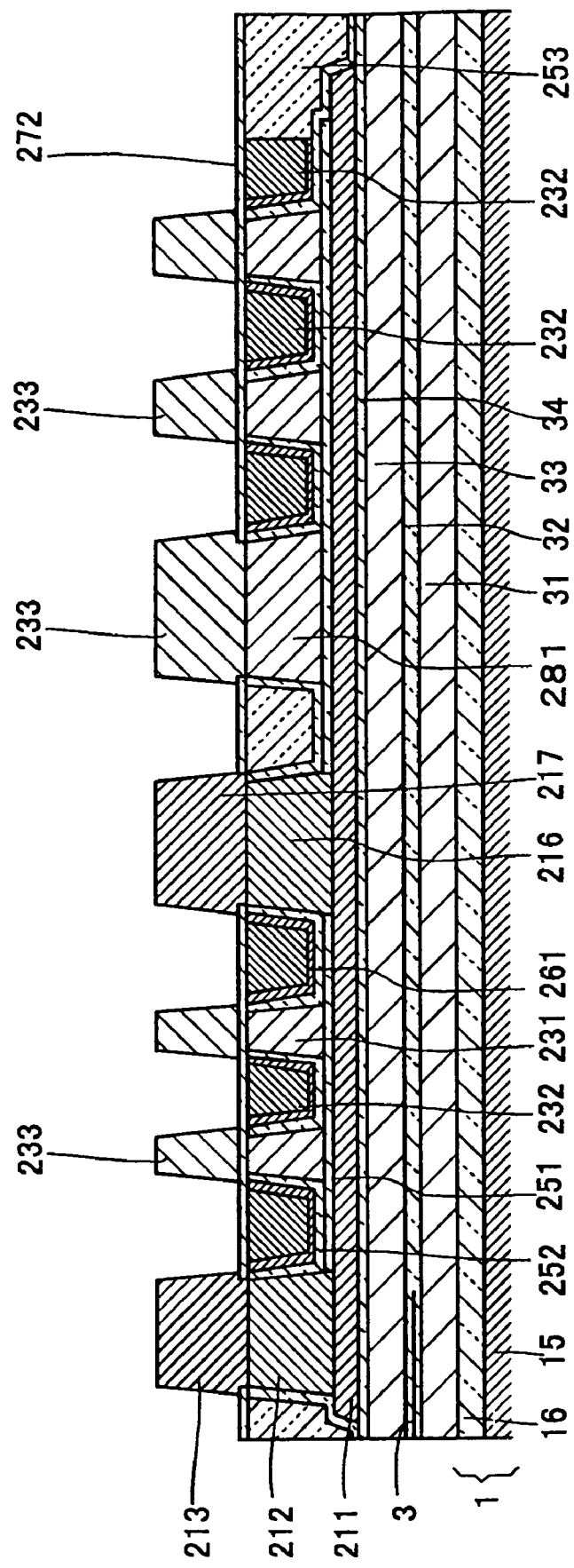
FIG. 69 is a diagram showing a process after the process shown in FIG. 68.

(B) Process Leading to a State of FIG. 69

FIG. 69 shows a state in which the third coil 233, the pole piece 213 and the back gap piece 217 have been formed on the surface flattened by the process shown in FIG. 68. The third coil 233, the pole piece 213 and the back gap piece 217 can be formed by applying the processes illustrated and described in FIGS. 11 to 14 (embodiment 1) or the processes illustrated and described in FIGS. 45 and 46 (embodiment 2).

In case of using the processes shown in FIGS. 11 to 14, first an insulating film 272 is formed on the flattened surface so as to have an area slightly larger than an area necessary for forming a coil, and a seed film is formed on the surface of the insulating film 272 and the flattened surface. The seed film is made of a material suitable for a Cu-plating ground film and is formed 50 nm to 80 nm thick by a Cu-CVD process.

Next, a photoresist film is formed on the seed film by applying a spin coat method and the like, and then is exposed with a mask MSK having a coil pattern and developed. The photoresist film may be either positive photoresist or negative photoresist.

In the above-mentioned photolithography process, the depth of focus of an exposure system (stepper) is adjusted so as to be positioned below the seed film, namely, minus-focused. Due to this, the photoresist film is exposed in such a manner that a wider area is exposed in the lower part of it and a narrower area is exposed in the upper part. The minus focus is set to be in a range of 0 to 0.5 µm or in a range of 0 to 1.2 µm, in relation to the surface of the seed film (see FIG. 11).

By the above-mentioned exposure process and the following development process, a coil forming pattern which is wider in the lower part and narrower in the upper part is obtained. The coil forming pattern is defined by a resist frame (see FIG. 12).

Next, a selective Cu-plating process is performed, and thus a third coil 233 is grown 3 to 3.5 µm thick on the seed film present inside the coil forming pattern S1. The third coil 233 is formed so that its sectional shape is wider in the lower part and narrower in the upper part, corresponding to the shape of the coil forming pattern.

Next, the resist frame, which has been used for forming the third coil 233, is removed by means of chemical etching or the like, and after that a photolithography process for forming a pole piece and back gap piece is performed so that a resist frame for forming a pole piece and a back gap piece is formed. In this photolithography process, the depth of focus of an exposure system is adjusted to be minus-focused as described above. Due to this, the photoresist film is exposed in such a manner that a wider area is exposed in the lower part of it and a narrower area is exposed in the upper part.

Next, a selective plating process is performed so that a pole piece 213 is grown on the pole piece 212 and a back gap piece 217 is grown on the back gap piece 216 as shown in FIG. 69. The pole piece 213 and the back gap piece 217 each are formed so that its sectional shape is wider in the lower part and narrower in the upper part.

In case of adopting the processes shown in FIGS. 45 and 46, a photoresist film is formed on the seed film and then is exposed with a mask having a coil pattern and developed, so a resist frame is formed. A selective Cu-plating process is performed by the resist frame thus obtained so that a third coil 233 is grown 3 to 3.5 µm thick on the seed film present inside the coil forming pattern (see FIG. 45).

Next, the resist frame is removed by means of chemical etching or the like, and after that a photolithography process for forming a pole piece and back gap piece is performed so that a resist frame for forming a pole piece and a back gap piece is formed.

Next, a selective plating process is performed so that a pole piece 213 is grown on the pole piece 212 and a back gap piece 217 is grown on the back gap piece 216. After that, the resist frame is removed by means of chemical etching or the like.

It is necessary that the third coil 233, the pole piece 213 and the back gap piece 217 each are formed so that its sectional shape is wider in the lower part and narrower in the upper part. The taper angle is equal to or more than 80 degrees and less than 90 degrees in relation to the flattened surface or the surface of the insulating film 272. As a means for achieving the above-mentioned taper angle, ion beam etching (IBE) is applied to both side faces of coil turns of the third coil 233, the pole piece 213 and the back gap piece 217 so as to make their sectional shapes wider in the lower parts and narrower in the upper parts (see FIG. 46). In the IBE process, ion beams are applied onto one side face at 15 to 30 degrees and onto the other side face at 20 to 47 degrees.

Figure 70:
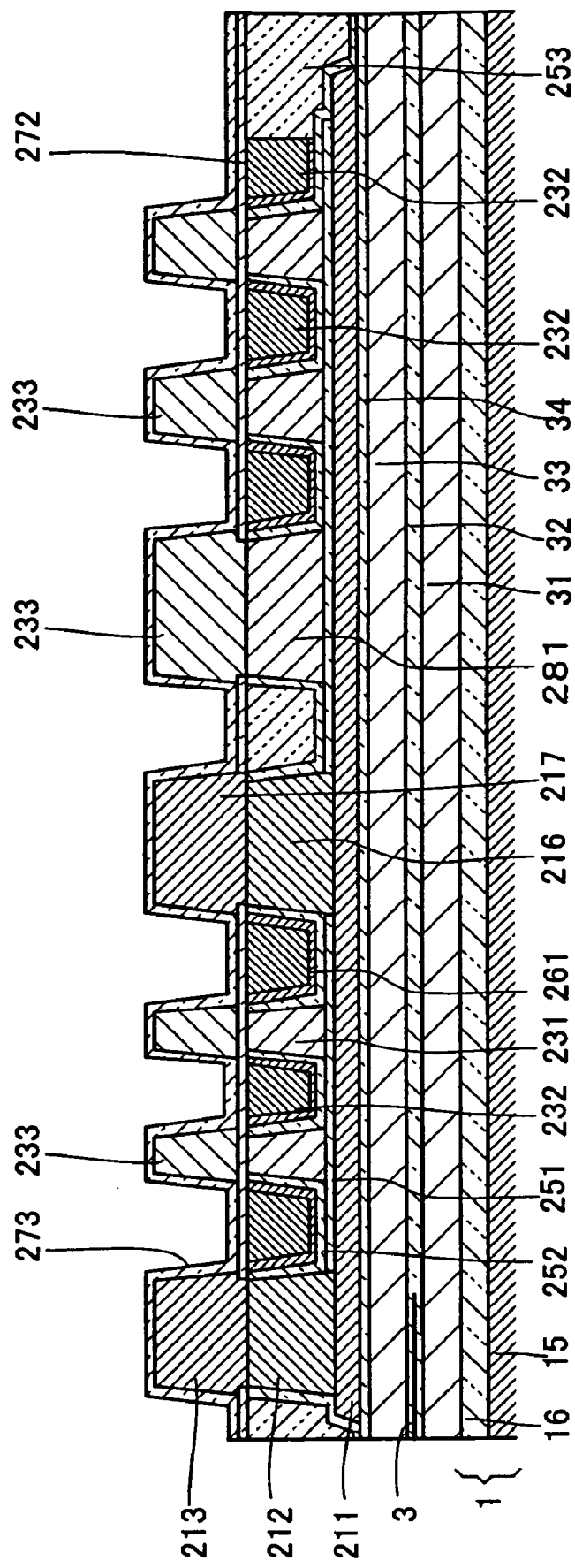
FIG. 70 is a diagram showing a process after the process shown in FIG. 69.

(C) Process Leading to a State of FIG. 70

FIG. 70 shows a state in which an insulating film 273 has been deposited on the surfaces and side faces of the insulating film 272, the third coil 233, the pole piece 213 and the back gap piece 217. The insulating film 273, which is formed by an $Al_2O_3$-CVD process, is formed 0.05 to 0.15 µm thick.

Figure 71:
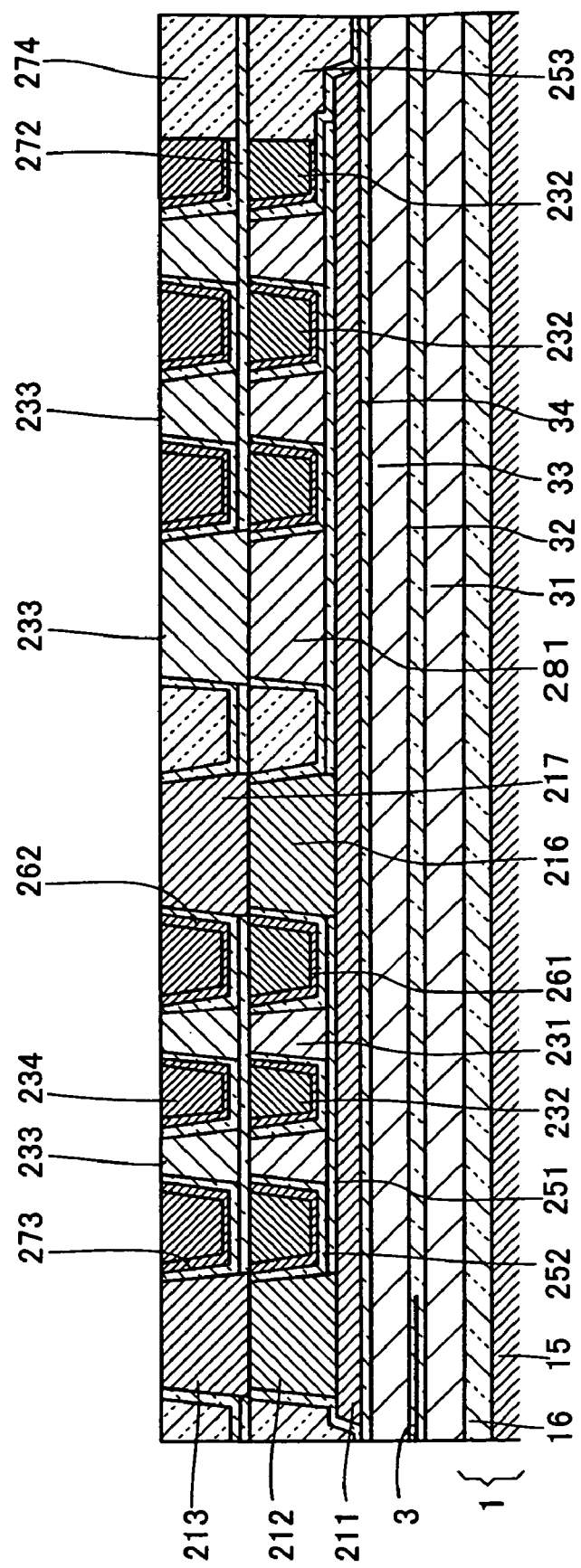
FIG. 71 is a diagram showing a process after the process shown in FIG. 70.

(D) Process Leading to a State of FIG. 71

FIG. 71 shows a state in which the third coil 233, fourth coil 234, seed film 262, insulating films 273 and 274, pole piece 213 and back gap piece 217 have been formed above the first coil 231 and the second coil 232, insulated from the first coil 231 and the second coil 232 by the insulating film 272, and the surfaces thereof have been polished by CMP to be flattened. A process leading from the state of FIG. 70 to the state of FIG. 71 is substantially the same as the process shown in FIGS. 49 to 52.

That is to say, an insulating film 273 is deposited on the surfaces and side faces of the insulating film 272, the third coil 233, the pole piece 213 and the back gap piece 217, and then a seed film 262 is deposited 50 nm thick by Cu-sputtering (see FIG. 49).

Next, a plating film to become a fourth coil 234 is formed 3 to 5 µm thick on the seed film 262 by a frame plating method (see FIG. 50). The plating film comprises Cu as its main constituent.

Next, an insulating film 274 of $Al_2O_3$ is formed so as to cover an area not covered with the plating film and the surface of the plating film (see FIG. 51). The insulating film 274 is formed as a sputtering film of 4 to 6 µm in thickness.

Next, the insulating film 274 and the plating film 234 are polished by CMP to be flattened (see FIG. 52). Consequently, the fourth coil 234 of a flat spiral pattern is obtained, insulated from the third coil 233 by the insulating film 273. In CMP, the surfaces of the pole piece 213, the back gap piece 217 and the insulating film 274 are also polished so as to form the same plane as the surfaces of the third coil 233 and the fourth coil 234. Thus the state shown in FIG. 71 is obtained.

Figure 72:
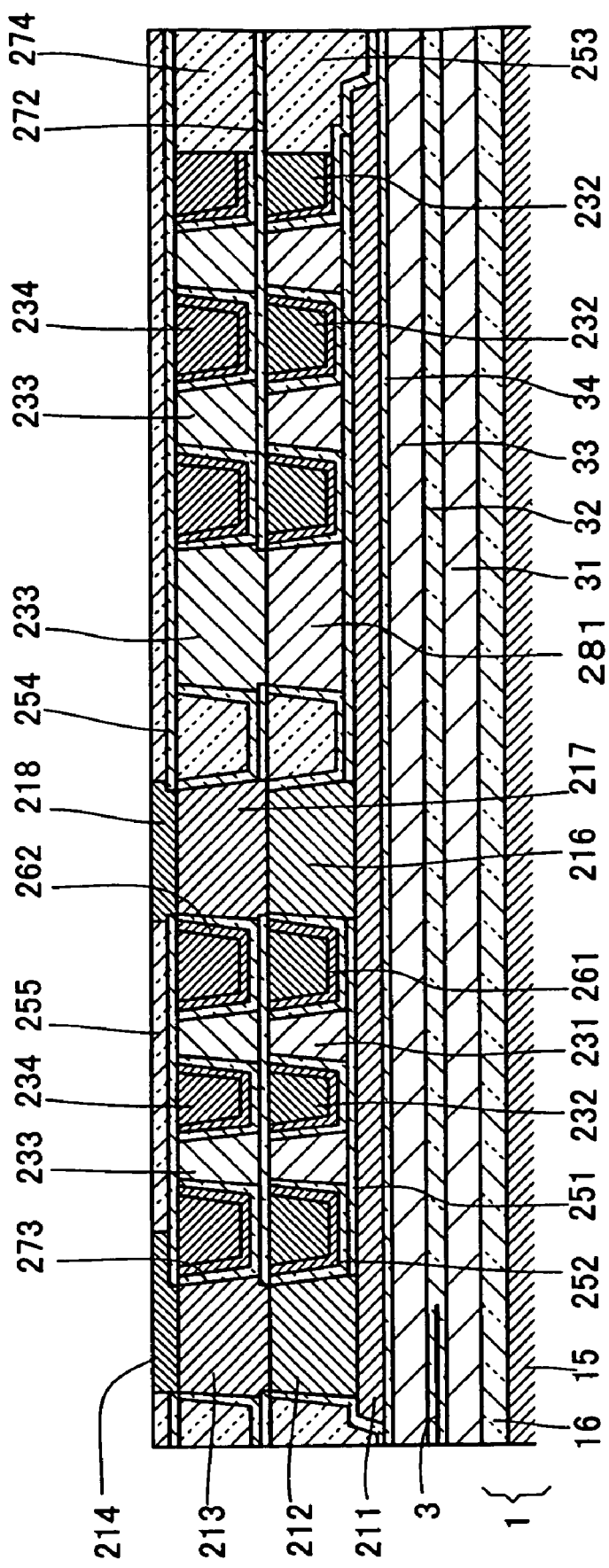
FIG. 72 is a diagram showing a process after the process shown in FIG. 71.

(E) Process Leading to a State of FIG. 72

FIG. 72 shows a state in which the surfaces of the third coil 233, fourth coil 234, seed film 262, insulating films 273 and 274, pole piece 213 and back gap piece 217 have been polished by CMP to be flattened, a patterned insulating film 254 has been deposited on the flattened surfaces, a pole piece 214 has been deposited on the pole piece 213, a back gap piece 218 has been deposited on the back gap piece 217, and the vicinity of the pole piece 214 and the back gap piece 218 have been filled up with an insulating film 255.

The process leading from the state of FIG. 71 to the state of FIG. 72 is substantially the same as the process of FIGS. 22 to 26 of embodiment 1.

That is to say, an insulating film 254 is deposited so as to cover the surfaces of the third coil 233 and the fourth coil 234 (see FIG. 22). The insulating film 254 is made of $Al_2O_3$, formed 0.2 µm thick, for example.

Next, a photolithography process is performed on one surface where the insulating film 254 has been formed, so that a resist frame for forming a pole piece 214 and a back gap piece 218 is formed. According to a pattern defined by the resist frame thus obtained, the pole piece 214 and the back gap piece 218 are formed by a frame plating method (see FIG. 24). After the pole piece 214 and the back gap piece 218 are formed, the resist frame is removed. The pole piece 214 and the back gap piece 218 each are a sputtering film of CoNiFe (2.4 tesla) and are 0.3 to 0.6 µm thick, for example.

Next, an insulating film 255 of $Al_2O_3$ is deposited on the surface where the pole piece 214 and the back gap piece 218 have been formed, the insulating film 255 being 1 to 21 µm thick, for example (see FIG. 25). After that, the surfaces of the insulating film 255, the pole piece 214 and the back gap piece 218 are polished by CMP (see FIG. 26). This CMP is performed so that the pole piece 214 and the back gap piece 218 are 0.5 µm or more in thickness, for example.

Figure 73:
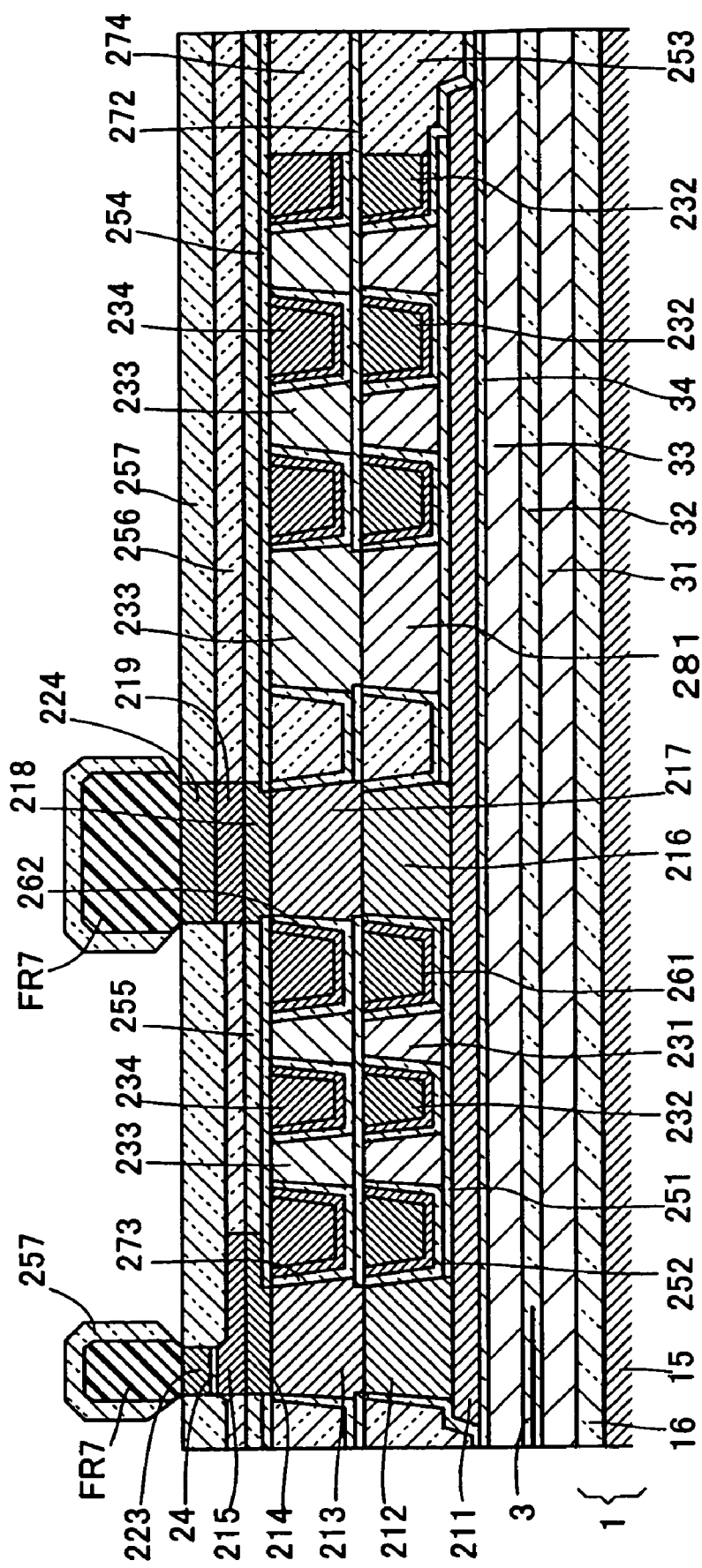
FIG. 73 is a diagram showing a process after the process shown in FIG. 72.

(F) Process Leading to a State of FIG. 73

A process leading from the state of FIG. 72 to the state of FIG. 73 is substantially the same as the process of FIGS. 27 to 35 of embodiment 1.

That is to say, a magnetic film 215 for forming a pole piece 215 is formed 0.5 µm thick on the polished surfaces of the insulating film 255, the pole piece 214 and the back gap piece 218 (see FIG. 27). The magnetic film 215 can be made of CoFeN.

Next, a photoresist film is deposited on the surface of the magnetic film 215 and then a photolithography process is performed (see FIG. 28). In this photolithography process, the photoresist film is patterned so that a T-shaped resist cover is left on the pole piece 214 and the back gap piece 218 (see FIG. 29). After that, a magnetic film 215 is patterned by ion beam etching using the resist cover as a mask. Consequently, a pole piece 215 and a back gap piece 219 are formed. Next, an insulating film 256 of $Al_2O_3$ is deposited 0.6 µm thick by means of sputtering or the like (see FIG. 30). After that, the resist cover on the pole piece 215 and the back gap piece 219 is removed and the surfaces of the insulating film 256, the pole piece 215 and the back gap piece 219 are polished by CMP to be more completely flattened (see FIG. 31). This CMP is performed by such a small degree as to produce a polishing quantity of 0.03 to 0.05 µm in thickness, for example.

Next, a patterned gap film 24 is formed on the flattened surface of the pole piece 215 and the flattened surface of the insulating film 256 (see FIG. 32). The gap film 24 is made of a non-magnetic material such as $Al_2O_3$, Ru, NiCu or Ta, formed 0.1 µm thick, for example.

Next, a magnetic film 223 is deposited so as to cover the surfaces of the gap film 24, the back gap piece 219 and the insulating film 256 (see FIG. 33). The magnetic film 223, which is for forming a pole piece 223 and a back gap piece 224, is made of a magnetic material such as CoFeN, formed 0.2 to 0.6 µm thick, for example.

Next, a T-shaped resist cover is formed on the surface of the magnetic film 223 by a photolithography process (see FIG. 34). The resist cover is formed so as to be positioned above the pole pieces 212 to 215 and the back gap pieces 216 to 219. After that, an ion beam etching process (IBE process) is performed so that shaped patterns of a pole piece 223, a gap film 24 and a back gap piece 224 are obtained (see FIG. 35). This IBE process can be performed by applying ion beams, for example, at 0 degree and 75 degrees so that the pole piece 223 is etched by a depth of 0.3 to 0.6 µm, and further etched to expose the gap film 24 or to expose the pole piece 214 positioned under the gap film 24. After that, an insulating film 257 is deposited so as to fill up the depth etched by IBE, and then the state of FIG. 73 is brought. In FIG. 73, a resist cover FR7 is formed above the pole pieces 212 to 215 and the back gap pieces 216 to 219.

Figure 74:
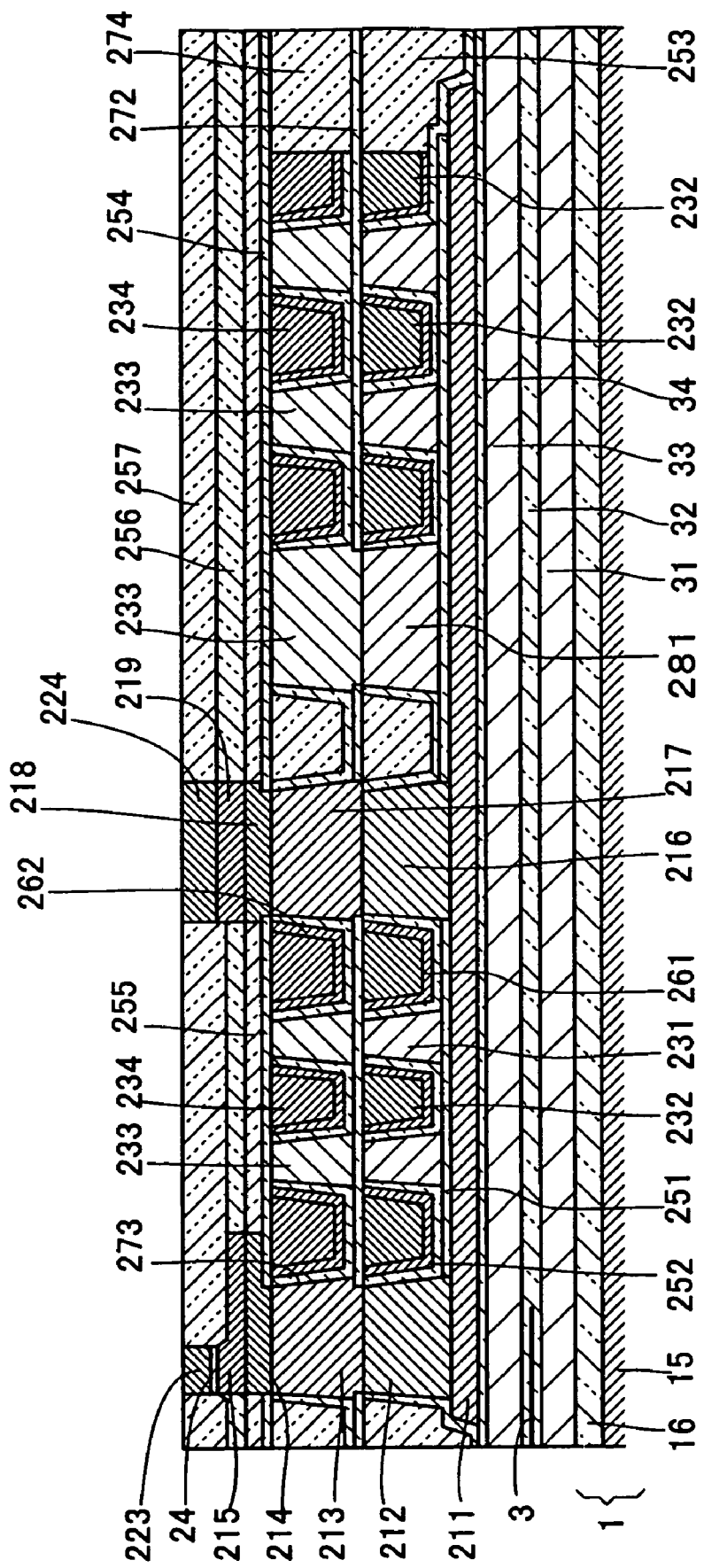
FIG. 74 is a diagram showing a process after the process shown in FIG. 73.

(G) Process Leading to a State of FIG. 74

In the process leading from the state of FIG. 73 to the state of FIG. 74, the resist cover FR7 is removed. The surface from which the resist cover FR7 has been removed is polished by CMP to be flattened. This CMP is performed by such a small degree as to produce a polishing quantity of 30 to 70 nm. FIG. 74 shows a state in which the polishing by CMP has been performed.

Figure 75:
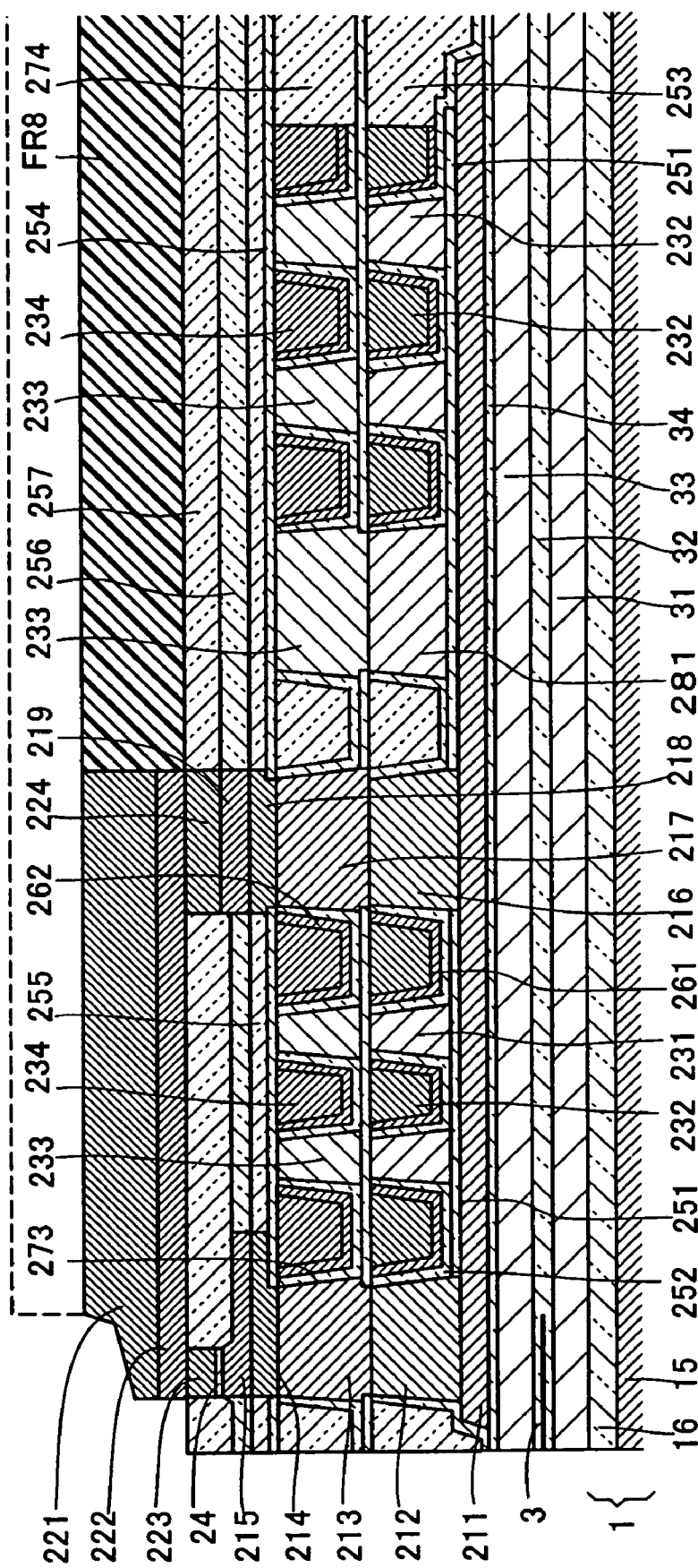
FIG. 75 is a diagram showing a process after the process shown in FIG. 74.
Figure 76:
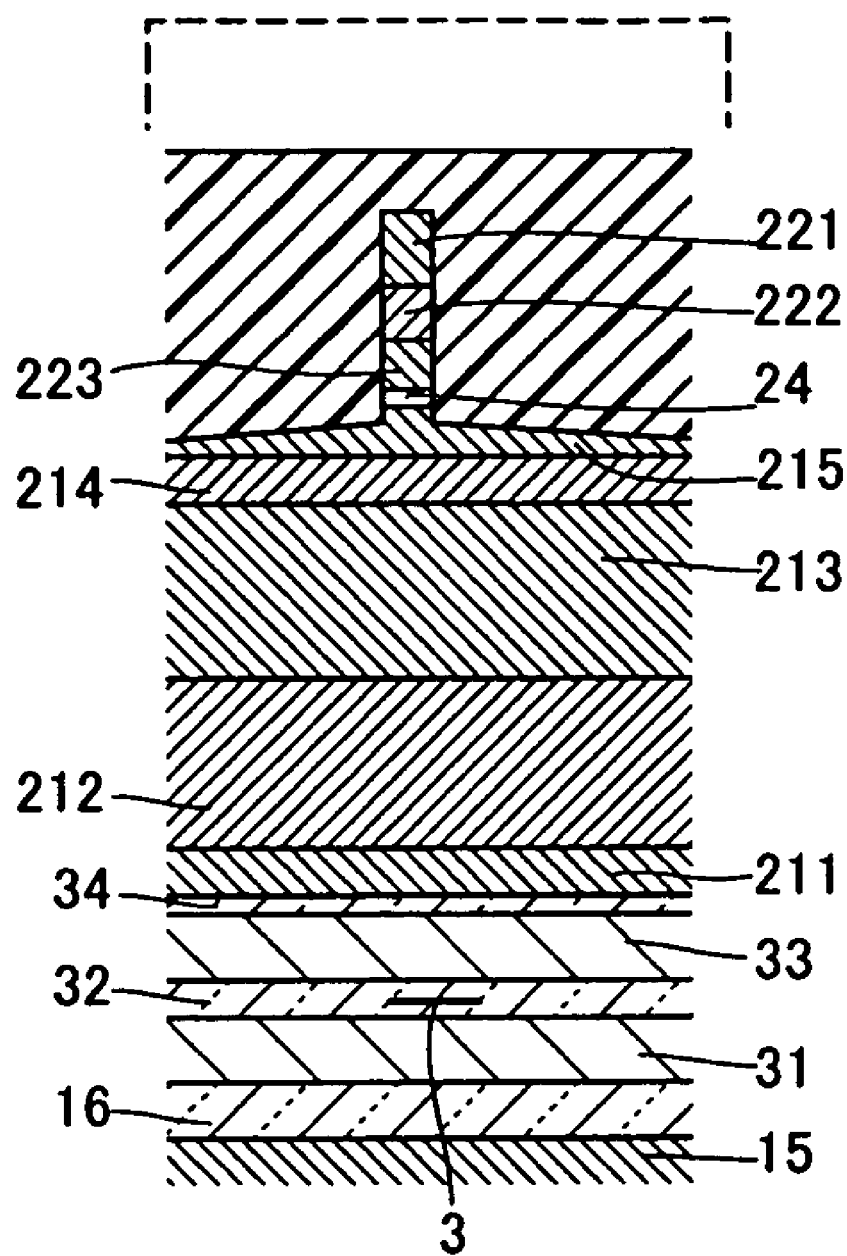
FIG. 76 is a diagram of a write element obtained through the process shown in FIG. 75, seen from the ABS side.

(H) Process Leading to a State of FIGS. 75 and 76

The process leading from the state of FIG. 74 to the state of FIGS. 75 and 76 includes the process shown in FIG. 37 of embodiment 1.

First, a third magnetic film 222 of CoFeN or the like is deposited 50 to 500 nm thick on the flattened surfaces by means of sputtering or the like, and then the surface of the third magnetic film 222, used as a seed film, is selectively plated with a second magnetic film 221 of CoNiFe (see FIG. 37). The plating thickness is 3.0 to 3.5 µm, for example.

After that, as shown in FIG. 75, the tips of pole pieces 221 and 222 formed of the second magnetic film 221 and the third magnetic film 222 are trimmed by ion beam etching (IBE), and then the whole second magnetic film 221 except a part to be the pole piece 221 is covered with a photoresist FR8, and the third magnetic film 222, the pole piece 223, the gap film 24 and the pole piece 214 are etched by IBE. By this IBE process, the third magnetic film 222, the pole piece 223, the gap film 24 and the pole piece 214 are made narrow in track width as shown in FIG. 76. The depth of etching the pole piece 214 is determined to be in a range of 0.3 to 0.35 µm, for example.

Because the whole second magnetic film 221 except the part to be a pole piece 221 is covered with the photoresist FR8, the second magnetic film 221 are made to have a low area at the pole part and a high area not etched at the other part. Consequently, a side write phenomenon and a side erase phenomenon are reduced.

Figure 77:
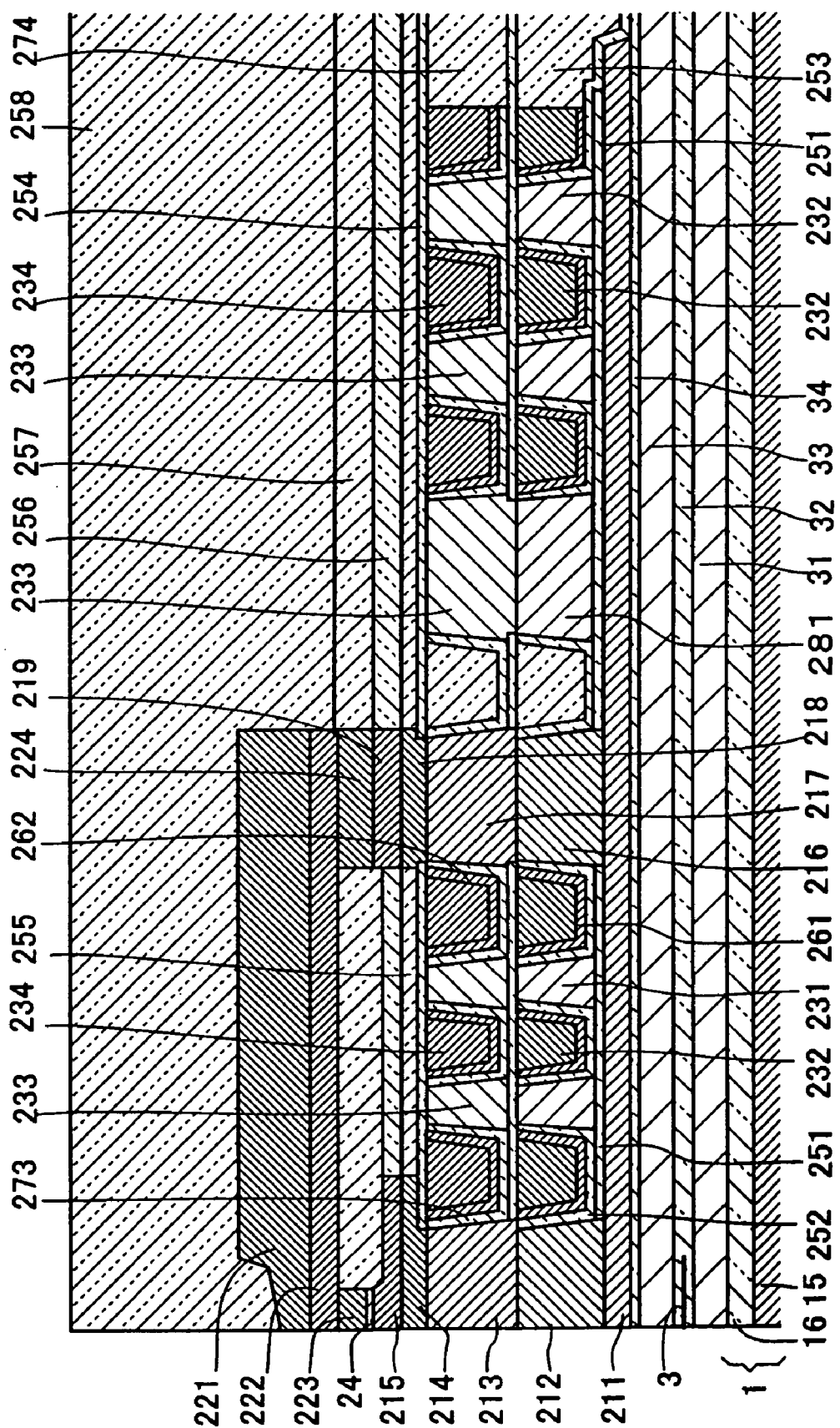
FIG. 77 is a diagram showing a process after the process shown in FIGS. 75 and 76.
Figure 78:
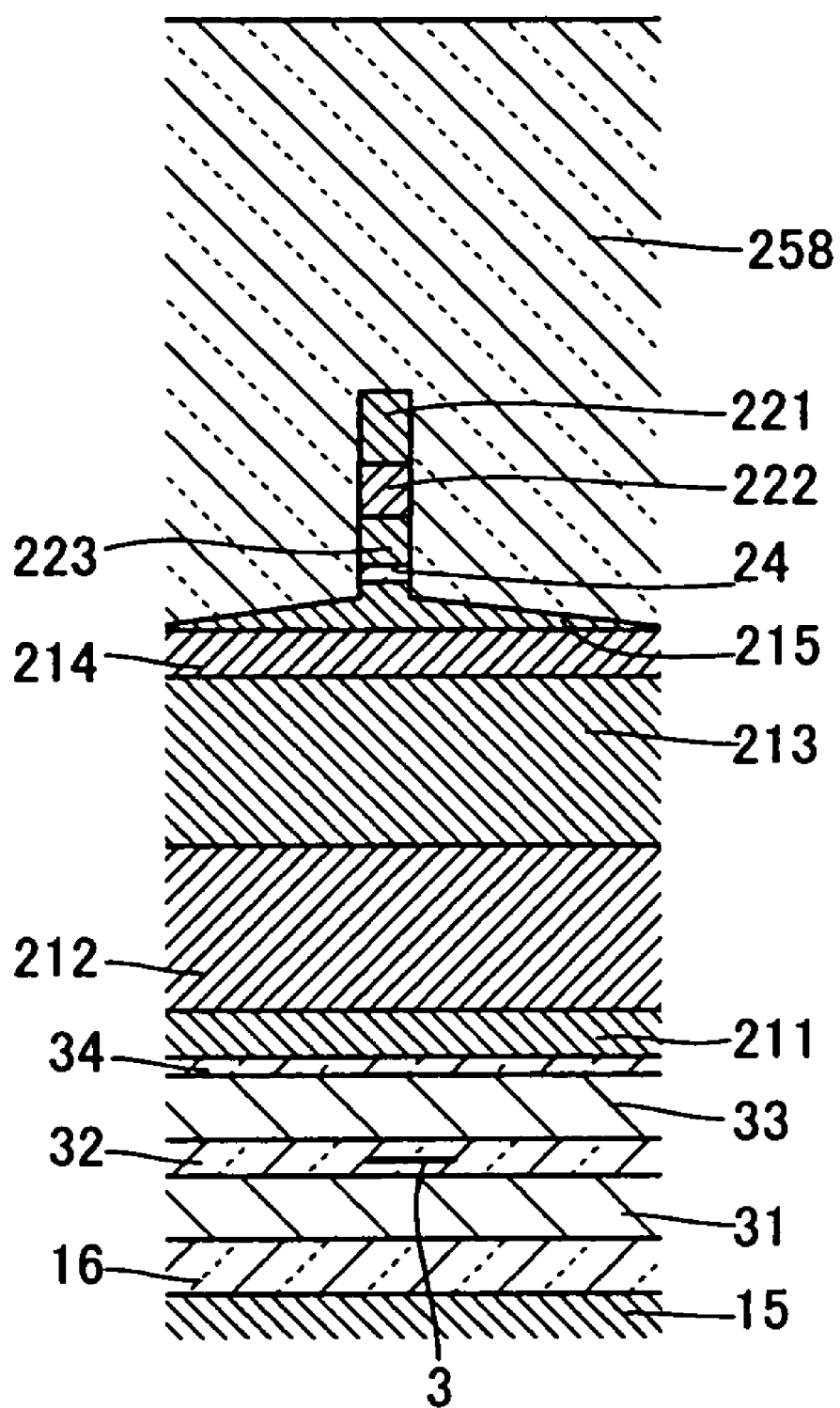
FIG. 78 is a diagram of a write element obtained through the process shown in FIG. 77, seen from the ABS side.

After that, as shown in FIGS. 77 and 78, the photoresist FR8 is removed and a protective film 258 is deposited, so the process is completed.

(4) Another Example of Providing a Taper Angle

As a means for providing the second coil 232 or the fourth coil 234 with a taper angle, embodiments 1 to 3 includes: providing the first coil 231 or the third coil 233 with a taper angle; and forming the second coil 232 or the fourth coil 234 according to the taper angle the first coil 231 or the third coil 233 thereby producing a taper angle of the second coil 232 or the fourth coil 234. FIGS. 79 to 83 show a process for providing a taper angle other than that of embodiments 1 to 3.

Figure 79:
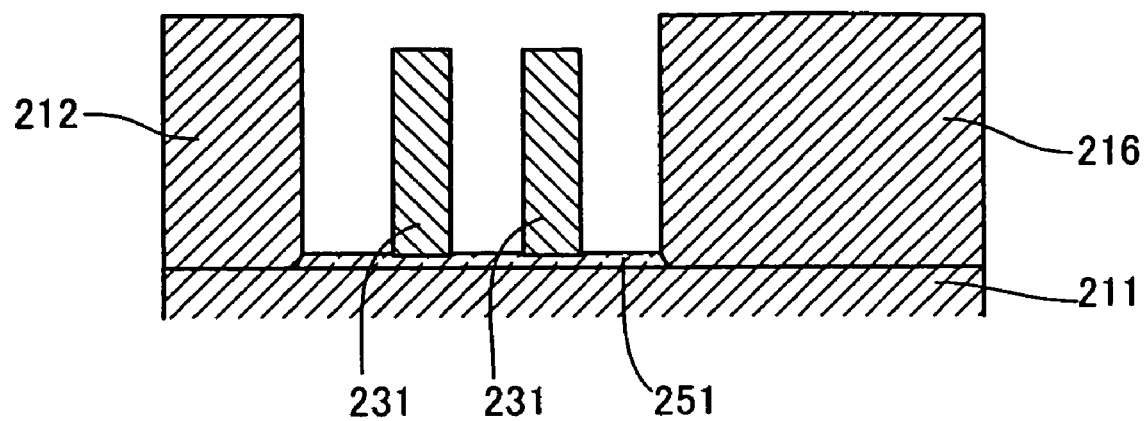
FIG. 79 is a diagram showing a process of providing a taper angle.

First, as shown in FIG. 79, an insulating film 251 is formed on the surface of a magnetic film 211, and a first coil 231 (or a third coil) is formed on the insulating film 251 by a photolithography process. And a coil piece 212 and a back gap piece 216 are formed on the surface of the first magnetic film 211 by a photolithography process. Details of the photolithography process in this case are as described with reference to FIG. 45 and the like.

Figure 80:
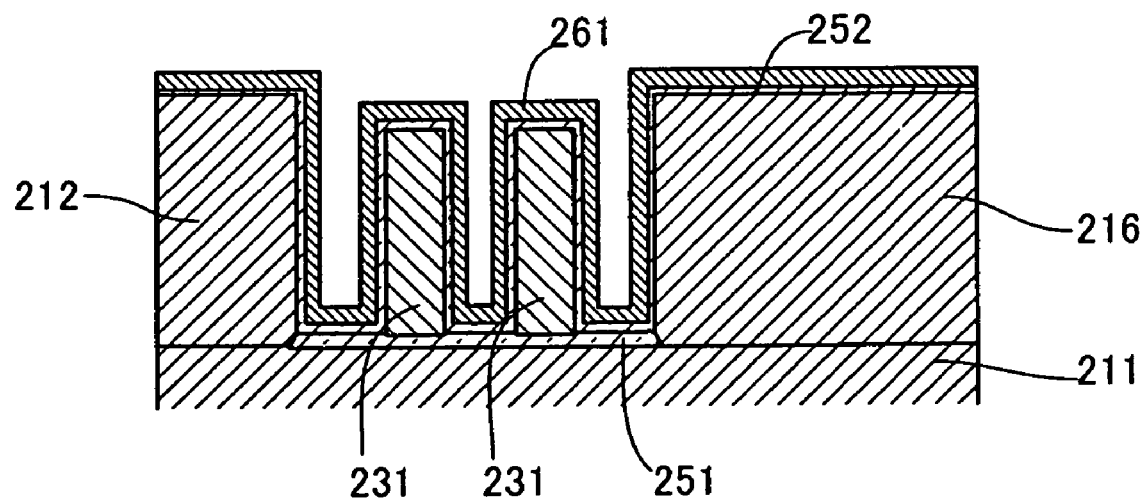
FIG. 80 is a diagram showing a process after the process shown in FIG. 79.

Next, as shown in FIG. 80, an insulating film 252 is deposited on the surfaces and side faces of the insulating film 251, first coil 231, pole piece 212 and back gap piece 216. The insulating film 252 is formed about 0.1 µm in thickness by an $Al_2O_3$-CVD process.

Next, a Cu-sputtering film is formed 50 nm thick on the surface of the insulating film 252, and then a seed film 261 is formed 50 to 150 nm thick thereon by a Cu-CVD process.

Figure 81:
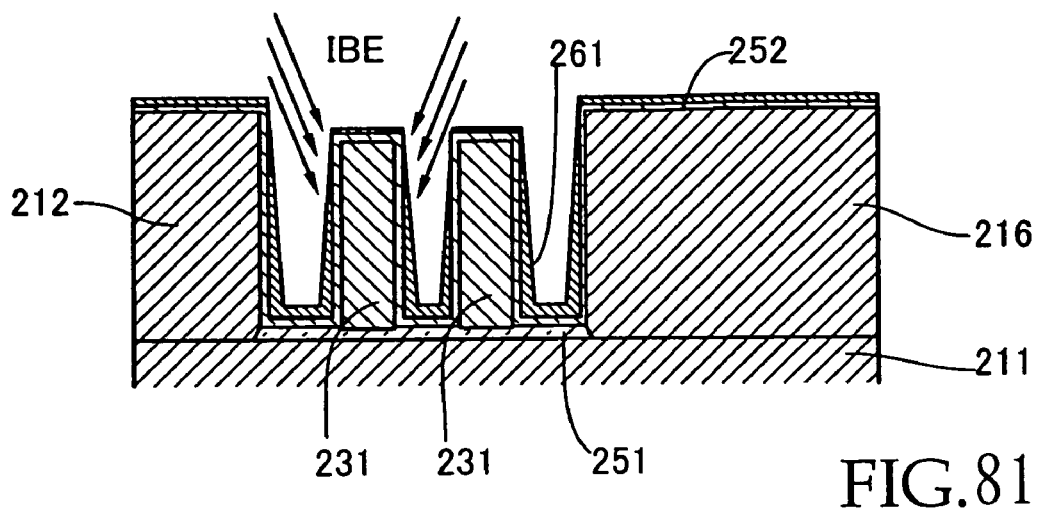
FIG. 81 is a diagram showing a process after the process shown in FIG. 80.

Next, as shown in FIG. 81, ion beams are applied aslant from above so that the seed film 261 is etched, the opening of the seed film becoming larger in the upper part. It is preferable that the ion beam irradiations are performed at least twice. In this case, ion beams are applied at 0 to 40 degrees in the first irradiation and at 40 to 70 degrees in the second irradiation. These irradiations make the seed film 261 etched more greatly at a position closer to the opening end, and consequently a taper angle is achieved. The ion beam irradiations must be performed so as not to cut the seed film 261.

Figure 82:
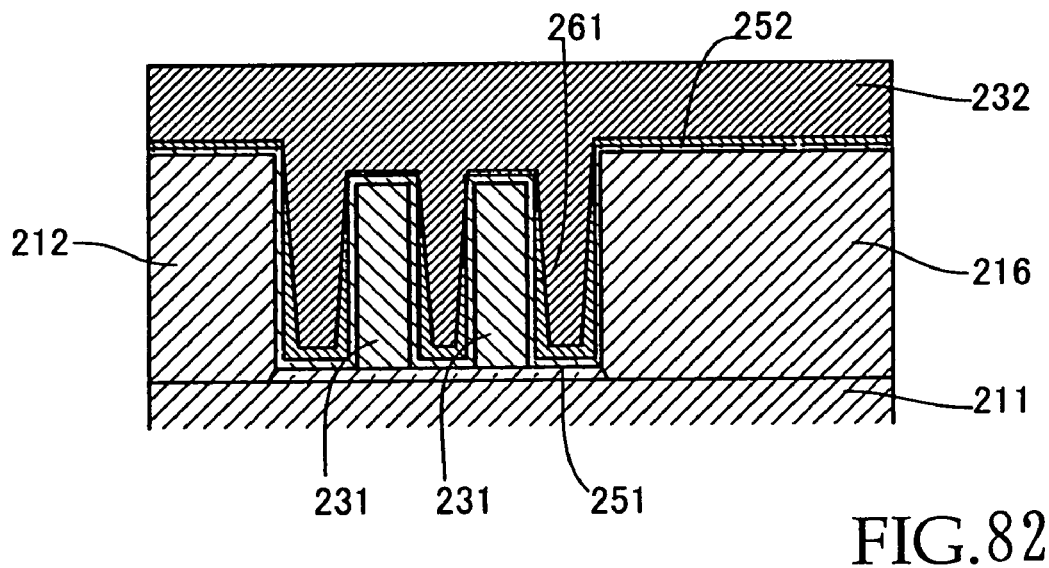
FIG. 82 is a diagram showing a process after the process shown in FIG. 81.

Next, as shown in FIG. 82, a Cu-plating film 232 for forming a second coil is formed 4 to 5 μm thick, for example. Since the seed film 261 is provided with a taper angle making the opening larger at a position closer to the opening end, the Cu-plating film 232 can be formed without making a keyhole.

Figure 83:
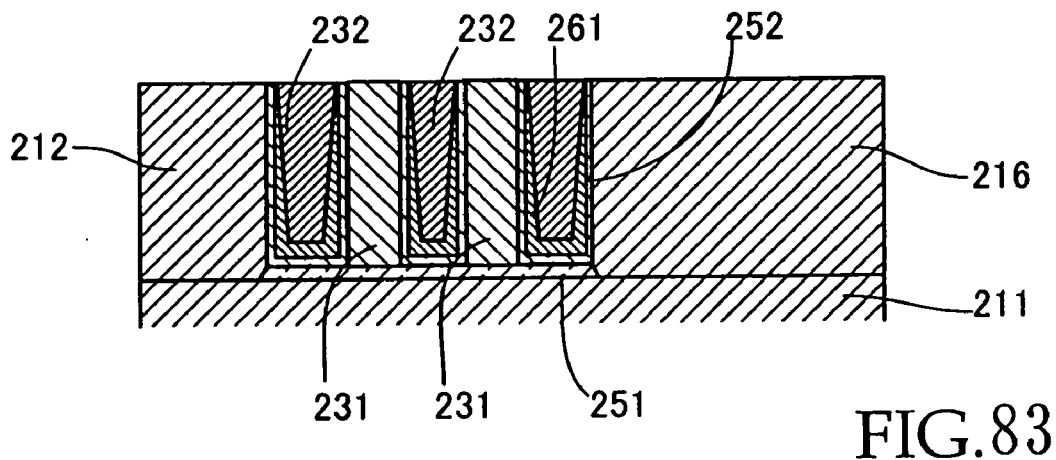
FIG. 83 is a diagram showing a process after the process shown in FIG. 82.

Next, as shown in FIG. 83, the Cu-plating film 232 is polished by CMP to be flattened. In the CMP, alumina-based slurry is used. Consequently, the second coil 232 of a flat spiral pattern is obtained, insulated from the first coil 231 by the insulating film 252. In the CMP, the surfaces of the pole piece 212 and the back gap piece 216 are also polished so as to form the same plane as the surfaces of the first coil 231 and the second coil 232.

The processes of FIGS. 79 to 83 may also be applied to the case of forming a third coil 233 and a fourth coil 234. Processes after the process of FIG. 83 are as described in embodiments 1 to 3.

3. Magnetic Head Device and Magnetic Recording/reproducing Apparatus

Figure 84:
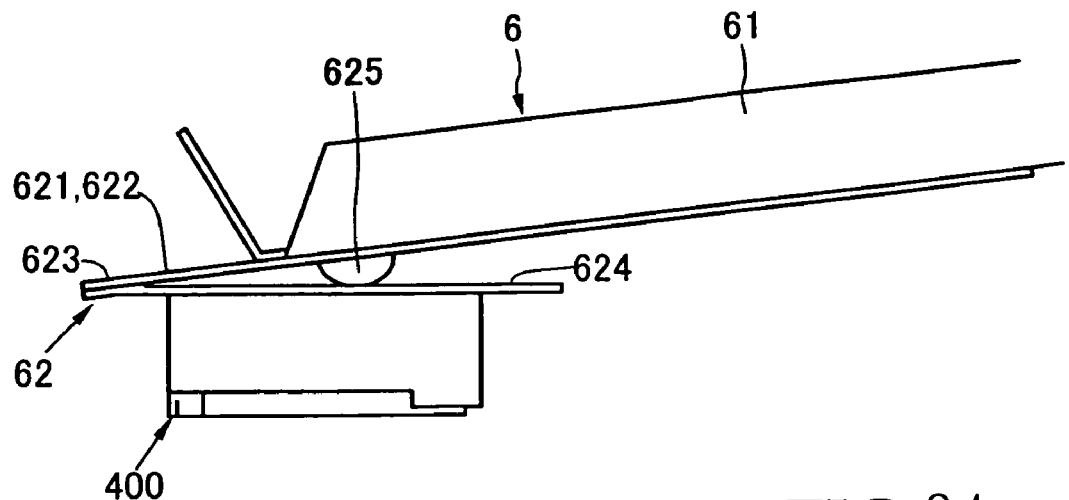
FIG. 84 is a front view of a magnetic head device having a thin film magnetic head according to the present invention.
Figure 85:
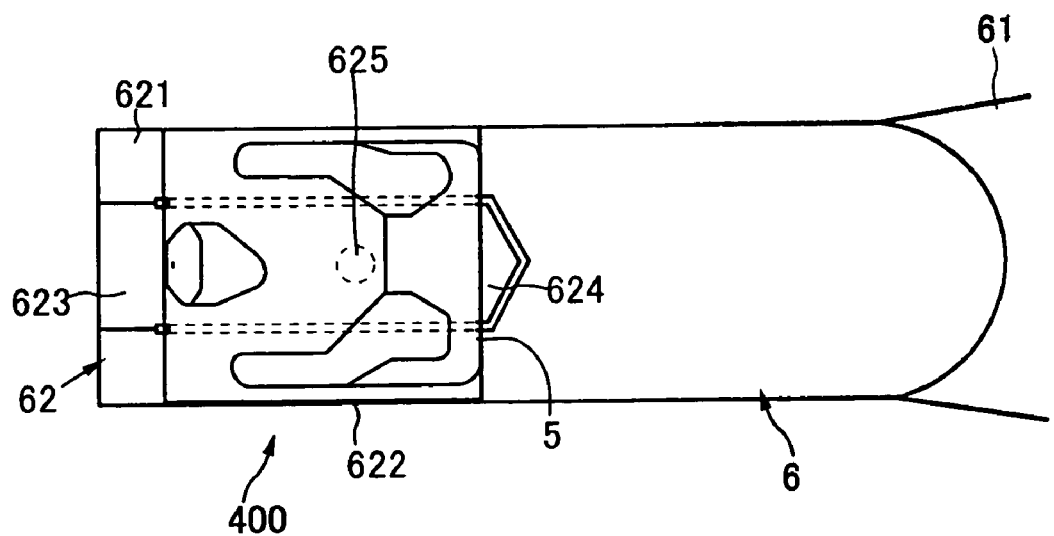
FIG. 85 is a diagram of the magnetic head device shown in FIG. 84, seen from the bottom side (ABS side).

The present invention also provides a magnetic head device and a magnetic recording/reproducing apparatus. Referring to FIGS. 84 and 85, a magnetic head device according to the present invention comprises a thin film magnetic head 400 shown in FIGS. 1 to 10 and a head supporting device 6. The structure of the head supporting device 6 is as follows: a flexible member 62 made of a metal sheet is attached to a free end of a supporting member 61 made of a metal sheet, the free end being at one end in the longitudinal direction; and the thin film magnetic head 400 is attached to the lower surface of the flexible member 62.

In specific terms, the flexible member 62 has: two outer frame portions 621 and 622 extending nearly in parallel with the longitudinal axial line of the supporting member 61; a lateral frame 623 for connecting the outer frame portions 621 and 622 at the end which is distant from the supporting member 61; and a tongue-shaped piece 624 extending nearly from the middle part of the lateral frame 623 nearly in parallel with the outer frame portions 621 and 622 and having a free end at the tip. One end of the flexible member 62 opposite to the lateral frame 623 is joined to the vicinity of the free end of the supporting member 61 by means of welding or the like.

The lower face of the supporting member 61 is provided with a loading projection 625 in the shape of a hemisphere, for example. This loading projection 625 transmits load from the free end of the supporting member 61 to the tongue-shaped piece 624.

The thin film magnetic head 400 is joined to the lower surface of the tongue-shaped piece 624 by means of adhesion or the like. The thin film magnetic head 400 is supported so as to allow pitching and rolling actions.

A head supporting device to which the present invention is applied is not limited to the above-described embodiment. The present invention can also be applied to head supporting devices which have been proposed before or will be proposed in the future. For example, the present invention can be applied to a head supporting device obtained by integrating the supporting member 61 and the tongue-shaped piece 624 by a flexible high-molecular wiring sheet such as a TAB tape (TAB: tape automated bonding), and a head supporting device having a publicly known conventional gimbals structure.

Figure 86:
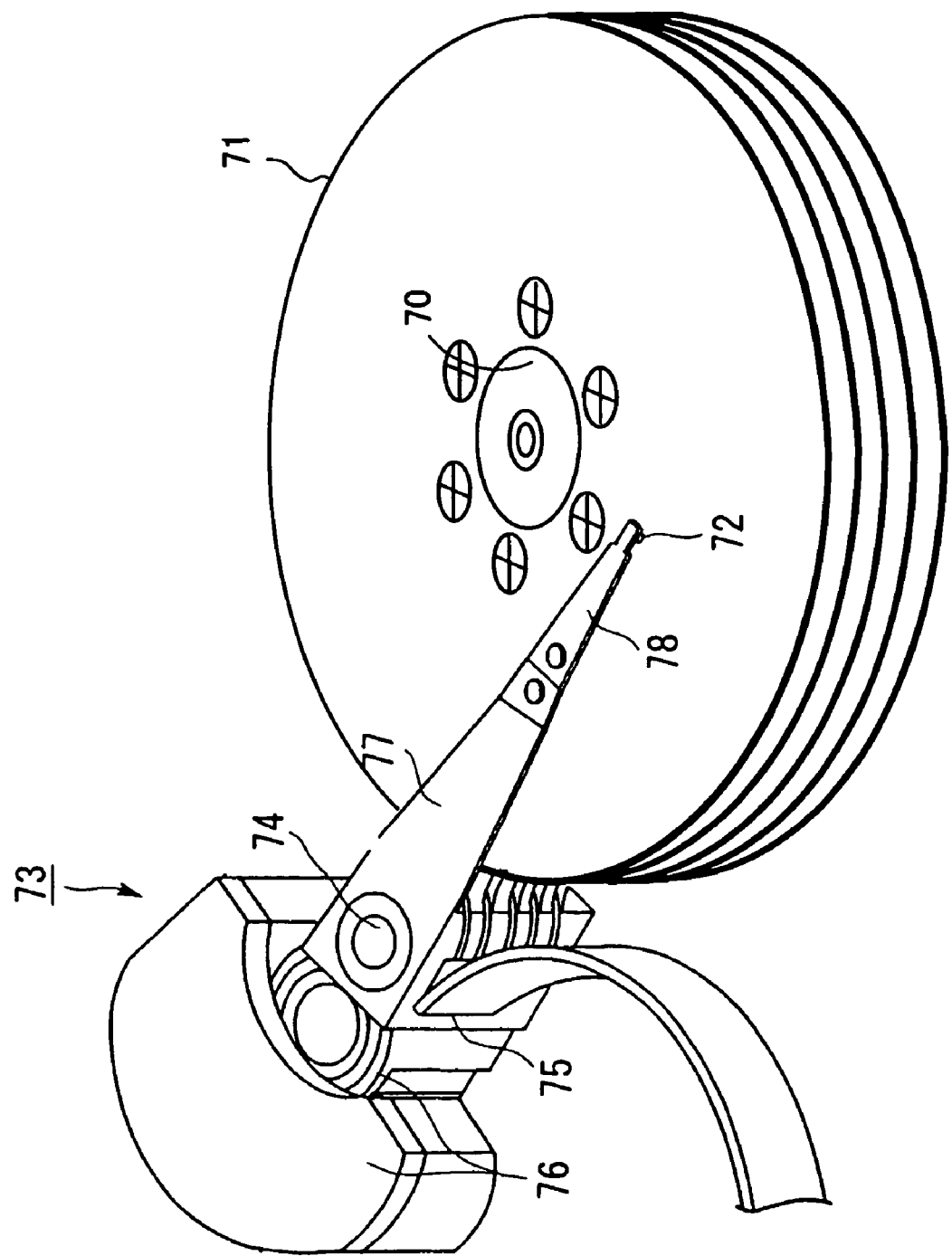
FIG. 86 is a schematic perspective view of a magnetic recording/reproducing apparatus obtained by combining a thin film magnetic head or a magnetic head device of the present invention with a magnetic recording medium.

Next, referring to FIG. 86, a magnetic recording/reproducing apparatus according to the present invention comprises a magnetic disk 71 provided so as to be capable of turning around an axis 70, a thin film magnetic head 72 for recording and reproducing information on the magnetic disk 71 and an assembly carriage device 73 for positioning the thin film magnetic head 72 on a track of the magnetic disk 71.

The assembly carriage device 73 comprises a carriage 75 capable of turning around an axis 74 and an actuator 76 composed of, for example, a voice coil motor (VCM) for turning this carriage 75, as main components The base portion of a plurality of driving arms 77 stacked in the axial direction of the axis 74 is attached to the carriage 75, and a head suspension assembly 78 with a thin film magnetic head 72 is fixedly joined to the tip of each driving arm 77. Each head suspension assembly 78 is joined to the tip of a driving arm 77 so that a thin film magnetic head 72 on the tip of the head suspension assembly 78 faces the surface of each magnetic disk 71.

The driving arm 77, head suspension assembly 78 and thin film magnetic head 72 form the magnetic head device described with reference to FIGS. 84 and 85. The thin film magnetic head 72 has the structure shown in FIGS. 1 to 10. Thus, the magnetic recording/reproducing apparatus shown in FIG. 86 exhibits the action and effect described with reference to FIGS. 1 to 10.

Although the contents of the present invention have been concretely described above with reference to the preferred embodiments, it is self-evident that people in this field can take various variations on the basis of the basic technical idea and teachings of the present invention.

What is claimed is:

1. A thin film magnetic head comprising a write element, wherein:
    said write element comprises a first magnetic film, a pole portion, a second magnetic film, a gap film, a first coil and a second coil;
    said first magnetic film has one flat surface;
    said pole portion comprises a first pole portion and a second pole portion;
    said first pole portion including at least one pole piece film lying on said flat surface of said first magnetic film, said at least one pole piece film having an upper end part narrowed to define a track width;
    said second pole portion faces said first pole portion with said gap film between them;
    said second magnetic film is connected to said second pole portion and is joined to said first magnetic film by a back gap portion that is recessed in the thin film magnetic head from the medium-facing surface;
    said first coil and said second coil surround in a spiral form said back gap portion on said flat surface of said first magnetic film, and one of said first and second coils is fitted into a space between coil turns of the other, insulated from the coil turns of the other coil and the at least one pole piece film by an insulating film, and said first and second coils are connected to each other so as to generate magnetic flux in the same direction;

one of said first coil and said second coil has coil turns with generally planar side surfaces extending generally transverse to the planes of the first magnetic film and one pole piece film wherein said side surfaces have taper angles making the sectional shape of the coil turns narrower in the lower part and wider in the upper part; and upper surfaces of said first and second coils form the same plane.

2. A thin film magnetic head according to claim 1, wherein:

said first coil has a taper angle making its sectional shape wider in the lower part and narrower in the upper part; and said second coil has a taper angle making its sectional shape narrower in the lower part and wider in the upper part and has the outermost coil turn adjacent to said pole portion and said back gap portion.

3. A thin film magnetic head according to claim 2, wherein:

said taper angles are equal to or more than 80 degrees and less than 90 degrees in relation to said flat surface of said first magnetic film.

4. A thin film magnetic head according to claim 3, wherein:

said first coil is a plating film and is formed on a first insulating film formed on said flat surface of said first magnetic film; and said second coil is a plating film and is formed on said second insulating film in said space, and said second insulating film is formed on the bottom face and both side faces of said space.

5. A thin film magnetic head according to claim 1, further comprising a third coil and a fourth coil, wherein:

said third coil and said fourth coil are provided above said first coil and said second coil, insulated from said first coil and said second coil by a third insulating film, and said third and fourth coils surround in a spiral form a back gap portion connected to said back gap portion on the surface of said third insulating film, and one of said third and fourth coils is fitted into the space between coil turns of the other, insulated from the coil turns of the other by a fourth insulating film;

the outermost coil turn of said third coil or said fourth coil is adjacent to said pole portion with said fourth insulating film; and the innermost coil turn of said third coil or said fourth coil is adjacent to said back gap portion with said fourth insulating film.

6. A thin film magnetic head according to claim 5, wherein:

the outermost coil turn of said third coil or said fourth coil has a side surface being adjacent to said pole portion with said fourth insulating film, and the innermost coil turn of said third coil or said fourth coil has a side surface being adjacent to said back gap portion with said fourth insulating film, and each of said side surfaces has a taper angle making the sectional shape of the coil turn narrower in the lower part and wider in the upper part.

7. A thin film magnetic head according to claim 6, wherein:

said third coil has a taper angle making its sectional shape wider in the lower part and narrower in the upper part; and said fourth coil has a taper angle making its sectional shape narrower in the lower part and wider in the upper part and has the outermost coil turn adjacent to said pole portion and said back gap portion.

8. A thin film magnetic head according to claim 7, wherein:

said taper angles are equal to or more than 80 degrees and less than 90 degrees in relation to said surface of said third magnetic film.

9. A thin film magnetic head according to claim 8, wherein:

said third coil is a plating film and is formed on said third insulating film; and said fourth coil is a plating film and is formed on said fourth insulating film in said space, and said fourth insulating film is formed on the bottom face and both side faces of said space.

10. A thin film magnetic head according to claim 1, further comprising a read element, wherein:

said read element comprises a giant magnetoresistance effect element.

11. A thin film magnetic head according to claim 10, wherein:

said giant magnetoresistance effect element includes one of a spin valve film and a ferromagnetic tunnel junction.

12. A magnetic recording/reproducing apparatus comprising a thin film magnetic head and a magnetic recording medium, said thin film magnetic head comprising a write element, wherein:

said write element comprises a first magnetic film, a pole portion, a second magnetic film, a gap film, a first coil and a second coil;

said first magnetic film has one flat surface;

said pole portion comprises a first pole portion and a second pole portion;

said first pole portion including at least one pole piece film lying on said flat surface of said first magnetic film, said at least one pole piece film having an upper end part narrowed to define a track width;

said second pole portion faces said first pole portion with said gap film between them;

said second magnetic film is connected to said second pole portion and is joined to said first magnetic film by a back gap portion that is recessed in the thin film magnetic head from the medium-facing surface;

said first coil and said second coil surround in a spiral form said back gap portion on said flat surface of said first magnetic film, and one of said first and second coils is fitted into a space between coil turns of the other, insulated from the coil turns of the other coil and the at least one pole piece film by an insulating film, and said first and second coils are connected to each other so as to generate magnetic flux in the same direction;

one of said first coil and said second coil has coil turns with generally planar side surfaces extending generally transverse to the planes of the first magnetic film and one pole piece film wherein said side surfaces have taper angles making the sectional shape of the coil turn narrower in the lower part and wider in the upper part;

upper surfaces of said first and second coils form the same plane; and said magnetic recording medium performs magnetic recording/reproducing operations in cooperation with said thin film magnetic head.

13. A magnetic recording/reproducing apparatus according to claim 12, wherein:

said first coil has a taper angle making its sectional shape wider in the lower part and narrower in the upper part; and said second coil has a taper angle making its sectional shape narrower in the lower part and wider in the upper part and has the outermost coil turn adjacent to said pole portion and said back gap portion.

14. A magnetic recording/reproducing apparatus according to claim 13, wherein:

said taper angles are equal to or more than 80 degrees and less than 90 degrees in relation to said flat surface of said first magnetic film.

15. A magnetic recording/reproducing apparatus according to claim 14, wherein:

said first coil is a plating film and is formed on a first insulating film formed on said flat surface of said first magnetic film; and said second coil is a plating film and is formed on said second insulating film in said space, and said second insulating film is formed on the bottom face and both side faces of said space.

16. A magnetic recording/reproducing apparatus according to claim 12, further comprising a third coil and a fourth coil, wherein:

said third coil and said fourth coil are provided above said first coil and said second coil, insulated from said first coil and said second coil by a third insulating film, and said third and fourth coils surround in a spiral form a back gap portion connected to said back gap portion on the surface of said third insulating film, and one of said third and fourth coils is fitted into the space between coil turns of the other, insulated from the coil turns of the other by a fourth insulating film;

the outermost coil turn of said third coil or said fourth coil is adjacent to said pole portion with said fourth insulating film; and the innermost coil turn of said third coil or said fourth coil is adjacent to said back gap portion with said fourth insulating film.

17. A magnetic recording/reproducing apparatus according to claim 16, wherein:

the outermost coil turn of said third coil or said fourth coil has a side surface being adjacent to said pole portion with said fourth insulating film, and the innermost coil turn of said third coil or said fourth coil has a side surface being adjacent to said back gap portion with said fourth insulating film, and each of said side surfaces has a taper angle making the sectional shape of the coil turn narrower in the lower part and wider in the upper part.

18. A magnetic recording/reproducing apparatus according to claim 17, wherein:

said third coil has a taper angle making its sectional shape wider in the lower part and narrower in the upper part; and said fourth coil has a taper angle making its sectional shape narrower in the lower part and wider in the upper part and has the outermost coil turn adjacent to said pole portion and said back gap portion.

19. A magnetic recording/reproducing apparatus according to claim 18, wherein:

said taper angles are equal to or more than 80 degrees and less than 90 degrees in relation to said surface of said third magnetic film.

20. A magnetic recording/reproducing apparatus according to claim 19, wherein:

said third coil is a plating film and is formed on said third insulating film; and said fourth coil is a plating film and is formed on said fourth insulating film in said space, and said fourth insulating film is formed on the bottom face and both side faces of said space.

21. A magnetic recording/reproducing apparatus according to claim 12, further comprising a read element, wherein:

said read element comprises a giant magnetoresistance effect element.

22. A magnetic recording/reproducing apparatus according to claim 21, wherein:

said giant magnetoresistance effect element includes one of a spin valve film and a ferromagnetic tunnel junction.

* * * * *